May 1, 1951 H. W. BALZER 2,550,755

TOLL SWITCHING TELEPHONE SYSTEM

Filed Sept. 24, 1947

12 Sheets-Sheet 1

INVENTOR.
Harvey W. Balzer
BY
Smith, Olsen + Baird
Attys.

May 1, 1951 H. W. BALZER 2,550,755

TOLL SWITCHING TELEPHONE SYSTEM

Filed Sept. 24, 1947 12 Sheets-Sheet 2

INVENTOR.
Harvey W. Balzer

BY Smith, Olsen & Baird

Attys.

May 1, 1951 H. W. BALZER 2,550,755

TOLL SWITCHING TELEPHONE SYSTEM

Filed Sept. 24, 1947 12 Sheets-Sheet 3

INVENTOR.
Harvey W. Balzer

BY

Smith, Olsen & Baird

Attys.

May 1, 1951 H. W. BALZER 2,550,755

TOLL SWITCHING TELEPHONE SYSTEM

Filed Sept. 24, 1947 12 Sheets-Sheet 4

INVENTOR.
Harvey W. Balzer
BY
Smith, Olsen + Baird
Attys.

TOLL SWITCHING TELEPHONE SYSTEM

Filed Sept. 24, 1947

INVENTOR.
Harvey W. Balzer
BY
Smith, Olsen & Baird
Attys.

INVENTOR.
Harvey W. Balzer
BY
Smith, Olsen & Baird
Attys

May 1, 1951 H. W. BALZER 2,550,755

TOLL SWITCHING TELEPHONE SYSTEM

Filed Sept. 24, 1947 12 Sheets-Sheet 7

INVENTOR.
Harvey W. Balzer
BY
Smith, Olsen & Baird
Attys

INVENTOR.
Harvey W. Balzer

BY
Smith, Olsen & Baird
Attys.

INVENTOR.
Harvey W. Balzer
BY
Smith, Olsen & Baird
Attys.

INVENTOR.
Harvey W. Balzer
BY
Smith, Olsen + Baird
Attys

TOLL SWITCHING TELEPHONE SYSTEM

Filed Sept. 24, 1947 12 Sheets-Sheet 11

INVENTOR.
Harvey W. Balzer
BY
Smith, Olsen & Baird
Attys.

TOLL SWITCHING TELEPHONE SYSTEM

Filed Sept. 24, 1947 12 Sheets-Sheet 12

INVENTOR.
Harvey W. Balzer
BY
Smith, Olsen + Baird
Attys.

Patented May 1, 1951 2,550,755

UNITED STATES PATENT OFFICE 2,550,755

TOLL SWITCHING TELEPHONE SYSTEM

Harvey W. Balzer, Downers Grove, Ill., assignor to Automatic Electric Laboratories, Inc., Chicago, Ill., a corporation of Delaware Application September 24, 1947, Serial No. 775,818

41 Claims. (Cl. 179—27)

Figure 1:
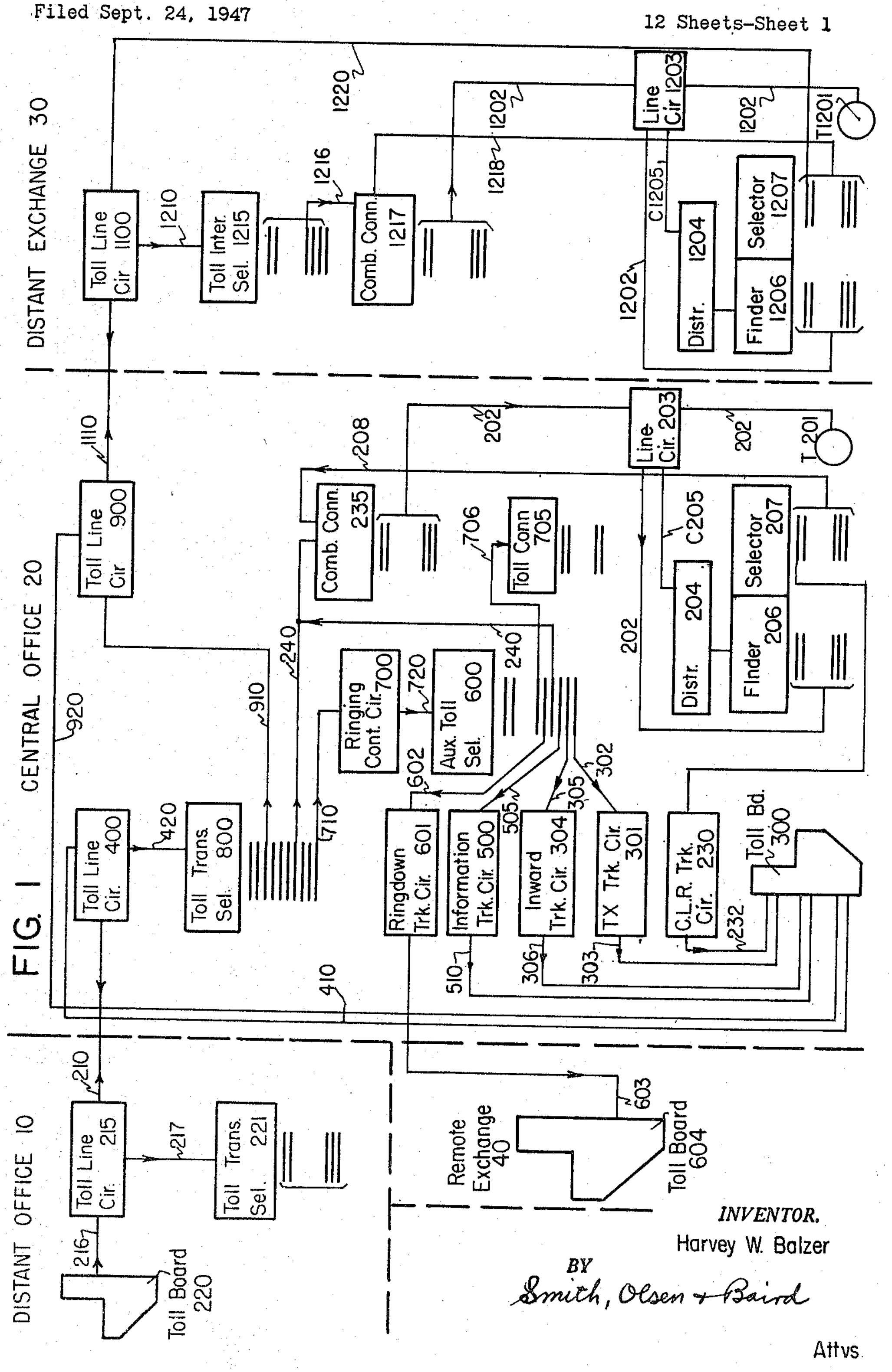

The present invention relates to telephone systems, and more particularly to such systems of the toll switching type.

A toll switching telephone system usually comprises an office provided with a toll board and a plurality of first toll line circuits accessible thereto, an exchange provided with a plurality of second toll line circuits and a corresponding plurality of associated toll first selectors accessible thereto, and a corresponding plurality of toll lines interconnecting the corresponding pairs of first and second toll line circuits. Also the exchange normally comprises trunks and toll transmission selectors accessible to the toll first selectors, combination connectors accessible to the toll transmission selectors, and subscriber lines accessible to the combination connectors. In this system the toll first selectors are necessary to complete toll connections to the trunks, which do not ordinarily require the supply thereto of transmission battery; while the toll transmission selectors are necessary to complete toll connections, through the combination connectors, to the subscriber lines, which ordinarily require the supply thereto of transmission battery. While this arrangement is entirely satisfactory in operation, and necessary in large exchange networks, it requires ranks of toll first selectors and ranks of toll transmission selectors, notwithstanding the fact that in a given exchange the total number of outlets may be relatively small.

Accordingly, it is a general object of the present invention to provide a toll switching telephone system comprising a minimum number of ranks of automatic switches in the toll switch train.

Another object of the invention is to provide in a telephone system of the type noted, a combination toll-first and toll-transmission selector.

Another object of the invention is to provide a combination switch-through and toll-transmission selector capable of the two operations mentioned in response to one digit and to two digits respectively, whereby the normal directory numbering scheme is not disturbed by the substitution in the toll switch train of the combination selector for the usual tandem related toll first selector and toll transmission selector.

Another object of the invention is to provide an auxiliary toll selector of improved connection and arrangement, embodying both split-level and full-level trunk-hunting and busy facilities.

Another object of the invention is to provide an improved selector of the combination one digit and two digit type embodying facility for returning a delay-digit signal during trunk hunting operation.

Another object of the invention is to provide in a switch train including first and second tandem related automatic switches, an improved arrangement governed by operation of the second switch for selectively setting the final position of the first switch.

A further object of the invention is to provide in a switch train including first and second tandem related automatic switches, an interposed control circuit governed by final operation of the second switch for establishing the character of the final connection between the first and second switches.

A further object of the invention is to provide in a toll switching telephone system involving an office and an exchange interconnected by a trunk line, improved terminating line circuits arranged to trunk toll calls over the trunk line from the office to the exchange and to trunk C. L. R. calls over the trunk line from the exchange to the office.

A further object of the invention is to provide a toll line circuit embodying improved control and supervisory circuit facilities.

A still further object of the invention is to provide a toll switching telephone system involving a plurality of offices and exchanges and embodying improved trunking and supervisory facilities permitting the direct completion of toll calls from a toll board without multiple handling at one or more other such toll boards.

Further features of the invention pertain to the particular arrangement of the circuit elements of the system, whereby the above-outlined and additional operating features thereof are attained.

*Sect. 1.—The general arrangement of the telephone system*

Figures 2, 13:
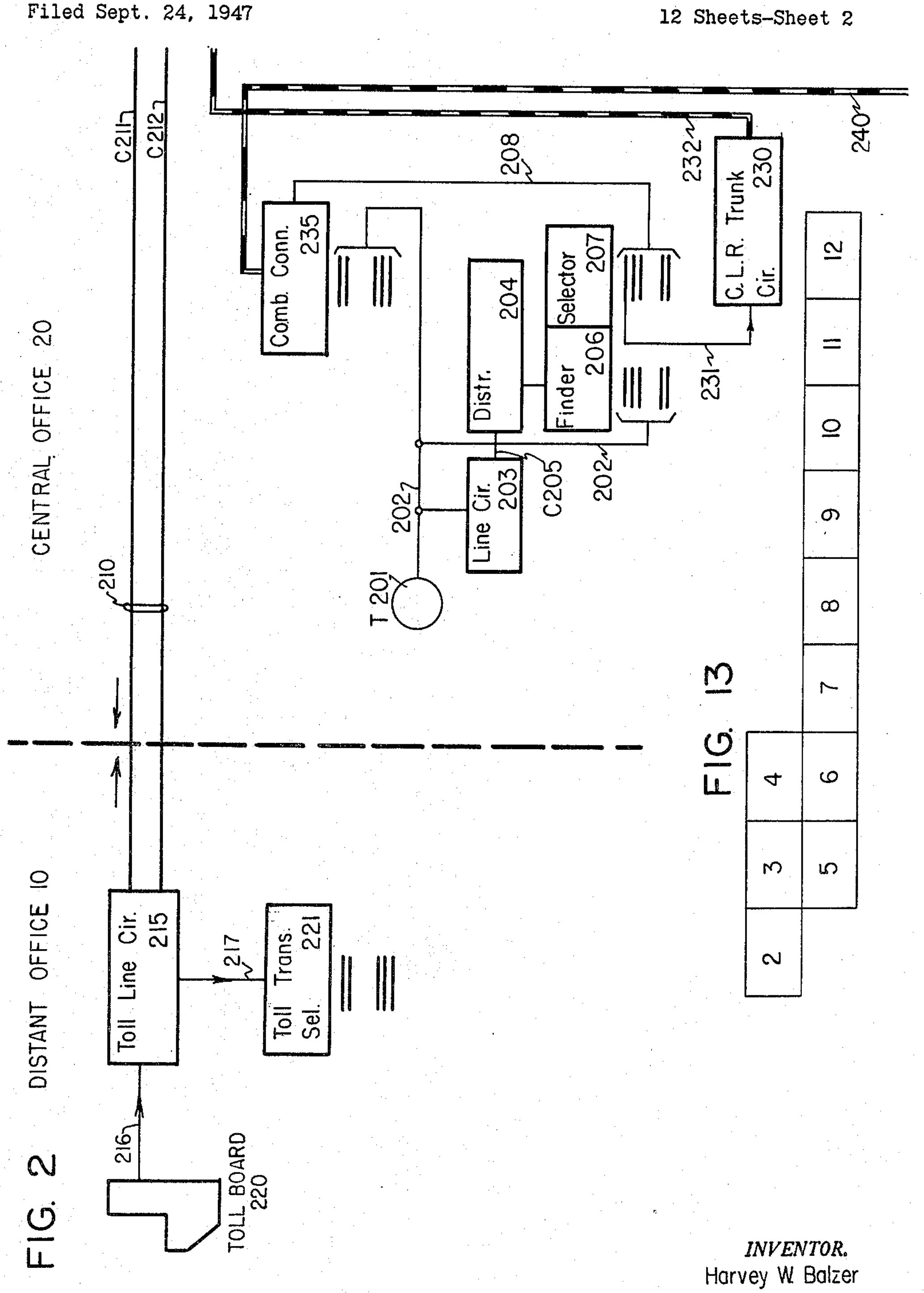

The invention, both as to its organization and method of operation, together with further objects and advantages thereof will best be understood by reference to the following specification taken in connection with the accompanying drawings, in which Figure 1 is a schematic diagram of the area served by a telephone system embodying the present invention and illustrating the general arrangement of the apparatus incorporated in several of the offices and exchanges thereof; Figs. 2 to 12, inclusive, taken together, illustrate the details of certain of the apparatus incorporated in the telephone system, which apparatus has embodied therein the features of the invention as briefly outlined above; and Fig. 13 illustrates the mode of combining Figs. 2 to 12, inclusive, to form a unified diagram.

Figure 3:
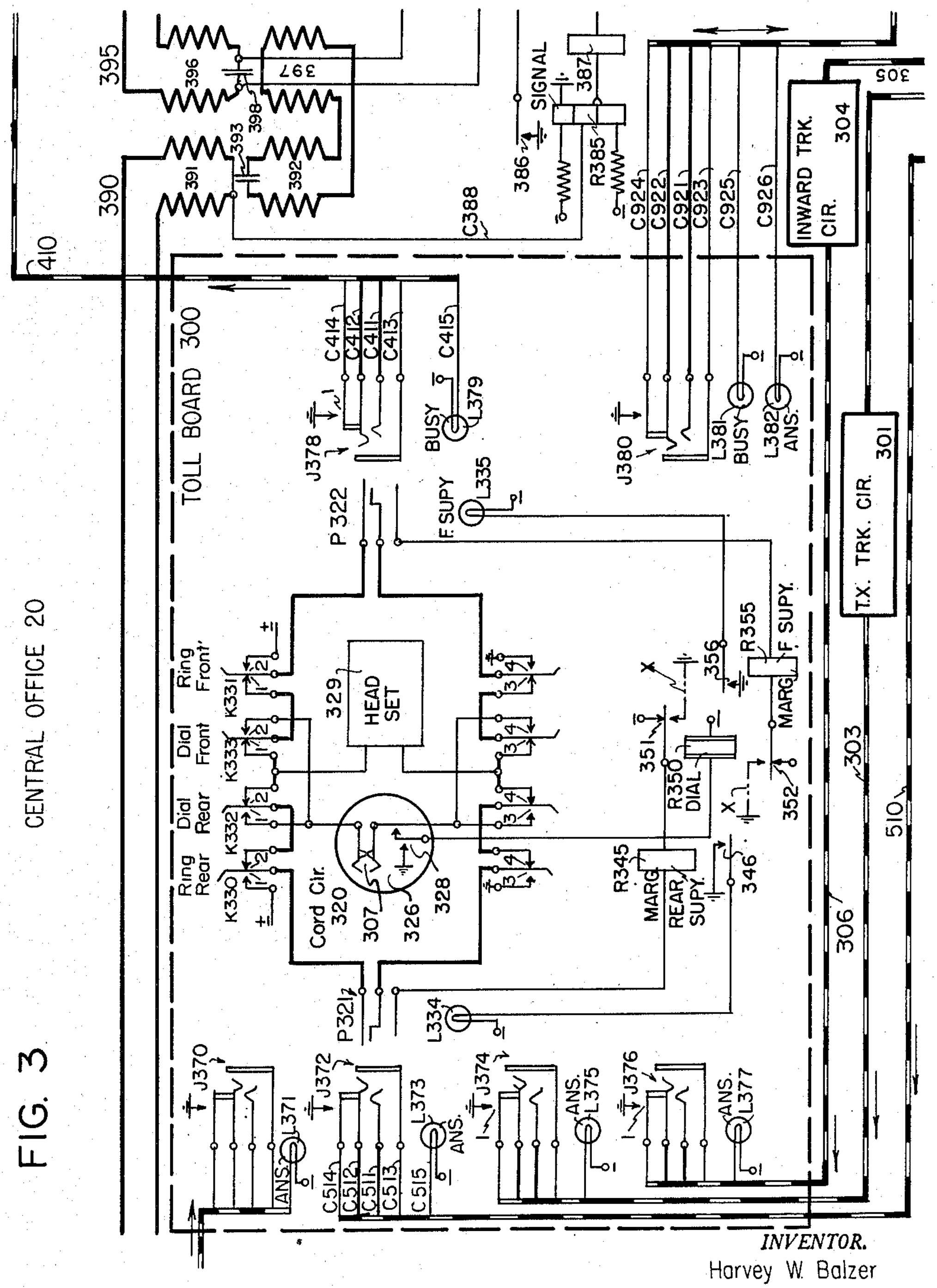
Figure 4:
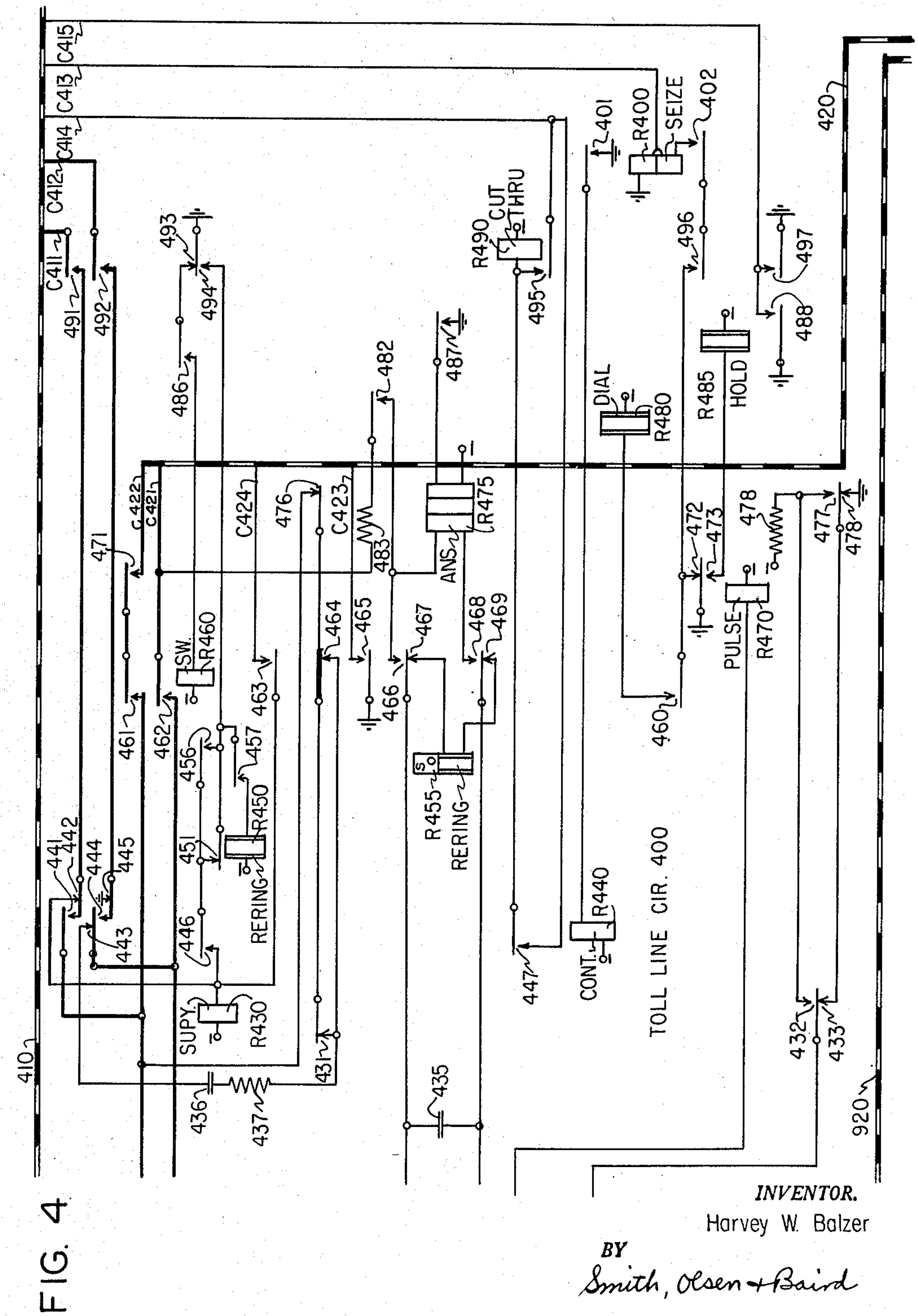
Figure 5:
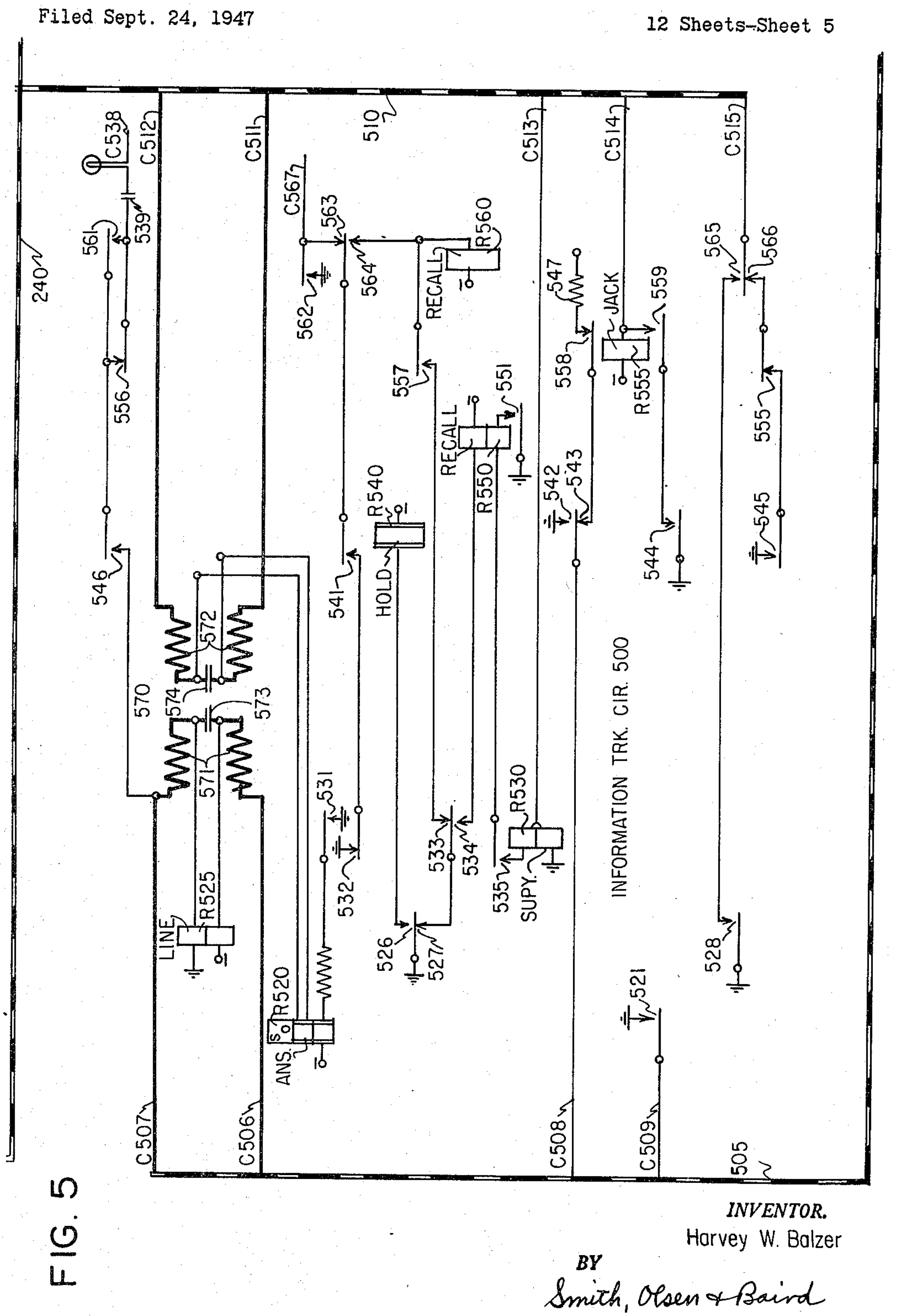
Figure 6:
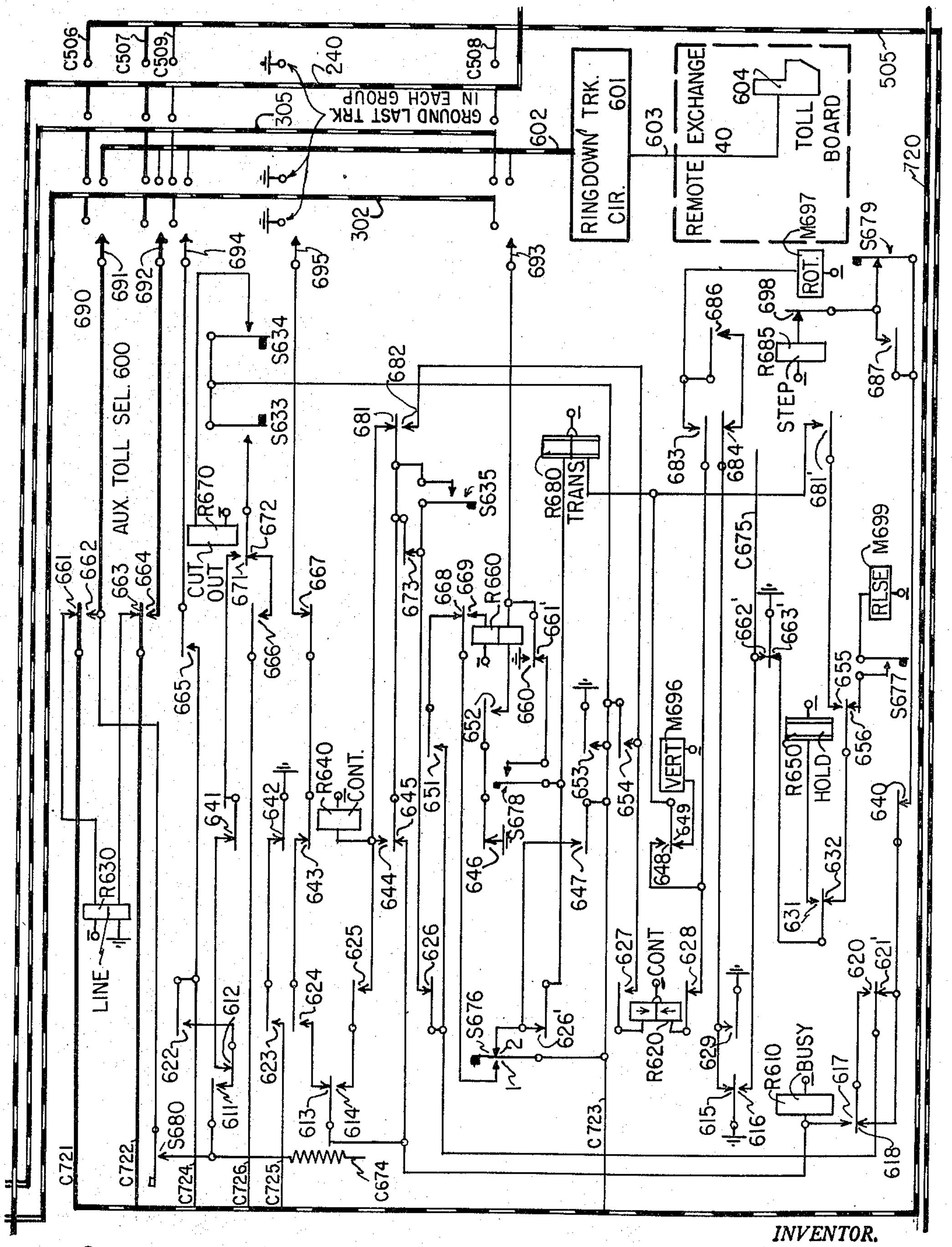
Figure 7:
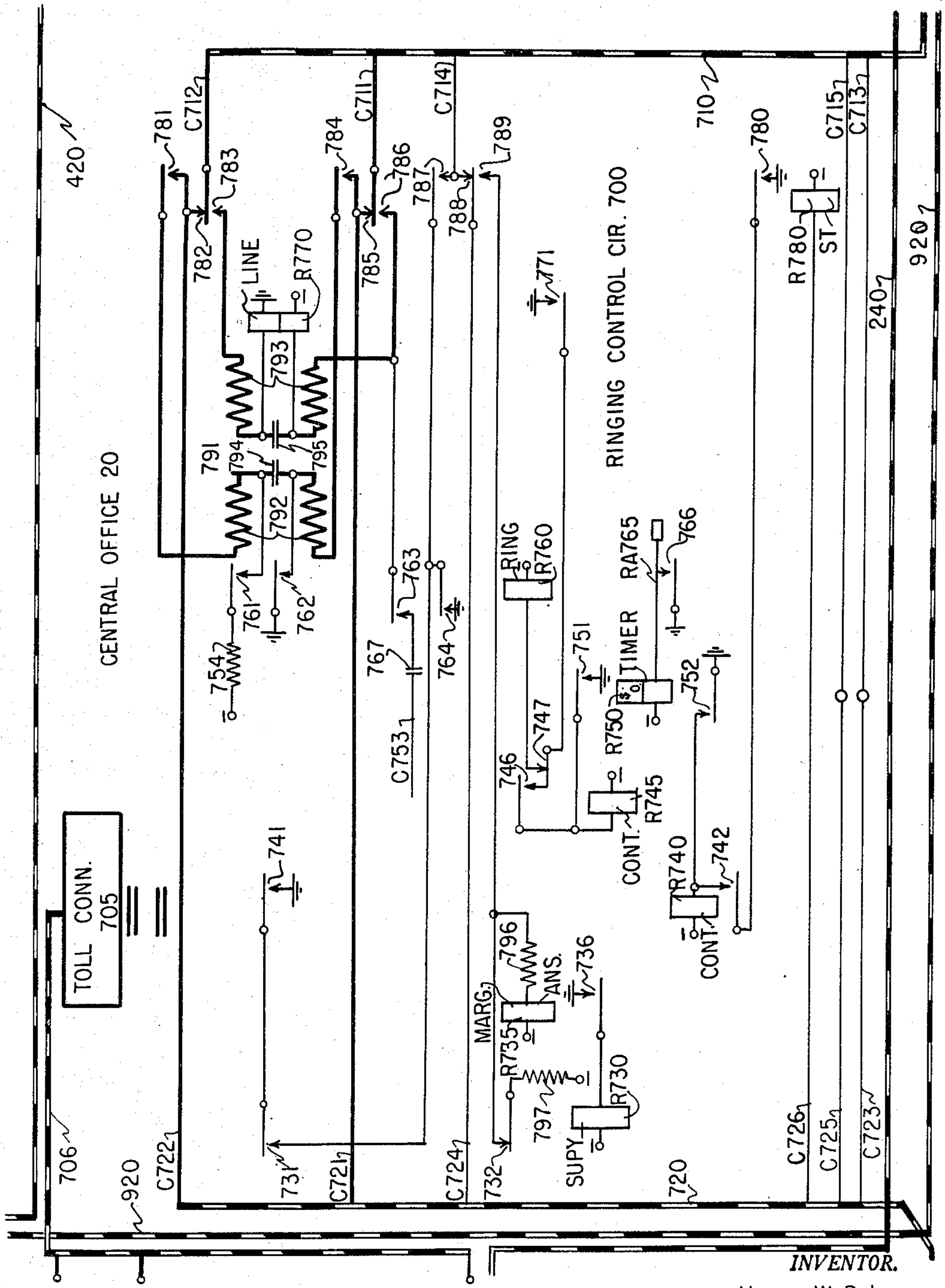
Figure 8:
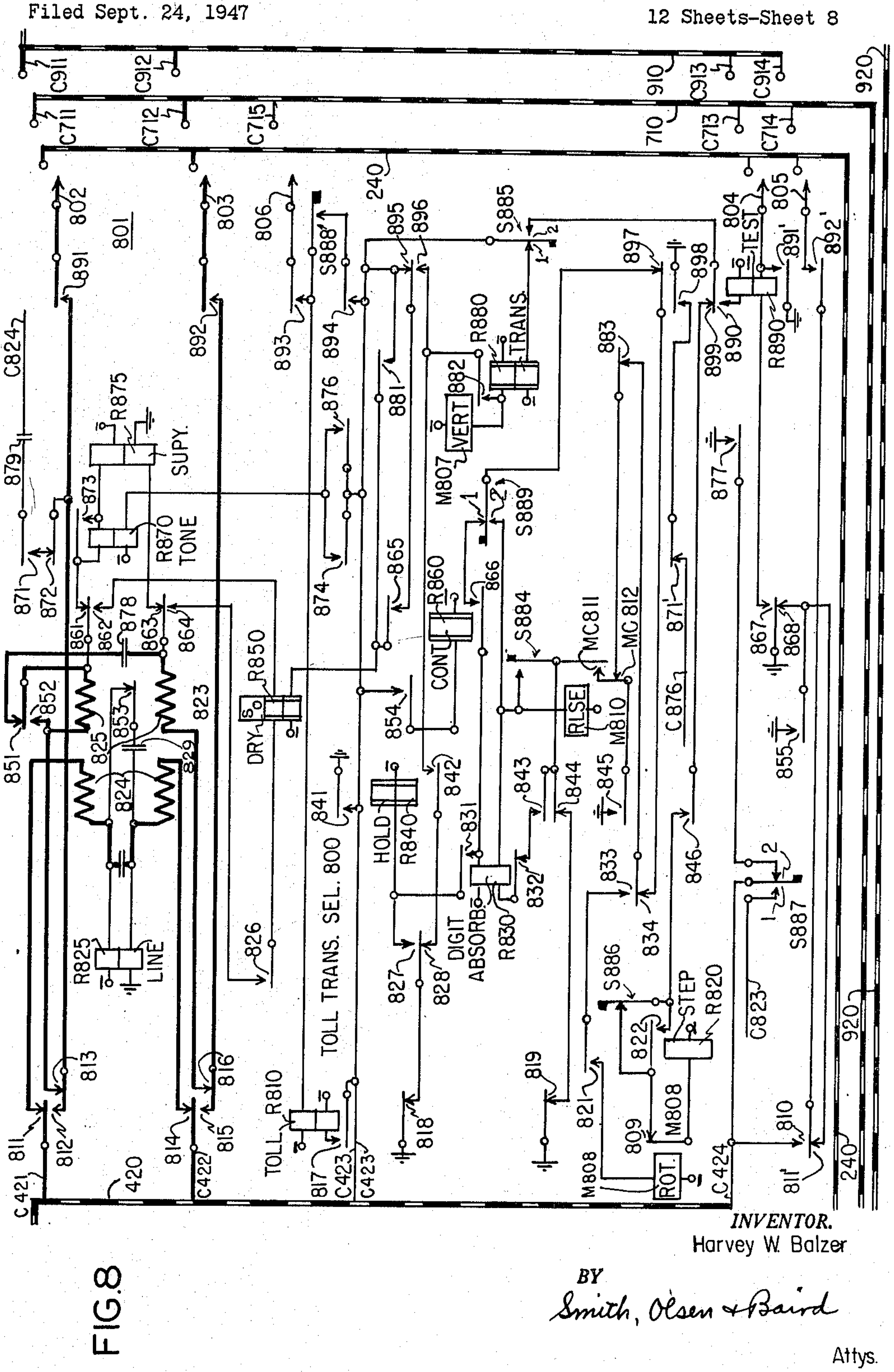
Figure 9:
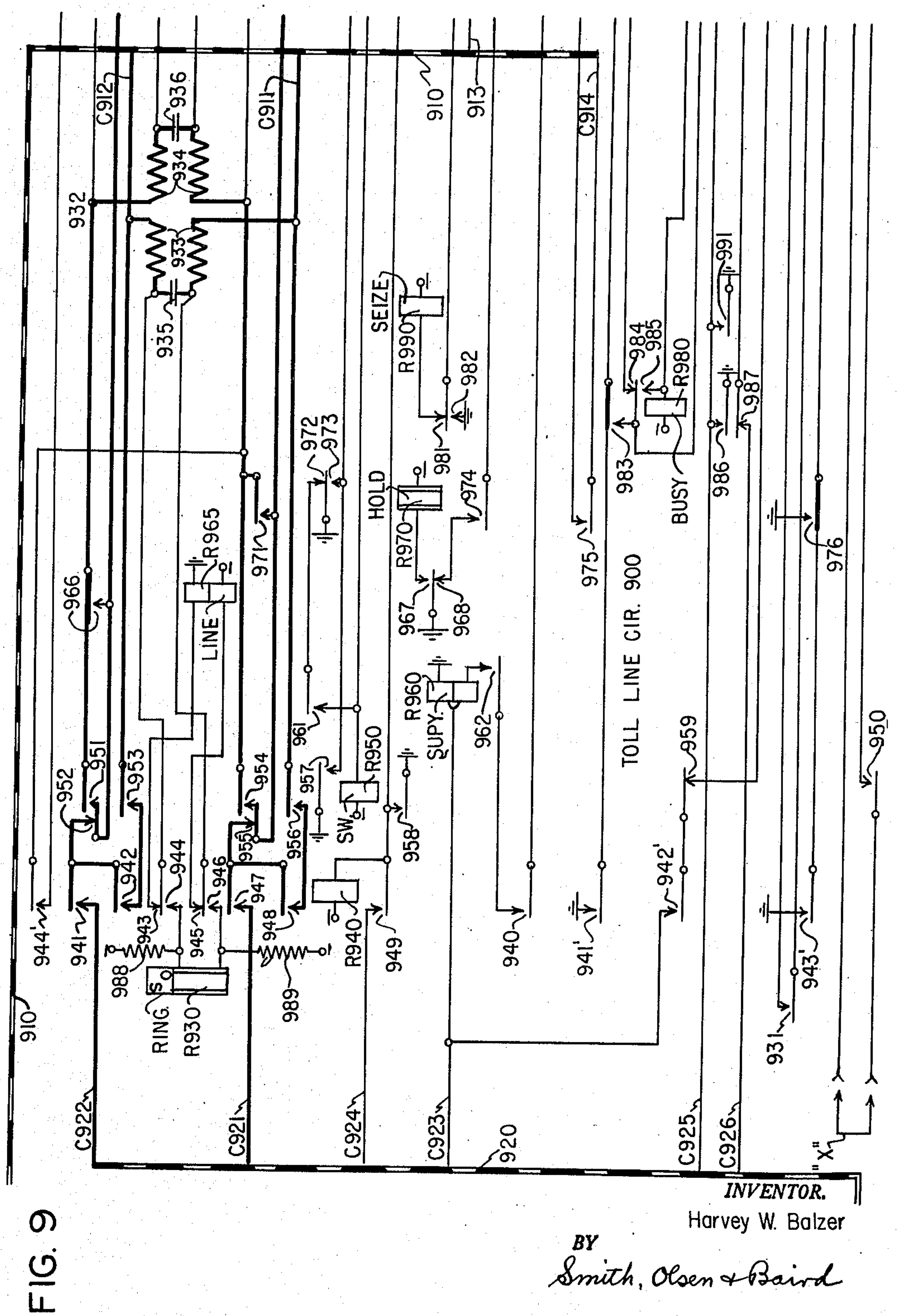
Figure 10:
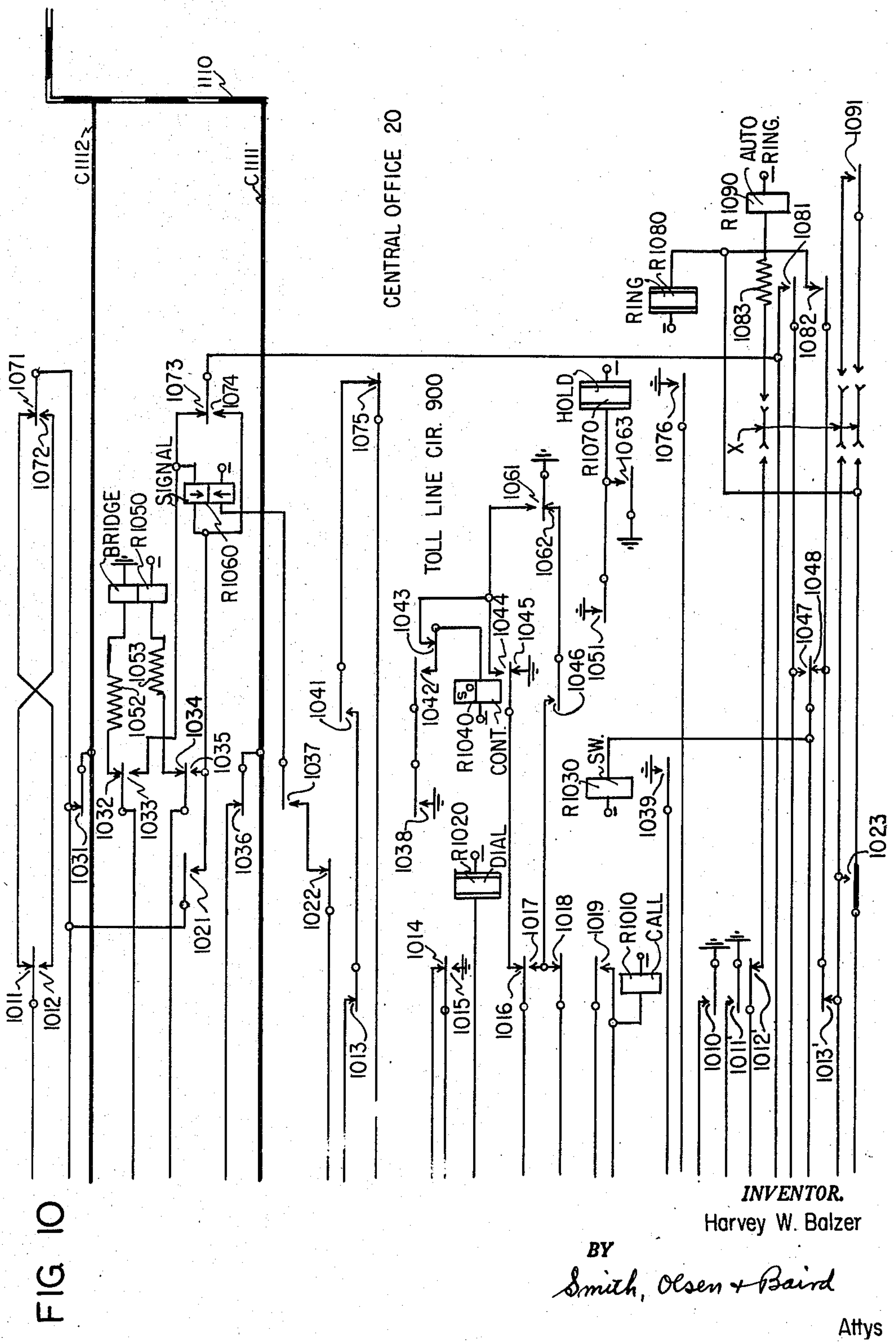

More particularly, a portion of Fig. 3 illustrates the details of one of the cord circuits disposed at the toll board in the central office; another portion of Fig. 3, taken in conjunction with Fig. 4, illustrates the details of one of a first group of toll line circuits in the central office; Fig. 5 illustrates the details of one of the information trunk circuits in the central office; Fig. 6 illustrates the details of one of the auxiliary toll selectors in the central office; Fig. 7 illustrates the details of one of the ringing control circuits in the central office; Fig. 8 illustrates the details of one of the toll transmission selectors in the central office; Figs. 9 and 10, taken together, illustrate the details of one of a second group of toll line circuits in the central office; and Figs. 11 and 12, taken together, illustrate the details of one of the toll line circuits in the distant exchange.

Referring now more particularly to Fig. 1, the telephone system there illustrated serves an area comprising a distant office 10, a central office 20, a distant exchange 30 and a remote exchange 40. The distant office 10 is of the automatic type, serves substations of any suitable type, and comprises a manual dial toll board 220; and the remote exchange 40 is of any suitable type, serves substations of any suitable type, and comprises a manual toll board 604. The central office 20 is of the automatic type, serves substations of any suitable type, and comprises a manual dial toll board 300; while the distant exchange 30 is of the automatic type and serves substations of any suitable type. Specifically, the central office 20 serves a plurality of groups of subscriber substations, one of the groups including the subscriber substation T201. The distant exchange 30 serves a plurality of groups of subscriber substations, one of the groups including the subscriber substation T1201, and a group of paystations, not shown. The subscriber substation T201 has a subscriber line 202 extending thereto that is provided with an individually associated line circuit 203 of any suitable type; and the subscriber substation T1201 has a subscriber line 1202 extending thereto that is provided with an individually associated line circuit 1203 of any suitable type.

The distant office 10 and the central office 20 are interconnected by a group of toll lines, including the toll line 210; the central office 20 and the distant exchange 30 are interconnected by a group of toll lines including the toll line 1110; and the central office 20 and the remote exchange 40 are interconnected by a group of trunk lines including the trunk line 603. The toll lines 210, etc., are of the two-way type terminating in toll line circuits respectively disposed in the distant office 10 and in the central office 20, the toll line 210 terminating in the toll line circuits 215 and 400 respectively disposed in the distant office 10 and in the central office 20. The toll lines 1110, etc., are of the two-way type terminating in toll line circuits respectively disposed in the central office 20 and in the distant exchange 30, the toll line 1110 terminating in the toll line circuits 900 and 1100 respectively disposed in the central office 20 and in the distant exchange 30. The trunk lines 603, etc., are of the one-way type terminating in ring-down trunk circuits disposed in the central office 20 and at the toll board 604 disposed in the remote exchange 40, the trunk line 603 terminating in the ring-down trunk circuit 601 disposed in the central office 20.

The distant office 10 comprises a local switch train, not shown, the central office 20 comprises a local switch train including a plurality of finder-selector groups and a plurality of connector groups, not shown; and the distant exchange 30 comprises a local switch train, including a plurality of finder-selector groups and a plurality of connector groups, not shown. Specifically, the local switch train in the central office 20 comprises a fourth group of finder-selector links, including the link illustrated comprising the finder 206 and the selector 207; which group is provided with a distributor 204, the finder 206 having access to the subscriber line 202 extending to the subscriber substation T201, and the line circuit 203 individually associated with the subscriber line 202 being connected to the distributor 204 by a start conductor C205. Similarly, the local switch train in the distant exchange 30 comprises a fourth group of finder-selector links, including the link illustrated comprising the finder 1206 and the selector 1207; which group is provided with a distributor 1204, the finder 1206 having access to the subscriber line 1202 extending to the subscriber substation T1201, and the line circuit 1203 individually associated with the subscriber line 1202 being connected to the distributor 1204 by a start conductor C1205.

Also the distant office 10 comprises a toll switch train including a group of toll transmission selectors, one of the toll transmission selectors being indicated at 221; which toll transmission selector 221 is individually connected to the toll line circuit 215 by a trunk 217 extending therefrom. Also the toll line circuit 215 is accessible to the toll board 220 via a trunk 216 extending thereto. Similarly, the central office 20 comprises a toll switch train including a group of toll transmission selectors, one of the toll transmission selectors being indicated at 800; which toll transmission selector 800 is individually connected to the toll line circuit 400 by a trunk 420 extending therefrom. Also the toll line circuit 400 is accessible to the toll board 300 via a trunk 610 extending thereto. Finally the distant exchange 30 comprises a toll switch train including a group of toll intermediate selectors, one of the toll intermediate selectors being indicated at 1215; which toll intermediate selector 1215 is individually connected to the toll line circuit 1100 by a trunk 1210 extending therefrom. Also the toll line circuit 1100 is accessible to the local switch train via a C. L. R. trunk 1220 extending thereto. Further, the toll switch train in the central office 20 comprises a plurality of groups of combination local and toll connectors, the fourth group of combination connectors including the combination connector 235 illustrated. Also the combination connector 235 has access to the fourth group of subscriber lines, including the subscriber line 202 extending to the subscriber substation T201. Further, the combination connector 235 is accessible to the toll transmission selectors 800, etc., via a trunk 240; and is also accessible to the selectors 207, etc., via a trunk 208. Similarly, the toll switch train in the distant exchange 30 comprises a plurality of groups of combination local and toll connectors, the fourth group of combination connectors including the combination connector 1217 illustrated. Also the combination connector 1217 has access to the fourth group of subscriber lines, including the subscriber line 1202 extending to the subscriber substation T1201. Further, the combination connector 1217 is accessible to the toll intermediate selectors 1215, etc., via a trunk 1216; and is also accessible to the selectors 1207, etc., via a trunk 1218.

Further, the toll switch train in the central office 20 comprises a group of auxiliary toll selectors, including the auxiliary toll selector 600, and an associated group of ringing control circuits, including the ringing control circuit 700; the auxiliary toll selector 600 being connected to the ringing control circuit 700 individual thereto by the trunk 720. In turn, the ringing control circuit 700 is accessible to the toll transmission selectors 800, etc., via a trunk 710 extending thereto. Also the auxiliary toll selectors 600, etc., have access to the trunks 240, etc., extending to the combination connectors 235, etc. Further, the toll transmission selectors 800, etc., have access to the toll line circuits 900, etc., via trunks 910, etc., extending thereto; and the toll line circuits 900, etc., are accessible to the toll board 300 via trunks 920, etc., extending thereto. Also the auxiliary toll selectors 600, etc., have access to the ring-down trunk circuits 601, etc., via trunks 602, etc., extending thereto. Also the toll switch train in the central office 10 comprises a group of toll connectors, including the toll connector 705. The toll connectors 705, etc., are accessible to the auxiliary toll selectors 600, etc., via trunks 706, etc., extending thereto.

Also the central office 20 comprises a group of T. X trunk circuits, including the T. X trunk circuit 301; a group of inward trunk circuits, including the inward trunk circuit 304; and a group of information trunk circuits, including the information trunk circuit 500. The T. X trunk circuits 301, etc., are accessible to the auxiliary toll selectors 600, etc., via trunks 302, etc., extending thereto; and are, in turn, connected to the toll board 300 via trunks 303, etc., extending therefrom. Similarly, the inward trunk circuits 304, etc., are accessible to the auxiliary toll selectors 600, etc., via trunks 305, etc., extending thereto; and are, in turn, connected to the toll board 300 via trunks 306, etc., extending therefrom. Finally, the information trunk circuits 500, etc., are accessible to the auxiliary toll selectors 600, etc., via trunks 505, etc., extending thereto; and are, in turn, connected to the toll board 300 via trunks 510, etc., extending therefrom.

Finally, the central office 20 comprises a group of C. L. R. trunk circuits, including the C. L. R. trunk circuit 230. The C. L. R. trunk circuits 230, etc., are accessible to the selectors 207, etc., via trunks 231, etc., extending thereto; and are, in turn, connected to the toll board 300 via trunks 232, etc., extending therefrom.

*Sect. 2.—The apparatus incorporated in the telephone system*

In the distant office 10, the toll board 220 is of the conventional manual dial type, including cord circuits, not shown; the toll line circuits 215, etc., are identical to the toll line circuits 400, etc., in the central office 20; and the toll transmission selectors 221, etc., are identical to the toll transmission selectors 800, etc., in the central office 20. In the remote exchange 40, the toll board 604 is of the conventional manual type, including cord circuits, not shown. In the distant exchange 30, the line circuits 1203, etc., as well as the distributors 1204, etc., are of any suitable types; while the finders 1206, etc., the selectors 1207, etc., the combination connectors 1217, etc., and the toll intermediate selectors 1215, etc., are of conventional Strowger types. Similarly, in the central office 20, the line circuits 203, etc., as well as the distributors 204, etc., are of any suitable types; while the finders 206, etc., the selectors 207, etc., the toll connectors 705, etc., and the combination connectors 235, etc., are of conventional Strowger types. Finally, in the central office 20, the C. L. R. trunk circuits 230, etc., the T. X trunk circuits 301, etc., the inward trunk circuits 304, etc., and the ring-down trunk circuits 601, etc., are of any suitable types.

As previously noted, the toll board 300 in the central office 20 is of the manual dial type and comprises, as shown in Fig. 3 a number of cord circuits, including the cord circuit 320 that terminates on a rear plug P321 and a front plug P322. Also the cord circuit 320 comprises a ring rear key K330, a ring front key K331, a dial rear key K332, and a dial front key K333, as well as a relay group including a rear supervisory relay R345, a dial relay R350, and a front supervisory relay R355; and also a rear supervisory lamp L334 and a front supervisory lamp L335. Further, the cord circuit 320 is connectible to a headset 329 and to an impulse transmitting mechanism of the dial type 327 disposed at the toll board 300.

The trunk 232 extending from the C. L. R. trunk circuit 230 terminates in a jack J370 individual thereto at the toll board 300 and is provided with an individually associated answer lamp L371. Similarly, the trunk 510 extending from the information trunk circuit 500 terminates in a jack J372 individual thereto at the toll board 300 and is provided with an individually associated answer lamp L373; the trunk 303 extending from the T. X trunk circuit 301 terminates in a jack J374 individual thereto at the toll board 300 and is provided with an individually associated answer lamp L375; and the trunk 306 extending from the inward trunk circuit 304 terminates in a jack J376 individual thereto at the toll board 300 and is provided with an individually associated answer lamp L377. The trunk 410 extending to the toll line circuit 400 terminates in a jack J378 individual thereto at the toll board 300 and is provided with an individually associated busy lamp L379; while the trunk 920 extending between the toll board 300 and the toll line circuit 900 terminates in a jack J380 individual thereto at the toll board 300 and is provided with individually associated busy and answer lamps L381 and L382 respectively.

Preferably each of the toll line circuits in the first group mentioned is identical to the toll line circuit 400 which comprises, as shown in Figs. 3 and 4, two repeating coils 390 and 395 and a relay group including a signal relay R385, a supervisory relay R430, a control relay R440, two re-ring relays R450 and R455, a switch relay R460, a pulse relay R470, an answer relay R475, a dial relay R480, a hold relay R485, a cut-through relay R490, and a seize relay R400.

Preferably each of the information trunks is identical to the information trunk 500, shown in Fig. 5, which comprises a repeating coil 570 and a relay group including an answer relay R520, a line relay R525, a supervisory relay R530, a hold relay R540, a recall relay R550, a jack relay R555, and a recall relay R560.

Preferably each of the auxiliary toll selectors is identical to the auxiliary toll selector 600 that comprises, as shown in Fig. 6, a relay group including a busy relay R610, a control relay R620, a line relay R630, a control relay R640, a hold relay R650, a test relay R660, a cut-out relay R670, a transfer relay R680, and a step relay R685. Further, the auxiliary toll selector 600 comprises a Strowger mechanism 690 provided with a wiper set including five wipers 691 to 695, inclusive, a vertical magnet M696 for driving the wiper carriage step by step in the vertical direction, a rotary magnet M697 for driving the wiper carriage step by step in the rotary direction, and a release magnet M699 for releasing the wiper carriage and for causing it to be returned to its normal rotary and vertical positions. Also associated with the wiper carriage of the Strowger mechanism 690 are two sets of switch springs S696 and S697 which are operated when the wiper carriage is driven one step in the vertical direction away from its normal vertical position. Also associated with the wiper carriage of the Strowger mechanism 690, are three sets of switch springs S678, S679 and S680 that are operated when the wiper carriage is driven eleven steps in the rotary direction away from its normal rotary position. A set of switch springs S634 is associated with the wiper carriage of the Strowger mechanism 690 and operated when the wiper carriage is driven either four or six steps in the vertical direction away from its normal vertical position. Finally, two sets of switch springs S633 and S635 are associated with the wiper carriage of the Strowger mechanism 690 and operated when the wiper carriage is driven either five or six steps in the vertical direction away from its normal vertical position.

Preferably, each of the ring-down control circuits is identical to the ring-down control circuit 700 that comprises, as shown in Fig. 7, a repeating coil 791 and a relay group including a supervisory relay R730, an answer relay R735, two control relays R740 and R745, a timer relay R750, a ring relay R760, a line relay R770 and a start relay R780.

Preferably, each of the toll transmission selectors is identical to the toll transmission selector 800 that comprises, as shown in Fig. 8, a repeating coil 823 and a relay group including a toll relay R810, a step relay R820, a line relay R825, a digit absorbing relay R830, a hold relay R840, a dry relay R850, a control relay R860, a tone relay R870, a supervisory relay R875, a transfer relay R880 and a test relay R890. Also the toll transmission selector 800 comprises a Strowger mechanism 801 including five wipers 802 to 806, inclusive, a vertical magnet M807 for driving the wiper carriage step by step in the vertical direction, a rotary magnet M808 for driving the wiper carriage step by step in the rotary direction, and a release magnet M810 for releasing the wiper carriage and for causing it to be returned to its normal rotary and vertical positions. Also associated with the wiper carriage of the Strowger mechanism 801 are two sets of switch springs S884 and S885 that are operated when the wiper carriage is driven one step in the vertical direction away from its normal vertical position. Also associated with the wiper carriage of the Strowger mechanism 801 are two sets of switch springs S886 and S887 that are operated when the wiper carriage is driven eleven steps in the rotary direction away from its normal rotary position. Further, a set of switch springs S888 is associated with the wiper carriage of the Strowger mechanism 801 and operated when the wiper carriage is driven eight steps in the vertical direction away from its normal vertical position. Finally, a set of switch springs S889 is associated with the wiper carriage of the Strowger mechanism 801 and operated when the wiper carriage is driven two steps in the vertical direction away from its normal vertical position.

Preferably, each of the toll line circuits in the second group mentioned is identical to the toll line circuit 900 that comprises, as shown in Figs. 9 and 10, a repeating coil 932 and a relay group including a ring relay R930, two switch relays R940 and R950, a supervisory relay R960, a line relay R965, a hold relay R970, a busy relay R980, a seize relay R990, a call relay R1010, a dial relay R1020, a switch relay R1030, a control relay R1040, a bridge relay R1050, a signal relay R1060, a hold relay R1070, a ring relay R1080 and an automatic ring relay R1090.

Figure 11:
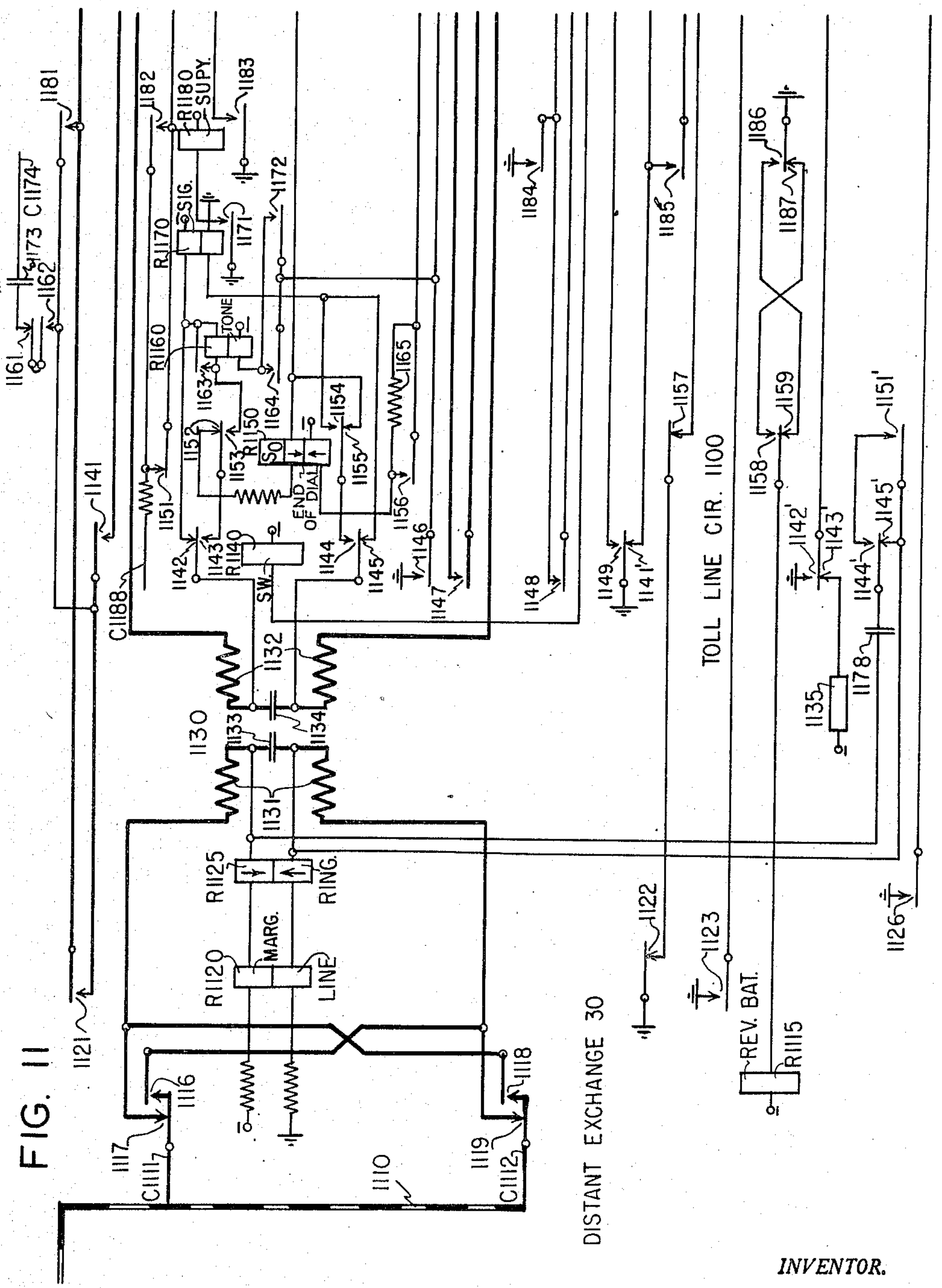
Figure 12:
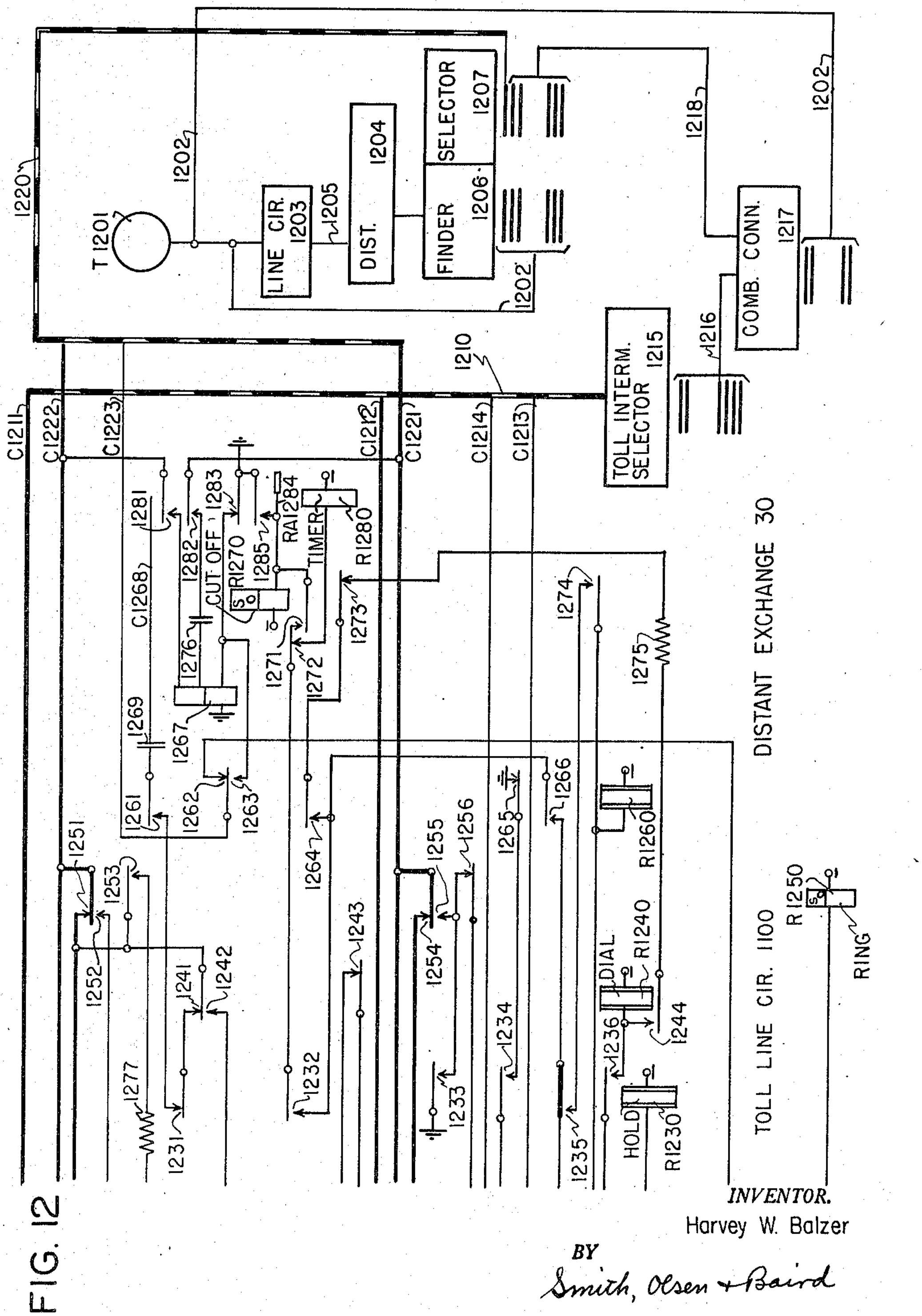

Preferably, each of the toll line circuits in the group including the toll line circuit 1100 is identical thereto and comprises, as shown in Figs. 11 and 12, a repeating coil 1130 and a relay group including a reverse battery relay R1115, a line relay R1120, a ring relay R1125, a switch relay R1140, an end-of-dial relay R1150, a tone relay R1160, a signal relay R1170, a supervisory relay R1180, a hold relay R1230, a dial relay R1240, a ring relay R1250, a control relay R1260, a cut-off relay R1270 and a timer relay R1280.

A better understanding of the connection and arrangement of the apparatus incorporated in the telephone system will be facilitated from a consideration of the extension of calls involving the various offices and exchanges.

*Sect. 3—Local calls in the central office*

First assuming that a call is initiated at the subscriber substation T201 in the central office 20 that is to be completed locally to another subscriber substation therein, the line circuit 203 is controlled via the subscriber line 202 in order to govern operation of the distributor 204 over the start conductor C205; whereby an idle one of the links, such for example, as that illustrated, is assigned thereby. The finder 206 of the link illustrated operates to find the subscriber line 202 extending to the calling subscriber substation T201; whereby the line circuit 203 is operated in order to mark the subscriber line 202 as busy to the other links having access thereto. Also the selector 207 of the link illustrated operates to return dial tone over the subscriber line 202 to the calling subscriber substation T201; whereby the subscriber at the calling subscriber substation T201 proceeds to dial the directory number of the called subscriber substation; which number is a three-digit number in the present illustration. The first digit dialed at the calling subscriber substation T201 effects operation of the selector 207; whereby it operates to select first the group of trunks extending to the corresponding group of local connectors, not shown, and then an idle trunk therein. The second and third digits dialed at the calling subscriber substation T201 govern operation of the selected local connector; whereby it operates to select the subscriber line extending to the called subscriber substation. The subsequent operation of the selected local connector depends upon the idle or busy condition of the called subscriber substation and is in accordance with conventional practice. Also the subsequent completion of the established connection, as well as the ultimate release thereof, is entirely conventional. In passing, it is noted that in the event all of the local connectors in the group selected by the selector 207 in response to the first digit dialed at the calling subscriber substation T201 are busy, the selector 207 operates to select an idle one of the combination connectors in the same group; which selected combination connector then responds to the second and third digits dialed at the calling subscriber substation T201 in a conventional manner.

*Sect. 4.—C. L. R. calls in the central office*

Now assuming that a call initiated at the calling subscriber substation T201 is to be extended to the toll board 300 in the central office 20, a link, such, for example, as that illustrated, is taken into use in the manner previously explained. The subscriber at the calling subscriber substation T201 then dials the single digit 0; whereby the selector 207 responds thereto to select first the group of C. L. R. trunk circuits, including the C. L. R. trunk circuit 230, and then an idle C. L. R. trunk circuit therein. For example, the selector 207 may select the particular C. L. R. trunk circuit 230 via the trunk 231 extending thereto; whereby the C. L. R. trunk circuit 230 creates a calling condition upon the trunk 232 extending therefrom, completing a circuit for illuminating the answer lamp L371 associated with the jack J370 terminating the trunk 232 at the toll board 300. The illumination of the answer lamp L371 at the toll board 300 indicates to the operator thereat that a C. L. R. call is waiting to be answered on the trunk 232; whereby the operator mentioned selects an idle cord circuit, such, for example, as the cord circuit 320 and inserts the rear plug P321 thereof into the jack J370. When the rear plug P321 of the cord circuit 320 is thus inserted into the jack J370, the first contacts thereof are closed applying ground potential to the associated conductor in the trunk 232; whereby the C. L. R. trunk circuit 230 is governed to complete a circuit between the calling subscriber substation T201 and the cord circuit 320 at the toll board 300, and to remove the application of ground potential from the conductors in the trunk 230 via which the answer lamp L371 is illuminated in order to extinguish the answer lamp L371. The circuit extending from the calling subscriber substation T201 to the toll board 300 includes the subscriber line 202, the finder 206, the selector 207, the trunk 231, the C. L. R. trunk circuit 230, the trunk 232, the tip and the ring of the jack J370, the tip and the ring of the rear plug P321, the second and fourth contacts of the ring key K330, the second and fourth contacts of the dial rear key K332 and the headset 329 at the toll board 300. Also at this time, a circuit, including the sleeve of the jack J370, the sleeve of the rear plug P321 and the contacts 351, is completed for energizing the winding of the rear supervisory relay R345; however, the latter relay does not operate at this time as it is of the marginal type. The subscriber at the calling subscriber substation T201 then advises the operator at the toll board 300 concerning the extension of the toll call or the other toll service required.

Subsequently, when the subscriber at the calling subscriber substation T201 disconnects the C. L. R. trunk circuit 230 is governed; whereby low resistance ground potential is applied therein via the associated conductor in the trunk 232 to the sleeve of the jack J370 in order to complete a low resistance circuit substantially identical to that previously traced for energizing the winding of the rear supervisory relay R345 in order to cause the latter relay to operate, it being of the marginal type as previously noted. Upon operating the rear supervisory relay R345 completes, at the contacts 346, a circuit for illuminating the rear supervisory lamp L334 in order to render disconnect supervision to the operator at the toll board 300 When the operator at the toll board 300 then withdraws the rear plug P321 of the cord circuit 320 from the jack J370, the circuit for maintaining operated the rear supervisory relay R345 is interrupted causing the latter relay to restore and extinguish the rear supervisory lamp L334. Also the first contacts of the jack J370 are opened; whereby the C. L. R. trunk circuit 230 is released bringing about the release of the selector 207 and the finder 206; whereupon the line circuit 203 is governed in order again to mark the subscriber line 202 extending to the subscriber substation T201 as idle to the local connectors having access thereto.

*Sect. 5.—A call from the toll board in the distant office to a subscriber substation in the central office routed directly from a toll transmission selector to a combination connector*

Now assuming that a call is initiated at the toll board 220 by the operator inserting a front plug of a cord circuit thereat into the jack terminating the trunk 216 extending to the toll line circuit 215 in the distant office 10 terminating the toll line 210, the toll line circuit 215 is controlled in order to cause ground potential therein to be removed from the simplex of the toll line 210 and battery potential to be applied thereto; whereby a circuit is completed for effecting operation of the signal relay R385 in the toll line circuit 400 in the central office 20. More particularly, the circuit mentioned includes the line conductors C211 and C212 of the toll line 210, the windings 391 of the repeating coil 390, the simplex conductor C388, the intermediate winding of the signal relay R385, the impedance element 387 and the contacts 433 and 478, and extends to ground potential. Upon operating the signal relay R385 completes, at the contacts 386, a circuit for operating the pulse relay R470; and upon operating the pulse relay R470 completes, at the contacts 473, a circuit for operating the hold relay R485. Upon operating the hold relay R485 completes, at the contacts 488, a path for applying ground potential to the conductor C415 of the trunk 410, thereby to illuminate the busy lamp L379 associated with the jack J378 at the toll board 300 in the central office 20 in order to indicate to the operator thereat that the toll line 210 is busy at this time. Also the hold relay R485 completes, at the contacts 487, a circuit for energizing the right-hand winding of the answer relay R475, thereby to render the latter relay operative when the left-hand winding thereof is subsequently energized and properly poled, the answer relay R475 being of the shunt-field type. Further, the hold relay R485 completes, at the contacts 486, a circuit, including the contacts 493 for operating the switch relay R460. Upon operating the switch relay R460 completes, at the contacts 465, a path for applying ground potential to the control conductor C423 of the trunk 420 extending to the toll transmission selector 800; completes, at the contacts 463, a path for applying battery potential by way of the winding of the supervisory relay R430 to the EC conductor C424 of the trunk 420; and interrupts, at the contacts 467 and 469, the normal path connecting the winding of the re-ring relay R455 to the windings 396 of the repeating coil 395. Also the switch relay R460 completes, at the contacts 461, 462, 466 and 468, a path for bridging the left-hand winding of the answer relay R475 across the line conductors C422 and C421 of the trunk 420; the last mentioned path extending from the line conductor C422 by way of the contacts 471 and 461, one of the windings 396 of the repeating coil 395, the contacts 468, the left-hand winding of the answer relay R475, the contacts 466, the other winding 396 of the repeating coil 395 and the contacts 462 to the line conductor C421. Also at this time, the line conductors C421 and C422 of the trunk 420 are connected by way of the contacts 811, 814 and the windings 824 of the repeating coil 823 and the upper and lower windings of the line relay R825 in the toll transmission selector 800 respectively to battery and ground potentials. Accordingly, a loop circuit is completed for energizing in series the left-hand winding of the answer relay R475 in the toll line circuit 400 and the upper and lower windings of the line relay R825 in the toll transmission selector 800; whereby the answer relay R475 does not operate as it is not properly poled; whereas the line relay R825 operates.

Upon operating the line relay R825 completes, at the contacts 827, a circuit, including the contacts 818, for operating the hold relay R840; whereby the latter relay upon operating completes, at the contacts 841, a multiple path for applying ground potential to the control conductor C423 of the trunk 420. The application of ground potential to the control conductor C423 of the trunk 420 completes a circuit, including the first contacts of the set of switch springs S885, for energizing the lower winding of the transfer relay R880 in order to cause the latter relay to operate. Upon operating the transfer relay R880 completes, at the contacts 881, a circuit, including the contacts 481, for energizing the lower winding of the dry relay R850; whereupon the latter relay operates shortly thereafter, it being of the combination slow-to-operate and slow-to-release type. Upon operating the dry relay R850 interrupts, at the contacts 851, the normally completed path for bridging the condenser 878 across the windings 825 of the repeating coil 823; completes, at the contacts 852, a path for short-circuiting the upper winding 825 of the repeating coil 823; and interrupts, at the contacts 853, a normally completed path for bridging the condenser 829 across the windings 824 of the repeating coil 823. Also the dry relay R850 completes, at the contacts 854, a circuit, including the contacts 841, for operating the control relay R860. Upon operating the control relay R860 interrupts, at the contacts 861 and 863, the normal connections between the upper winding of the tone relay R870 and the upper and lower windings of the supervisory relay R875 and the windings 825 of the repeating coil 823; and completes, at the contacts 862 and 864, a connection, including the contacts 826, between the upper winding of the dry relay R850 and the windings 825 of the repeating coil 823. Also the control relay R860 completes, at the contacts 865, a multiple holding circuit, including the contacts 895 and 841, for energizing the lower winding of the dry relay R850; and completes, at the contacts 867, a path for applying ground potential by way of the lower winding of the test relay R890 to the control wiper 804 of the Strowger mechanism 801. At this time, the toll transmission selector 800 has been seized and is conditioned to respond to the first digit received over the trunk 420.

Now assuming that the present call initiated at the toll board 220 in the distant office 10 is to be extended to the called subscriber substation T201 in the central office 20 directly from the toll transmission selector 800 to a combination connector, the operator at the toll board 220 dials the proper digits comprising the digits 2, 4, X and X; the first digit 2 and the second digit 4 indicating the route mentioned and the third and fourth digits identifying the line terminal before the combination connector of the subscriber line 202 extending to the called subscriber substation T201. More particularly, when the first digit 2 is dialed at the calling toll board 220 in the distant office 10, battery potential is removed from and ground potential is applied to the simplex of the toll line 210 upon each impulse of the first digit 2; whereby the signal relay R385 in the toll line circuit 400 follows. Each time the signal relay R385 restores and then reoperates, it interrupts and then recompletes, at the contacts 386, the circuit for maintaining operated the pulse relay R470; whereby the latter relay follows. Each time the pulse relay R470 restores and then reoperates, it interrupts and then recompletes, at the contacts 473, the circuit for maintaining operated the hold relay R485; whereby the latter relay is retained in its operated position during impulsing as it is of the slow-to-release type. The first time the pulse relay R470 restores and then reoperates, it completes and then interrupts, at the contacts 472, a circuit, including the contacts 460, for operating the dial relay R480; whereby the latter relay operates and remains operated during impulsing as it is of the slow-to-release type. Upon operating the dial relay R480 completes, at the contacts 482, a path, including the contacts 466 and 462, the resistor 483, and the line conductor C421 of the trunk 420, for short-circuiting the right-hand winding 396 of the repeating coil 395 in order to improve impulsing over the line conductors C422 and C421 of the trunk 420. Also each time the pulse relay R470 restores and then reoperates, it interrupts and then recompletes, at the contacts 471, the loop circuit extending between the left-hand winding of the answer relay R475 in the toll line circuit 400 and the upper and lower windings of the line relay R825 in the toll transmission selector 800; whereby the line relay R825 follows.

Each time the line relay R825 in the toll transmission selector 800 restores and then reoperates, it interrupts and then recompletes, at the contacts 827, the circuit for maintaining operated the hold relay R840; whereby the latter relay is retained in its operated position during impulsing as it is of the slow-to-release type. Also each time the line relay R825 restores and then reoperates, it completes and then interrupts, at the contacts 828, a circuit, including the contacts 818, 842 and 882, for energizing the upper winding of the transfer relay R880 and a multiple circuit for energizing the vertical magnet M807; whereby the transfer relay R880 is retained in its operated position during the first digit 2 as it is of the slow-to-release type and the vertical magnet M807 is operated and restored twice in order to drive the wiper carriage of the Strowger mechanism 801 two steps in the vertical direction. When the wiper carriage of the Strowger mechanism 801 is driven one step in the vertical direction away from its normal vertical position, the sets of switch springs S884 and S885 are operated. More particularly, the set of switch springs S884 is operated to complete a path, including the contacts 843 and 832 for short-circuiting the lower winding of the digit absorbing relay R830. Also the set of switch springs S885 is operated in order to interrupt, at the first contacts thereof, the previously traced circuit for energizing the lower winding of the transfer relay R880. Further, the second contacts of the set of switch springs S885 are closed completing a circuit, including the contacts 841, 899 and 846, the set of switch springs S886 and the contacts 809, for operating the step relay R820; however, without effect at this time.

At the conclusion of the first digit 2, battery potential in the toll line circuit 215 in the distant office 10 is returned to the simplex of the toll line 210 in order to retain operated the signal relay R385 in the toll line circuit 400 in the central office 20. The operated signal relay R385 retains operated the pulse relay R470; whereupon the dial relay R480 restores shortly thereafter, it being of the slow-to-release type. Upon restoring the dial relay R480 interrupts, at the contacts 482, the previously traced path for short-circuiting the right-hand winding 396 of the repeating coil 395. Also the operated pulse relay R470 in the toll line circuit 400 retains operated the line relay R825 in the toll transmission selector 800; whereupon the transfer relay R880 restores shortly thereafter, it being of the slow-to-release type. Also when the wiper carriage of the Strowger mechanism 801 is driven two steps in the vertical direction away from its normal vertical position, the set of switch springs S889 is operated. More particularly, the second contacts of the set of switch springs S889 are closed to prepare a circuit for operating the release magnet M810. Upon restoring the transfer relay R880 completes, at the contacts 883, a circuit, including the contacts 845, MC812, 834 and 897, and the second contacts of the set of switch springs S889, for operating the release magnet M810. Upon operating the release magnet M810 completes, at the contacts MC811, a holding circuit therefor, including the contacts 845 and the set of switch springs S884; and interrupts, at the contacts MC812, the previously traced original operating circuit therefor. Also upon operating the release magnet M810 releases the wiper carriage of the Strowger mechanism 801; whereby it is returned to its normal vertical position reoperating the sets of switch springs S884 and S885 and S889. More particularly, the set of switch springs S884 is operated in order to interrupt the previously traced path for short-circuiting the lower winding of the digit absorbing relay R830; whereupon a series circuit, including the contacts 845, MC811, 843 and 832, is completed for energizing the lower winding of the digit absorbing relay R830 and the release magnet M810; whereupon the digit absorbing relay R830 operates. Upon operating the digit absorbing relay R830 completes, at the contacts 831, a holding circuit, including the contacts 827 and 818, for energizing the upper winding thereof; and interrupts, at the contacts 832, the previously traced series circuit for energizing the lower winding thereof and the release magnet M810. Also when the set of switch springs S884 is operated, the original holding circuit for retaining operated the release magnet M810 is interrupted; and when the set of switch springs S889 is operated, the second contacts thereof are opened, interrupting the original circuit for operating the release magnet M810. Accordingly, the release magnet M810 restores at this time. Also when the set of switch springs S885 is operated, the second contacts thereof are opened interrupting the previously traced circuit for operating the step relay R820 in order to cause the latter relay to restore; and the first contacts of the set of switch springs S885 are closed, recompleting the previously traced circuit for energizing the lower winding of the transfer relay R880 in order to cause the latter relay to reoperate. In view of the foregoing, it will be understood that the toll transmission selector 800 is of the drop-back variety and that such operation thereof proceeds in response to the first digit 2 as a consequence of the set of switch springs S889 being operated when the wiper carriage of the Strowger mechanism 801 is driven two steps in the vertical direction away from its normal vertical position as described above.

The operator at the toll board 220 in the distant office 10 then proceeds to dial the second digit 4; whereby the toll line circuit 400 responds thereto repeating this digit over the trunk 420 to the toll transmission selector 800 in the manner explained above. In this case the wiper carriage of the Strowger mechanism 801 is driven four steps in the vertical direction away from its normal vertical position; whereby the sets of switch springs S884 and S885 are again reoperated. More particularly the set of switch springs S885 is operated to close the second contacts thereof in order to effect operation of the step relay R820 as previously explained. Also at this time, line relay R825, the hold relay R840, the digit absorbing relay R830, the transfer relay R880, the dry relay R850, the control relay R860 and the step relay R820 occupy their operated positions as previously noted. Shortly following the second digit 4, the transfer relay R880 again restores completing, at this time, at the contacts 883, a circuit, including the contacts 845, MC812, 833, and 821, for operating the rotary magnet M808; whereby the wiper carriage of the Strowger mechanism 801 is driven one step in the rotary direction away from its normal rotary position. At this time the wipers 802, etc., of the Strowger mechanism 801 engage the contact set terminating the first trunk in the group, including the trunk 240 extending to the fourth group of combination connectors including the combination connector 235; and the test relay R890 tests the idle or busy condition of the first trunk mentioned.

Assuming that the first trunk mentioned is busy, ground potential appears upon the control conductor thereof completing a path for applying ground potential to the control wiper 804 of the Strowger mechanism 801 in order to complete a path, including the contacts 867, for short-circuiting the lower winding of the test relay R890 preventing operation of the latter relay at this time. Also upon operating, the rotary magnet M808 interrupts, at the contacts 809, the previously traced circuit for operating the step relay R820; whereby the latter relay restores to interrupt, at the contacts 821, a circuit for maintaining operated the rotary magnet M808. Upon restoring the rotary magnet M808 recompletes, at the contacts 809, the circuit for operating the step relay R820; whereby the latter relay upon reoperating recompletes, at the contacts 821, the circuit for operating the rotary magnet M808. Upon reoperating the rotary magnet M808 drives the wiper carriage of the Strowger mechanism 801 an additional step in the rotary direction; whereby the test relay R890 tests the idle or busy condition of the second trunk in the group mentioned, that is selected at this time. This interaction between the step relay R820 and the rotary magnet M808 continues until an idle trunk in the group mentioned is selected by the wiper set or until the wiper carriage of the Strowger mechanism 801 is driven eleven steps in the rotary direction away from its normal rotary position.

Now assuming that the trunk 240 in the group mentioned is the first idle trunk available to the wiper set of the Strowger mechanism 801, when the trunk 240 is selected, battery potential appearing upon the control conductor thereof and appearing upon the control wiper 804 of the wiper set completes a circuit, including the contacts 867, for energizing the lower winding of the test relay R890; whereupon the latter relay operates to complete, at the contacts 890, a holding circuit, including the second contacts of the set of switch springs S885 and the contacts 841, for energizing the upper winding thereof. Also the test relay R890 interrupts, at the contacts 899, a further point in the circuit for operating the step relay R820; whereby interaction of the step relay R820 and the rotary magnet M808 is arrested at this time. Also the test relay R890 completes, at the contacts 891', a path, including the contacts 867, for short-circuiting the lower winding thereof and a multiple path for applying direct ground potential to the control wiper 804 of the wiper set and consequently to the control conductor of the trunk 240 extending to the combination connector 235. Also the test relay R890 completes, at the contacts 892', a path, including the contacts 811' and 855 for applying ground potential to the EC wiper 805 of the wiper set and consequently to the EC conductor of the trunk 240. Further the test relay R890 completes, at the contacts 898, a path, including the contacts 871', for applying ground potential to the tone start conductor C976; and interrupts, at the contacts 895, the previously traced holding circuit for energizing the lower winding of the dry relay R850; however, the latter relay is retained in its operated position at this time by virtue of a completed holding circuit for energizing the upper winding thereof as explained more fully below. Further, the test relay R890 completes, at the contacts 891 and 892, a loop circuit, including the upper winding of the dry relay R850, to the combination connector 235. This loop circuit extends from the negative line conductor of the trunk 240 by way of the negative line wiper 802 of the wiper set. The contacts 891, 813, 852 and 862, the upper winding of the dry relay R850, the contacts 826 and 864, the lower winding 825 of the repeating coil 823, the contacts 816 and 892 and the positive line wiper 803 of the wiper set to the positive line conductor of the trunk 240; whereby a loop circuit, including the windings of the line relay in the combination connector 235 and the upper winding of the dry relay R850 is completed. Accordingly, the dry relay R850 is retained in its operated position and the combination connector 235 is seized; whereby it is conditioned to be responsive to the next two digits transmitted over the trunk 240.

The operator at the toll board 220 in the distant office 10 then dials the third and fourth digits; whereby they are transmitted over the toll line 210 and repeated by the toll line circuit 400 to the toll transmission selector 800. During the third digit, the first time the line relay R825 restores, it interrupts, at the contacts 827, the holding circuit for energizing the upper winding of the digit absorbing relay R830 in order to cause the latter relay to restore. Also during the third and fourth digits, each time the line relay R825 restores and then reoperates, it completes and then interrupts, at the contacts 823, the previously traced loop circuit extending between the upper winding of the dry relay R850 in the toll transmission selector 800 and the line relay in the combination connector 235; whereby the dry relay R850 is retained in its operated position during impulsing since it is of the combination slow-to-operate and slow-to-release type. The line relay in the combination connector 235 follows the third and fourth digits in order to effect operation thereof to select the subscriber line 202 extending to the called subscriber substation T201 in the central office 20. The subsequent operation of the combination connector 235 depends upon the idle or busy condition of the called subscriber substation T201 at this time. When the combination connector 235 operates to select the subscriber line 202 as previously explained, the line circuit 203 is operated in order to mark the subscriber line 202 as busy to the other connectors having access thereto.

First assuming that the called subscriber substation T201 is idle at this time, the combination connector 235 switches through in order to complete a dry loop between the called subscriber substation T201 via the subscriber line 202 and the trunk 240 to the upper winding of the dry relay R850 in the toll transmission selector 800; whereby the upper winding of the dry relay R850 is deenergized causing the latter relay to restore shortly thereafter, it being of the combination slow-to-operate and slow-to-release type. Upon restoring the dry relay R850 interrupts, at the contacts 854, the previously traced circuit for maintaining operated the control relay R860; whereby the latter relay restores shortly thereafter, it being of the slow-to-release type. Also upon restoring, the dry relay R850 interrupts, at the contacts 855, the previously traced path for applying ground potential to the EC wiper 805 of the wiper set; whereby ground potential is removed from the EC conductor of the trunk 240 causing the combination connector 235 to institute the ringing operation; whereby ringing current therefrom is projected over the subscriber line 202 to the called subscriber substation T201. Also upon restoring the dry relay R850 interrupts, at the contacts 852, the path for short-circuiting the upper winding 825 of the repeating coil 823; reconnects, at the contacts 851, the condenser 878 to the windings 825 of the repeating coil 823; and reconnects, at the contacts 853, the condenser 829 to the windings 824 of the repeating coil 823. When the control relay R860 restores, it interrupts, at the contacts 867, the previously traced path for short-circuiting the lower winding of the test relay R890; and completes, at the contacts 868, a path, including the contacts 811' and 892', for reapplying ground potential to the EC wiper 805 of the wiper set and consequently to the EC conductor of the trunk 240 extending to the combination connector 235. Further, the control relay R860 interrupts, at the contacts 862 and 864, the connection between the upper winding of the dry relay R850 and the windings 825 of the repeating coil 823; and recompletes, at the contacts 861 and 863, the normal connections between the upper winding of the tone relay R870 and the upper and lower windings of the supervisory relay R875 and the windings 825 of the repeating coil 823. At this time, battery potential is connected by way of the upper winding of the supervisory relay R875, the upper winding of the tone relay R870, the contacts 861, the upper winding 825 of the repeating coil 823, the contacts 813 and 891 and the negative line wiper 802 of the wiper set to the negative line conductor of the trunk 240; and ground potential is connected by way of the lower winding of the supervisory relay R875, the contacts 863, the lower winding 825 of the repeating coil 823, the contacts 816 and 892 and the positive line wiper 803 of the wiper set to the positive line conductor of the trunk 240; the negative and positive line conductors of the trunk 240 being connected through by the combination connector 235 to the line conductors of the subscriber line 202 extending to the called subscriber substation T201.

When the call is answered at the called subscriber substation T201, the above traced loop circuit for energizing in series the upper winding of the tone relay R870 and the upper and lower windings of the supervisory relay R875 is completed; whereby the relays mentioned operate. Upon operating the tone relay R870 completes, at the contacts 874, a holding circuit, including the contacts 841, for energizing the lower winding thereof; and completes, at the contacts 873, a path for short-circuiting the upper winding thereof. Also upon operating the tone relay R870 first completes, at the contacts 871, and then interrupts, at the contacts 872, a connection, including the condenser 879 and the contacts 891 between the intercept tone conductor C824 and the negative line wiper 802 of the wiper set; whereby a splash of intercept tone is returned over the loop circuit to the called subscriber substation T201 in order to indicate to the subscriber thereat that the call is a toll call. Upon operating the supervisory relay R875 completes, at the contacts 876, a multiple holding circuit, including the contacts 841, for energizing the lower winding of the tone relay R870; and completes, at the contacts 877, a path, including the second contacts of the set of switch springs S887 for applying ground potential to the EC conductor C424 of the trunk 420, thereby to complete a circuit, including the contacts 463, for operating the supervisory relay R430 in the toll line circuit 400. Upon operating the supervisory relay R430 interrupts, at the contacts 431, a normally completed termination circuit, including the resistor 437, the condenser 436 and the contacts 443 and 476 across the windings 396 of the repeating coil 395. Further, the supervisory relay R430 interrupts, at the contacts 433, the previously traced path for applying ground potential by way of the intermediate winding of the signal relay R385 to the simplex conductor C388; and completes, at the contacts 432, a path, including the impedance element 387 and the intermediate winding of the signal relay R385 for applying battery potential by way of the resistor 478 to the simplex conductor C388; whereby the signal relay R385 is retained in its operated position and a signal relay in the toll line circuit 215 in the distant office 10 is operated in order to extinguish the front supervisory lamp in the cord circuit in use at the toll board 220 connected to the trunk 216; whereby the operator at the toll board 220 is rendered answer supervision. At this time the established connection is completed between the calling toll board 220 in the distant office 10 and the called subscriber substation T201 in the central office 20 via the trunk 216, the toll line circuit 215, the toll line 210, the toll line circuit 400, the trunk 420, the toll transmission selector 800, the trunk 240, the combination connector 235 and the subscriber line 202. The operator at the calling toll board 220 then advises the subscriber at the called subscriber substation T201 that there is a toll call for him, completes the connection to the calling circuit, and then retires from the established connection.

The subscriber at the called subscriber substation T201 may render switchhook supervision to the operator at the calling toll board 220 by operating the associated switchhook; whereby the supervisory relay R875 in the toll transmission selector 800 follows. Each time the supervisory relay R875 restores and then reoperates, it interrupts and then recompletes, at the contacts 877, the previously traced circuit for maintaining operated the supervisory relay R430 in the toll line circuit 400; whereby the latter relay follows. Each time the supervisory relay R430 restores, it changes, at the contacts 432 and 433, battery potential to ground potential upon the simplex conductor C388; and each time the supervisory relay R430 operates, it changes, at the contacts 433 and 432, ground potential to battery potential upon the simplex conductor C388; whereupon the signal relay R385 in the toll line circuit 400 is retained in its operated position while the signal relay in the toll line circuit 215 follows. As the signal relay in the toll line circuit 215 follows, the front supervisory lamp in the cord circuit in use is flashed rendering switchhook supervision to the operator at the toll board 220. The operator at the toll board 220 may then re-enter the connection and converse with the subscriber at the called subscriber substation T201.

At the conclusion of the established connection, when the subscriber at the called subscriber substation T201 disconnects, the loop circuit extending therefrom to the upper and lower windings of the supervisory relay R875 in the toll transmission selector 800 is interrupted; whereupon the latter relay restores to interrupt, at the contacts 877, the previously traced circuit for maintaining operated the supervisory relay R430 in the toll line circuit 400. Upon restoring the supervisory relay R430 changes, at the contacts 432 and 433, battery to ground potential upon the simplex conductor C388; whereby the signal relay R385 in the toll line circuit 400 is retained in its operated position and the signal relay in the toll line circuit 215 restores. Upon restoring the signal relay in the toll line circuit 215 illuminates the front supervisory lamp in the cord circuit at the toll board 220, thereby to render to the operator thereat, disconnect supervision.

In order to release the established connection, the operator at the toll board 220 withdraws the front plug of the cord circuit in use from the jack terminating the trunk 216; whereby the toll line circuit 215 is controlled to remove battery potential and to reapply ground potential to the simplex of the toll line 210 in order to deenergize the intermediate winding of the signal relay R385 in the toll line circuit 400 causing the latter relay to restore. Upon restoring, the signal relay R385 interrupts, at the contacts 386, the circuit for maintaining operated the pulse relay R470. Upon restoring the pulse relay R470 interrupts, at the contacts 471, the loop circuit extending between the left-hand winding of the answer relay R475 in the toll line circuit 400 and the line relay R825 in the toll transmission selector 800 in order to cause the line relay R825 to restore. Also upon restoring the pulse relay R470 interrupts, at the contacts 473, the circuit for maintaining operated the hold relay R485; whereby the latter relay restores shortly thereafter, it being of the slow-to-release type. Upon restoring the hold relay R485 interrupts, at the contacts 486, the circuit for maintaining operated the switch relay R460. Upon restoring the switch relay R460 interrupts, at the contacts 461, 462, 463, and 465, the connections in the toll line circuit 400 to the conductors of the trunk 420 extending to the toll transmission selector 800; and recompletes, at the contacts 467 and 469, the normal connection between the winding of the re-ring relay R455 and the windings 396 of the repeating coil 395. Also the hold relay R485 interrupts, at the contacts 487, the circuit for energizing the right-hand winding of the answer relay R475; whereby the latter relay is retained in its restored position. Further, the hold relay R485 interrupts, at the contacts 488, the previously traced circuit for illuminating the busy lamp L379 associated with the jack J378 terminating the trunk 410 at the toll board 300 in order to indicate to the operator thereat that the toll line 210 is idle at this time.

Upon restoring the line relay R825 in the toll transmission selector 800 interrupts, at the contacts 827, the circuit for maintaining operated the hold relay R840; whereby the latter relay restores shortly thereafter, it being of the slow-to-release type. Upon restoring the hold relay R840 interrupts, at the contacts 841, the holding circuit for energizing the upper winding of the test relay R890 in order to cause the latter relay to restore. Also the hold relay R840 completes, at the contacts 844, a circuit, including the contacts 819, and the set of switch springs S884, for operating the release magnet M810; whereby the release magnet M810 upon operating, releases the wiper set of the Strowger mechanism 801 and causes it to be returned to its normal rotary and vertical positions. When the Strowger mechanism 801 is thus released, the sets of switch springs S884 and S885 are operated. More particularly, the set of switch springs S884 is operated to interrupt the above traced circuit for operating the release magnet M810. When the toll transmission selector 800 is thus released, ground potential is removed from the control conductor of the trunk 240 in order to bring about the release of the combination connector 235; whereupon battery potential therein is returned to the control conductor of the trunk 240 in order to mark the combination connector 235 as idle to the toll transmission selectors 800, etc., having access thereto. When the combination connector 235 is thus released, the line circuit 203 is operated in order to return battery potential to the control conductor of the subscriber line 202 in order to mark it as idle to the connectors having access thereto. At this time the established connection between the calling toll board 220 in the distant office 10 and the called subscriber substation T201 in the central office 20 is released and all of the apparatus involved therein is completely released and available for further use.

Reconsidering the extension of the connection from the calling toll board 220 in the distant office 10 to the called subscriber substation T201 in the central office 20, the combination connector 235, after responding to the fourth digit, may test the called subscriber substation T201 as busy. In this case, the combination connector 235 operates to dry the loop extending from the line relay therein back over the trunk 240 to the upper winding of the dry relay R850 in the toll transmission selector 800 and to cause 60 ground impulses per minute to be applied to the negative line conductor of the trunk 240. When the loop mentioned is dried by the combination connector 235, the dry relay R850 in the toll transmission selector 800 restores shortly thereafter, effecting restoration of the control relay R860 shortly thereafter; whereupon the supervisory relay R875 and the tone relay R870 are reconnected to the windings 825 of the repeating coil 823 in the manner previously explained. At this time each time ground potential is applied to the negative line conductor of the trunk 240, a circuit substantially identical to that previously traced is completed for energizing the upper winding of the supervisory relay R875; whereby the latter relay follows 60 times per minute repeating, at the contacts 877, to the supervisory relay R430 in the toll line circuit 400. The supervisory relay R430 follows repeating, at the contacts 432 and 433, over the simplex conductor C388; whereby the signal relay R385 in the toll line circuit 400 is retained in its operated position while the signal relay in the toll line circuit 215 follows. The signal relay in the toll lines circuit 215 brings about flashing 60 times per minute of the front supervisory lamp in the cord circuit at the toll board 220, indicating to the operator thereat that the called subscriber substation T201 in the central office 20 is busy at this time. Upon receiving busy supervision, the operator at the toll board 220 withdraws the front plug of the cord circuit from the jack terminating the trunk 216 in order to bring about the release of the apparatus involved in the connection thus far extended in a manner substantially identical to that previously explained.

Again reconsidering the extension of the connection from the calling toll board 220 in the distant office 10 to the called subscriber substation T201 in the central office 20, the toll transmission selector 800, after responding to the second digit 4, may find that all of the trunks in the group, including the trunk 240, are busy at this time. In this event, the step relay R820 and the rotary magnet M808 in the toll transmission selector 800 interact in the manner previously explained in order to drive the wiper carriage of the Strowger mechanism 801 eleven steps in the rotary direction away from its normal rotary position; whereupon the sets of switch springs S886 and S887 are operated. More particularly, the set of switch springs S886 is operated to open the previously traced circuit for operating the step relay R820; whereby the latter relay may not reoperate to complete, at the contacts 822, the holding circuit for energizing the winding thereof. Since the step relay R820 may not be reoperated, further operation of the rotary magnet M808 is arrested. The set of switch springs S887 is operated to open the second contacts thereof, and to close the first contacts thereof; whereby the 120 impulses per minute conductor C823 is connected to the EC conductor C424 of the trunk 420; whereupon the supervisory relay R430 in the toll line circuit 400 follows repeating, at the contacts 432 and 433, the 120 impulses per minute over the simplex conductor C388, causing the signal relay R385 in the toll line circuit 400 to be retained in its operated position and causing the signal relay in the toll line circuit 215 to follow. The signal relay in the toll line circuit 215 effects flashing at 120 times per minute of the front supervisory lamp associated with the cord circuit at the toll board 220 in order to indicate to the operator thereat that the toll transmission selector 800 has encountered an all-trunks-busy condition in the central office 20. When the operator at the toll board 220 receives all-trunks-busy supervision, she withdraws the front plug of the cord circuit from the jack terminating the trunk 216 extending to the toll line circuit 215, thereby to bring about the release of the apparatus involved in the connection thus far extended in a manner substantially identical to that previously described.

*Sect. 6.—A call from the toll board in the distant office to a subscriber substation in the central office routed from a toll transmission selector through an auxiliary toll selector to a combination connector*

Again assume that a call is initiated at the toll board 220 in the distant office 10 by the operator thereat and that the toll transmission selector 800 in the central office 20 is again seized via the trunk 420, the toll line circuit 400, the toll line 210, the toll line circuit 215, the trunk 216 and the cord circuit at the toll board 220; all in the manner explained in Sect. 5. Now assuming that the present call is to be extended to the called subscriber substation T201 in the central office 20 from the toll transmission selector 800, through an auxiliary toll selector to a combination connector, the operator at the toll board 220 dials the proper number comprising the digits 1, 4, X and X; the first digit 1 and the second digit 4 indicating the route mentioned and the third and fourth digits identifying the line terminal before the combination connector of the subscriber line 202 extending to the called subscriber substation T201. The first digit 1 received by the toll line circuit 400 is repeated to the toll transmission selector 800 in the manner previously explained; whereby the wiper carriage of the Strowger mechanism 801 is driven one step in the vertical direction. Shortly following the first digit 1, the transfer relay R880 restores to complete, at the contacts 883, in the present case, a circuit, including the contacts 845, MC812, 834 and 897, the first contacts of the set of switch springs S889 and the contacts 866 for energizing the upper winding of the digit absorbing relay R830; whereby the latter relay operates. The above traced circuit for energizing the upper winding of the digit absorbing relay R830 is completed, at the conclusion of the first digit 1, when the transfer relay R880 restores, in the present case, since the set of switch springs S889 is not operated. Upon operating the digit absorbing relay R830 completes, at the contacts 831, the previously traced holding circuit for energizing the upper winding thereof and completes, at the contacts 833, the previously traced circuit for operating the rotary magnet M808, since the step relay R820 already occupies its operated position. Also the set of switch springs S884 and S885 are operated when the wiper carriage of the Strowger mechanism 801 is driven one step in the vertical direction as explained in Sect. 5. Upon operating the rotary magnet M808 drives the wiper carriage of the Strowger mechanism 801 one step in the rotary direction away from its normal rotary position; whereupon the test relay R890 tests the first trunk in the group, including the trunk 710, in order to determine the idle or busy condition thereof. Continued interaction of the step relay R820 and the rotary magnet M808 depends upon the idle or busy condition of the trunks in the selected group, including the trunk 710, as explained in Sect. 5.

Assuming that the trunk 710 extending to the ringing control circuit 700 is the first idle trunk in the selected group, when the trunk 710 is selected by the wiper set, the test relay R890 operates in order to arrest operation of the step relay R820 and the rotary magnet M808 as explained in Sect. 5. The trunk 710 is marked as idle by the presence of battery potential upon the control conductor C713 thereof; the path mentioned including the control conductor C723 of the trunk 720 extending between the ringing control circuit 700 and the auxiliary toll selector 600, the second contacts of the set of switch springs S676, the contacts 626′ and the upper winding of the transfer relay R680 in the auxiliary toll selector 600, and extending to battery potential. Accordingly, when the test relay R890 in the toll transmission selector 800 operates direct ground potential is applied via the contacts 891′ and the control wiper 804 of the wiper set to the control conductor C713 of the trunk 710, thereby to mark the trunk 710 as busy to other toll transmission selectors having access thereto and to complete a circuit substantially identical to that previously traced for energizing the upper winding of the transfer relay R680 in the auxiliary toll selector 600, in order to cause the latter relay to operate. Also the test relay R890 in the toll transmission selector 800 completes, at the contacts 891 and 892, a loop circuit for energizing the upper winding of the dry relay R850 in series with the upper and lower windings of the line relay R630 in the auxiliary toll selector 600; whereupon the latter relay operates. The loop circuit mentioned extends from battery potential by way of the upper winding of the line relay R630, the contacts 661, the line conductor C721 of the trunk 720, the contacts 785 and the line conductor 711 of the trunk 710 to the negative line wiper 802 of the wiper set of the Strowger mechanism 801 in the toll transmission selector 800; and from ground potential by way of the lower winding of the line relay R630, the contacts 663, the line conductor C722 of the trunk 720, the contacts 782 and the line conductor C712 of the trunk 710 to the positive line wiper 803 of the wiper set of the Strowger mechanism 801 in the toll transmission selector 800; whereby the dry relay R850 in the toll transmission selector 800 is retained in its operated position. Further, the test relay R890 in the toll transmission selector 800 completes, at the contacts 892′, a path, including the contacts 855, 811′ and the EC wiper 805 of the wiper set of the Strowger mechanism 801 for applying ground potential to the EC conductor C714 of the trunk 710, which is extended by way of the contacts 788 to the EC conductor C724 of the trunk 720 extending to the auxiliary toll selector 600. Finally, the test relay R890 in the toll transmission selector 800 completes, at the contacts 893, a path for applying battery potential by way of the upper winding of the toll relay R810 and the EC1 wiper of the wiper set of the Strowger mechanism 801 to the EC1 conductor C715 of the trunk 710, which is connected to the EC1 conductor C725 of the trunk 720 extending to the auxiliary toll selector 600. Accordingly, at this time, the toll transmission selector 800 has responded to the first digit 1 to select the trunk 710 extending to the ringing control circuit 700 and consequently the trunk 720 extending from the ringing control circuit 700 to the auxiliary toll selector 600 and consequently the auxiliary toll selector 600. More particularly, upon operating the line relay R630 in the auxiliary toll selector 600 completes, at the contacts 631, a circuit, including the contacts 663', for operating the hold relay R650; whereupon the latter relay, upon operating, completes, at the contacts 653, a multiple path for applying ground potential to the control conductor C723 of the trunk 720 and consequently a multiple holding circuit identical to that previously traced for energizing the upper winding of the transfer relay R680. At this time the auxiliary toll selector 600 has been seized and is conditioned to respond to the next digit transmitted over the trunk 720.

The operator at the toll board 220 in the distant office 10 then dials the second digit 4; whereby the toll line circuit 400 responds thereto repeating over the trunk 420 to the toll transmission selector 800 in the manner explained in Sect. 5. More particularly, the line relay R825 in the toll transmission selector 800 follows repeating, at the contacts 826 over the loop circuit extending between the dry relay R850 and the line relay R630 in the auxiliary toll selector 600; whereby the latter relay follows. Each time the line relay R630 restores and then reoperates, it interrupts and then recompletes, at the contacts 631, the circuit for maintaining operated the hold relay R650; whereby the latter relay is retained in its operated position during impulsing as it is of the slow-to-release type. Also each time the line relay R630 restores and then reoperates, it completes and then interrupts, at the contacts 632, a circuit, including the contacts 663', 655 and 681' for energizing the lower winding of the transfer relay R680 and a multiple circuit, also including the contacts 649, for operating the vertical magnet M696; whereby the transfer relay R680 remains in its operated position during impulsing as it is of the slow-to-release type, and the vertical magnet M696 is operated intermittently to drive the wiper carriage of the Strowger mechanism 690 step by step in the vertical direction away from its normal vertical position. When the wiper carriage of the Strowger mechanism 690 is driven one step in the vertical direction away from its normal vertical position, the sets of switch springs S676 and S677 are operated. More particularly, the set of switch springs S676 is operated to open the second contacts thereof in order to interrupt the previously traced circuit for energizing the upper winding of the transfer relay R680. Also the first contacts of the set of switch springs S676 are closed, thereby to complete a circuit, including the contacts 653, 668, 651, 621' and 640, the set of switch springs S679 and the contacts 698, for operating the step relay R685. Upon operating the step relay R685 completes, at the contacts 687, a point in multiple to the set of switch springs S679 in the operating circuit therefor. The set of switch springs S677 is operated to prepare a circuit traced hereinafter for operating the release magnet M699.

At the conclusion of the second digit 4, the signal relay R385 and the pulse relay R470 in the toll line circuit 400 are retained in their operated positions retaining operated the line relay R825 in the toll transmission selector 800; whereby the latter relay retains operated the line relay R630 in the auxiliary toll selector 600; whereupon the transfer relay R680 restores shortly thereafter, it being of the slow-to-release type. Also at the conclusion of the second digit 4, the wiper carriage of the Strowger mechanism 690 occupies its fourth vertical step bringing about operation of the set of switch springs S634; whereupon a circuit, including the contacts 653, is completed for operating the cut-out relay R670. Upon operating the cutout relay R670 interrupts, at the contacts 673, a circuit traced hereinafter for energizing the winding of the control relay R640 in order to prevent operation of the latter relay in the present example. When the transfer relay R680 restores as noted above, it completes, at the contacts 684, a circuit, including the contacts 615 and 686, for operating the rotary magnet M697; whereby the wiper carriage of the Strowger mechanism 690 is driven one step in the rotary direction. At this time ground potential is applied by way of the contacts 646 and 652 and via the lower winding of the test relay R660 to the control wiper 693; whereby the test relay R660 tests the first trunk in the group, including the trunk 240, in order to determine the idle or busy condition thereof. In the event the first trunk mentioned is busy, ground potential appears upon the control conductor thereof completes a path substantially identical to that traced above for short-circuiting the lower winding of the test relay R660; whereby the step relay R685 and the rotary magnet M697 interact. More particularly, upon operating, the rotary magnet M697 interrupts, at the contacts 698, the holding circuit for maintaining operated the step relay R685; whereupon the latter relay restores to interrupt, at the contacts 686, the circuit for operating the rotary magnet M697. The rotary magnet M697 then restores to recomplete, at the contacts 698, the original operating circuit for the step relay R685; whereby the latter relay, upon operating, recompletes, at the contacts 686, the circuit for operating the rotary magnet M697. Assuming that the trunk 240 is the first idle trunk in the group mentioned, the rotary magnet M697 and the step relay R685 continue the above described interaction until the wiper set of the Strowger mechanism 690 selects the idle trunk 240 extending to the combination connector 235; whereupon battery potential appearing upon the control conductor of the trunk 240 completes a circuit substantially identical to that previously traced for energizing the lower winding of the test relay R660 in order to cause the latter relay to operate. Upon operating the test relay R660 interrupts, at the contacts 668, the previously traced circuit for operating the step relay R685 in order to arrest further interaction between the step relay R685 and the rotary magnet M697. Also the test relay R660 completes, at the contacts 669, a holding circuit, including the first contacts of the set of switch springs S676 and the grounded hold conductor C723 of the trunk 720, for energizing the upper winding thereof. Further, the test relay R660 completes, at the contacts 660, a path, including the contacts 652 and 646, for short-circuiting the lower winding thereof and a multiple path for applying direct ground potential to the control wiper 693 of the wiper set and consequently to the control conductor of the trunk 240 extending to the combination connector 235. Also the test relay R660 interrupts, at the contacts 663', the circuit for maintaining operated the hold relay R650; whereby the latter relay restores shortly thereafter, it being of the slow-to-release type. Further, the test relay R660 completes, at the contacts 662', a path for applying ground potential to the interrupter start conductor C675; interrupts, at the contacts 661 and 663, the previously traced loop circuit between the upper and lower windings of the line relay R630 in the auxiliary toll selector 600 and the upper winding of the dry relay R850 in the toll transmission selector 800; and completes, at the contacts 662 and 664, a connection between the line conductors C721 and C722 of the trunk 720 and the line wipers 691 and 692 of the wiper set of the Strowger mechanism 690 and consequently the line conductor of the trunk 240, whereby an alternative loop circuit is completed for energizing the upper winding of the dry relay R850 in the toll transmission selector 800 in series with the windings of the line relay in the combination connector 235 terminating the trunk 240. Finally, the test relay R660 completes, at the contacts 665, a connection between the grounded EC conductor C724 of the trunk 720 and the EC wiper 694 of the wiper set of the Strowger mechanism 690 and consequently the EC conductor of the trunk 240 extending to the combination connector 235. Accordingly, at this time the auxiliary selector 600 has operated to seize the combination connector 235 over the trunk 240 and has switched through in order to provide a direct loop circuit between the upper winding of the dry relay R850 in the toll transmission selector 800 and the line relay in the combination connector 235; whereupon the combination connector 235 is conditioned to be responsive to the next two digits transmitted over the trunk 240.

The operator at the toll board 220 in the distant office 10 then dials the third and fourth digits; whereby they are transmitted over the toll line 210 and repeated by the toll line circuit 400 to the toll transmission selector 800. The line relay R825 in the toll transmission selector 800 repeats the third and fourth digits at the contacts 826 over the loop circuit extending between the upper winding of the dry relay R850 and the line relay in the combination connector 235 via the trunk 710, the ringing control circuit 700, the trunk 720, the auxiliary toll selector 600 and the trunk 240; whereby the combination connector 235 is operated to select the subscriber line 202 extending to the called subscriber substation T201 in the central office 20. The subsequent operation of the combination connector 235 depends upon the idle or busy condition of the called subscriber substation T201 at this time. When the combination connector 235 operates to select the subscriber line 202 as previously explained, the line circuit 203 is operated in order to mark the subscriber line 202 as busy to the connectors having access thereto.

First assuming that the called subscriber substation T201 is idle at this time, the combination connector 235 switches through in order to complete a dry loop between the called subscriber substation T201 via the subscriber line 202 and the trunk 240, the auxiliary toll selector 600, the trunk 720, the ringing control circuit 700 and the trunk 710 to the upper winding of the dry relay R850 in the toll transmission selector 800; whereby the latter relay restores shortly thereafter, it being of the slow-to-release type. Upon restoring the dry relay R850 effects the restoration of the control relay R860 shortly thereafter; whereby ground potential is removed at the contacts 855, and later replaced, at the contacts 868, with respect to the EC wiper 805 of the wiper set of the Strowger mechanism 801 and consequently with respect to the EC conductor of the trunk 240 extending to the combination connector 235; whereby the combination connector 235 institutes the ringing operation projecting ringing current therefrom over the subscriber line 202 to the called subscriber substation T201. Also upon restoring the dry relay R850 connects the tone relay R870 and the supervisory relay R875 through to the line conductors of the subscriber line 202; whereupon the tone relay R870 and the supervisory relay R875 are operated when the call is answered at the called subscriber substation T201 as explained in Sect. 5. Upon operating the tone relay R870 causes a splash of intercept tone to be transmitted over the connection to the called subscriber substation T201 in order to indicate to the subscriber thereat that the present call is a toll call. Upon operating the supervisory relay R875 effects operation of the supervisory relay R430 in the toll line circuit 400; whereby ground potential is changed to battery potential upon the simplex conductor C388 in order to maintain operated the signal relay R385 in the toll line circuit 400 and to effect operation of the signal relay in the toll line circuit 215; whereupon the front supervisory lamp associated with the cord circuit at the toll board 220 is extinguished in order to render to the operator thereat answer supervision. At this time, an established connection is completed between the calling toll board 220 in the central office 10 and the called subscriber substation T201 in the central office 20 via the trunk 216, the toll line circuit 215, the toll line 210, the toll line circuit 400, the trunk 420, the toll transmission selector 800, the trunk 710, the ringing control circuit 700, the trunk 720, the auxiliary toll selector 600, the trunk 240, the combination connector 235 and the subscriber line 202. The operator at the calling toll board 220 then advises the subscriber at the called subscriber substation T201 that there is a toll call for him, completes the connection to the calling circuit, and then retires from the established connection.

The subscriber at the called subscriber substation T201 may render switchhook supervision to the operator at the calling toll board 220 by operating the associated switchhook; all in a manner identical to that described in Sect. 5. Also at the conclusion of the established connection, when the subscriber at the called subscriber substation T201 disconnects, the supervisory relay R875 in the toll transmission selector 800 restores in order to govern the supervisory relay R430 in the toll line circuit 400; whereupon the signal relay in the toll line circuit 215 is controlled in order to render to the operator at the toll board 220 disconnect supervision.

In order to release the established connection, the operator at the toll board 220 withdraws the front plug of the cord circuit in use from the jack terminating the trunk 216 in order to bring about the release of the toll transmission selector 800, the toll line circuit 400, and the toll line circuit 215; all in the manner explained in Sect. 5. When the toll transmission selector 800 is thus released, ground potential is removed from the control conductor C713 of the trunk 710 and consequently from the control conductor C723 of the trunk 720, thereby to interrupt the previously traced holding circuit for energizing the upper winding of the test relay R660 in order to cause the latter relay to restore, and to interrupt the circuit for maintaining operated the cut-out relay R670. Upon restoring the test relay R660 completes, at the contacts 663', a circuit, including the contacts 632 and 656 and the set of switch springs S677, for operating the release magnet M699; whereby the wiper carriage of the Strowger mechanism 690 is released and returned to its normal rotary and vertical positions. When the wiper carriage of the Strowger mechanism 690 is thus released, the sets of switch springs S634, S676 and S677 are operated. More particularly, the set of switch springs S677 is operated to open the circuit for operating the release magnet M699. When the auxiliary toll selector 600 is thus released, the combination connector 235 is released, bringing about operation of the line circuit 203 to mark the subscriber line 202 as idle to the connectors having access thereto. At this time the established connection between the calling toll board 220 in the distant office 10 and the called subscriber substation T201 in the central office 20 is released and all of the apparatus involved therein is completely released and available for further use.

Reconsidering the extension of the connection from the calling toll board 220 in the distant office 10 to the called subscriber substation T201 in the central office 20, the combination connector 235, after responding to the fourth digit, may test the subscriber substation T201 as busy. In this case, the combination connector 235 operates to dry the loop extending from the line relay therein back over the connection to the upper winding of the dry relay R850 in the toll transmission selector 800 and to cause 60 ground impulses per minute to be applied to the negative line conductor of the trunk 240. The toll transmission selector 800 then responds to govern the toll line circuit 400; whereby the toll line circuit 215 is controlled in order to render line busy supervision to the operator at the toll board 220; all in the manner explained in Sect. 5.

Again reconsidering the extension of the connection from the calling toll board 220 in the distant office 10 to the called subscriber substation T201 in the central office 20, the toll transmission selector 800, after responding to the first digit 1, may find that all of the trunks in the group, including the trunk 710, are busy at this time. In this event, the step relay R820 and the rotary magnet M808 in the toll transmission selector 800 interact in the manner previously explained in order to drive the wiper carriage of the Strowger mechanism 801 eleven steps in the rotary direction away from its normal rotary position; whereupon the toll transmission selector 800 governs the toll line circuit 400 to control the toll line circuit 215 in order to render all-trunks-busy supervision to the operator at the toll board 220; all in the manner explained in Sect. 5.

Further reconsidering the extension of the connection from the calling toll board 220 in the distant office 10 to the called subscriber substation T201 in the central office 20, the auxiliary toll selector 600, after responding to the second digit 4, may find all of the trunks in the group, including the trunk 240, are busy at this time. In this event, the step relay R685 and the rotary magnet M697 in the auxiliary toll selector 600 interact, in the manner previously explained, in order to drive the wiper carriage of the Strowger mechanism 690 eleven steps in the rotary direction away from its normal rotary position; whereupon the sets of switch springs S678, S679 and S680 are operated. More particularly, the set of switch springs S679 is operated to open the previously traced circuit for operating the step relay R685; whereby the latter relay may not reoperate to complete, at the contacts 687, the holding circuit for energizing the winding thereof. Since the step relay R685 may not be reoperated, further operation of the rotary magnet M697 is arrested. The set of switch springs S678 is operated to complete a circuit, including the contacts 661′, 652, and 646, for energizing the lower winding of the test relay R660 in series with the upper winding of the transfer relay R680; whereby the relays mentioned operate. Upon operating the test relay R660 completes, at the contacts 669, the previously traced holding circuit for energizing the upper winding thereof; and interrupts, at the contacts 661′, the previously traced circuit for energizing the lower winding thereof in series with the upper winding of the transfer relay R680 in order to cause the latter relay to restore in the event complete operation thereof is effected in the transitory time interval mentioned. Also the test relay R660 interrupts, at the contacts 661 and 663, the loop circuit extending between the line relay R630 in the auxiliary toll selector 600 and the dry relay R850 in the toll transmission selector 800; whereupon the relays mentioned restore. Further, the test relay R660 effects the restoration of the hold relay R650; and completes, at the contacts 662 and 664 the previously mentioned connection between the line conductors C721 and C722 of the trunk 720 and the line wipers 691 and 692 of the wiper set of the Strowger mechanism 690. In the toll transmission selector 800, the dry relay R850 upon restoring effects restoration of the control relay R860 shortly thereafter, and the consequent connection of the tone relay R870 and the supervisory relay R875 to the line wipers of the wiper set of the Strowger mechanism 801 in the manner previously explained.

The set of switch springs S680 is operated to complete a connection, including the contacts 662, between the 120 impulse per minute conductor C674 and the negative line conductor C721 of the trunk 720; whereby the previously traced circuit for energizing the upper winding of the supervisory relay R875 is completed causing the latter relay to follow the 120 impulses per minute. The supervisory relay R875 in the toll transmission selector 800 repeats to the supervisory relay R430 in the toll line circuit 400; whereupon the signal relay in the toll line circuit 215 is governed to flash the front supervisory lamp associated with the cord circuit at the toll board 220 at a rate of 120 times per minute in order to render to the operator thereat all-trunks-busy supervision. The operator at the toll board 220 then withdraws the front plug of the cord circuit in use from the jack terminating the trunk 216 in order to effect the release of the apparatus in a manner substantially identical to that previously described.

*Sect. 7.—A call from the toll board in the distant office to the toll board in the central office*

Again assume that a call is initiated at the toll board 220 in the distant office 10 by the operator thereat and that the toll transmission selector 800 in the central office 20 is again seized via the trunk 420, the toll line circuit 400, the toll line circuit 215, the trunk 216, and the cord circuit at the toll board 220; all in the manner explained in Sect. 5. Also assuming that the call from the toll board 220 in the distant office 10 is to be extended to the toll board 300 in the central office 20; the operator at the toll board 220 dials the proper three digit code depending upon the service required. Specifically, the numbers 131, 121 and 111 are dialed in order to obtain respective access to an information trunk circuit, to an inward trunk circuit and to a T. X trunk circuit incoming to the toll board 300. Further assume that the operator at the toll board 220 in the distanct office 10 has dialed the first digit 1 and that the toll transmission selector 800 has responded thereto in order to select the trunk 710 extending via the ringing control circuit 700 and the trunk 720 to the auxiliary toll selector 600 and that the auxiliary toll selector 600 is conditioned to be responsive to the second digit dialed; all in the manner explained in Sect. 6.

Now assuming that the present call is to be routed via an information trunk circuit to the toll board 300, the operator at the toll board 220 proceeds to dial the second and third digits 3 and 1; whereupon the toll line circuit 400 receives the digits mentioned over the toll line 210 and repeats them to the toll transmission selector 800; whereby they are repeated by the toll transmission selector 800 to the auxiliary toll selector 600. More particularly, the line relay R630 in the auxiliary toll selector 600 follows the second digit 3 retaining operated the transfer relay R680 and effecting operation of the vertical magnet M696; all in the manner explained in Sect. 6; whereupon the sets of switch springs S676 and S677 are operated. However, the set of switch springs S634 is not operated in the present case. Accordingly, at the conclusion of the second digit 3, when the transfer relay R680 restores, it completes, at the contacts 681, a circuit, including the contacts 673, 626, 651 and 668, the first contacts of the set of switch springs S676 and the contacts 653, for operating the control relay R640. Upon operating the control relay R640 completes, at the contacts 644, a point in multiple to the contacts 681 in a substantially identical holding circuit for energizing the winding thereof. Also the control relay R640 completes, at the contacts 647, an alternative circuit, including the contacts 653 and 626, for energizing the upper winding of the transfer relay R680 in order to cause the latter relay to reoperate. Further, the control relay R640 interrupts, at the contacts 649, a further point in the circuit for operating the vertical magnet M696; and prepares, at the contacts 648, a circuit traced hereinafter for energizing the lower winding of the control relay R620 in multiple with an alternative circuit for operating the rotary magnet M697. Also the control relay R640 interrupts, at the contacts 640, the circuit for retaining operated the step relay R685; thereby positively to prevent interaction of the step relay R685 and the rotary magnet M697, at this time.

When the third digit 1 is then received, the line relay R630 restores and then reoperates completing and then interrupting, at the contacts 632, the previously traced circuit for energizing the lower winding of the transfer relay R680 in order to retain the latter relay in its operated position during the reception of the third digit. Also the line relay R630 completes and then interrupts, at the contacts 632, the multiple circuit, including the contacts 663', 655, 681', 648 and 628 for energizing the lower winding of the control relay R620 and the multiple circuit, also including the contacts 683, for operating the rotary magnet M697. When the lower winding of the control relay R620 is thus energized, it operates through its first step to complete, at the contacts 627, a circuit, including the contacts 653 and 654, for energizing the upper winding thereof; whereby the latter relay does not operate through its second step at this time as it is of the differential type. However, when the line relay R630 reoperates to interrupt, at the contacts 632, the above traced multiple circuit for energizing the lower winding of the control relay R620 and the rotary magnet M697, the control relay R620 operates through its second step, since only the upper winding thereof is energized at this time. When the control relay R620 operates through its second step, it interrupts, at the contacts 626, the previously traced holding circuit for maintaining operated the control relay R640. Upon restoring the control relay R640 completes, at the contacts 646, the previously traced path, including the contacts 652, for applying ground potential by way of the lower winding of the test relay R660 to the control wiper 693 of the wiper set; whereupon the first trunk in the group, including the trunk 505, is tested in order to determine the idle or busy condition thereof. Also upon restoring the control relay R640 completes, at the contacts 640, a circuit, including the contacts 698, the set of switch springs S679, the contacts 618, 620, 651, and 668, and the first contacts of the set of switch springs S676 and the contacts 653, for operating the step relay R685. Shortly following the conclusion of the third digit 1, the transfer relay R680 restores to complete, at the contacts 684, a circuit, including the contacts 629 and 686, for operating the rotary magnet M697, assuming that the first trunk in the selected group is busy; whereby the step relay R685 and the rotary magnet M697 interact in the manner previously explained.

Assuming that the trunk 505 in the selected group extending to the information trunk circuit 500 is the first idle trunk therein, when the wiper set of the Strowger mechanism 690 selects the trunk 505, the lower winding of the test relay R660 is energized; whereby the latter relay operates. More particularly, battery potential is applied by way of the resistor 547 in the information trunk circuit 500, the contacts 558 and 543 to the control conductor C508 of the trunk 505 in order to complete the circuit mentioned for energizing the lower winding of the test relay R660. Accordingly, the test relay R660 operates to complete, at the contacts 669, the previously traced holding circuit for energizing the upper winding thereof; and to interrupt, at the contacts 668, the previously traced circuit for energizing the winding of the step relay R685; whereupon the latter relay restores to arrest further operation of the rotary magnet M697. Also the test relay R660 switches the line conductors C721 and C722 of the trunk 720 through to the line wipers 691 and 692 of the wiper set of the Strowger mechanism 690 effecting the restoration of the line relay R630 and the consequent restoration of the hold relay R650 shortly thereafter. Also when the control relay R640 restored, as previously explained, it completed, at the contacts 642, a path, including the contacts 623, for applying ground potential to the EC1 conductor C725 of the trunk 720 and consequently to the EC1 conductor C715 of the trunk 710, thereby to complete a circuit, including the EC1 wiper 806 of the wiper set of the Strowger mechanism 801 and the contacts 893, for energizing the upper winding of the toll relay R810 in the toll transmission selector 800; whereupon the latter relay operates. Upon operating the toll relay R810 completes, at the contacts 817, a holding circuit for energizing the lower winding thereof, including the grounded control conductor C423 of the trunk 420. Also, the toll relay R810 interrupts, at the contacts 811 and 814, the previously traced loop circuit extending between the left-hand winding of the answer relay R475 in the toll line circuit 400 and the upper and lower windings of the line relay R825 in the toll transmission selector 800; whereupon the line relay R825 restores. Further the toll relay R810 interrupts, at the contacts 813 and 816, the previously traced loop circuit extending between the upper winding of the dry relay R850 in the toll transmission selector 800 and the line relay R630 in the auxiliary toll selector 600. Further the toll relay R810 completes, at the contacts 812 and 815, a direct loop circuit between the left-hand winding of the answer relay R475 in the toll line circuit 400 and the line relay R525 in the information trunk circuit 500.

When the line relay R630 in the auxiliary toll selector 600 restores, it effects restoration of the hold relay R650 shortly thereafter. Upon restoring the hold relay R650 interrupts, at the contacts 654, the previously traced holding circuit for energizing the upper winding of the control relay R620 in order to cause the latter relay to restore. At this time the test relay R660 in the auxiliary toll selector 600 is retained in its operated position by virtue of the completed holding circuit for energizing the upper winding thereof including the grounded control conductor C723 of the trunk 720. When the line relay R825 in the toll transmission selector 800 restores, it effects restoration of the hold relay R840 shortly thereafter and restoration of the dry relay R850 shortly thereafter; whereupon the control relay R860 restores after a brief time interval. At this time the toll relay R810 is retained in its operated position by virtue of the completed holding circuit for energizing the lower winding thereof including the grounded control conductor C423 of the trunk 420; and the test relay R890 is retained in its operated position by virtue of the completed holding circuit for energizing the upper winding thereof including the grounded control conductor C423 of the trunk 420.

The loop circuit previously mentioned completed between the left-hand winding of the answer relay R475 in the toll line circuit 400 and the line relay R525 in the information trunk circuit 500 extends from ground potential by way of the upper winding of the line relay R525, the upper winding 571 of the repeating coil 570, the line conductor C507 of the trunk 505, the line wiper 692, the contacts 664, the line conductor C722 of the trunk 720, the contacts 782, the line conductor C712 of the trunk 710, the line wiper 803, the contacts 892 and 815, the line conductor C422 of the trunk 420, the contacts 471 and 461, the left-hand winding 396 of the repeating coil 395, the contacts 468, the left-hand winding of the answer relay R475, the contacts 466, the right-hand winding 396 of the repeating coil 395, the contacts 462, the line conductor C421 of the trunk 420, the contacts 812 and 891, the line wiper 802, the line conductor C711 of the trunk 710, the contacts 785, the line conductor C721 of the trunk 720, the contacts 662, the line wiper 691, the line conductor C506 of the trunk 505, the lower winding 571 of the repeating coil 570 and the lower winding of the line relay R525 to battery potential. When the above traced loop circuit is completed, the line relay R525 operates to complete, at the contacts 526, a circuit for operating the hold relay R540. Upon operating the hold relay R540 interrupts, at the contacts 543, the previously traced path for applying battery potential by way of the resistor 547 to the control conductor C508 of the trunk 505; and completes, at the contacts 542, a path for applying ground potential thereto in order to mark the trunk 505 as busy to the auxiliary toll selectors having access thereto. Also the hold relay R540 completes, at the contacts 541, a path, including the contacts 532 and 563, for applying ground potential to the motor start conductor C567; and completes, at the contacts 546, a path, including the contacts 556, the condenser 539 and the associated ballast lamp, between the interrupter generator conductor C538 and the line conductor C507 of the trunk 505; whereby the ring-back tone current is returned over the connection to the calling toll board 220 in order to indicate to the operator thereat that the toll board 300 is being rung. Further, the hold relay R540 completes, at the contacts 545, a path, including the contacts 555 and 566, for applying ground potential to the conductor C515 of the trunk 510, thereby to complete a circuit for illuminating the answer lamp L373 associated with the jack J372 at the toll board 300 in order to indicate to the operator thereat that a call is waiting to be answered on the trunk 510 terminated by the jack J372.

The operator at the toll board 300 answers the call by selecting an idle cord circuit, such for example, as the cord circuit 320, and then inserting the rear plug P321 thereof into the jack J372; whereupon the first contacts of the jack J372 are closed completing a circuit, including the conductor C514 of the trunk 510 for operating the jack relay R555 in the information trunk circuit 500. Upon operating the jack relay R555 completes, at the contacts 559, a holding circuit, including the contacts 544, for energizing the winding thereof; and interrupts, at the contacts 555, the previously traced circuit for illuminating the answer lamp L373 associated with the jack J372. Also the jack relay R555 interrupts, at the contacts 556, the previously traced connection between the interrupter conductor C538 and the line conductor C507 of the trunk 505 in order to interrupt the return of tone over the connection to the toll board 220 in the distant office 10. Also when the rear plug P321 of the cord circuit 320 is inserted into the jack J372, a circuit, including the contacts 351, the sleeve of the rear plug P321, the sleeve of the jack J372, and the sleeve conductor C513 of the trunk 510 is completed for energizing in series the winding of the rear supervisory relay R345 in the cord circuit 320 and the lower winding of the supervisory relay R530 in the information trunk circuit 500; whereby the rear supervisory relay R345 is not operated as it is of the marginal type and the supervisory relay R530 is operated. Upon operating the supervisory relay R530 completes, at the contacts 531, a circuit for energizing the lower winding of the answer relay R520 in order to cause the latter relay to operate shortly thereafter, it being of the combination slow-to-operate and slow-to-release type. Upon operating the answer relay R520 completes, at the contacts 521, a path for applying ground potential to the EC conductor C509 of the trunk 505 which is connected at this time by way of the EC wiper 694, the contacts 665, the EC conductor C724 of the trunk 720, the contacts 788, the EC conductor C714 of the trunk 710, the EC wiper 805, the contacts 892′ and 810 to the EC conductor C424 of the trunk 420 in order to complete the previously traced circuit for operating the supervisory relay R430 in the toll line circuit 400; whereby the latter relay controls the signal relay in the toll line circuit 215 causing the latter relay to extinguish the front supervisory lamp associated with the cord circuit at the toll board 220 in order to render to the operator thereat answer supervision. Also when the rear plug P321 of the cord circuit 320 is inserted into the jack J372, the headset 329 at the toll board 300 is operatively connected via the second and fourth contacts of the dial rear key K332, the second and fourth contacts of the ring rear key K330, the tip and the ring of the rear plug P321, the tip and the ring of the jack J372, the line conductors C512 and C511 of the trunk 510, and the windings 572 of the repeating coil 570 to the upper winding of the answer relay R520. Accordingly, at this time an established connection is completed between the toll board 220 in the distant office 10 and the toll board 300 in the central office 20 via the trunk 216, the toll line circuit 215, the toll line 210, the toll line circuit 400, the trunk 420, the toll transmission selector 800, the trunk 710, the ringing control circuit 700; the trunk 720, the auxiliary toll selector 600, the trunk 505, the information trunk circuit 500, the trunk 510, the jack J372 and the cord circuit 320; whereupon the operator at the toll board 220 converses with the operator at the toll board 300 obtaining the desired toll information.

Reconsidering the extension of the connection from the calling toll board 220 in the distant office 10 to the called toll board 300 in the central office 20, it may occur that after the toll transmission selector 800 responds to the first digit 1 that all of the trunks in the group, including the trunk 710, are tested as busy; whereupon the toll transmission selector 800 operates in order to return all-trunks-busy supervision to the toll board 220; all in the manner identical to that described in Sect. 5.

Again reconsidering the extension of the connection from the calling toll board 220 to the distant office 10 to the called toll board 300 in the central office 20, it may occur that after the auxiliary toll selector 600 responds to the third digit 1 that all of the trunks in the group, including the trunk 505, are tested as busy; whereupon the wiper set of the Strowger mechanism 690 selects the last busy trunk in the group mentioned having an EC1 conductor connected directly to ground potential. This ground potential connected to the EC1 wiper 695 of the wiper set completes a circuit, including the contacts 667, 643, 624 and 613, for operating the busy relay R610. Upon operating the busy relay R610 interrupts, at the contacts 618, the previously traced circuit for operating the step relay R685, thereby to prevent further interaction between the step relay R685 and the rotary magnet M697. Also the busy relay R610 completes, at the contacts 617, a holding circuit, including the contacts 620, 651 and 668 and the first contacts of the set of switch springs S676 and the grounded hold conductor C723 of the trunk 720, for energizing the winding thereof. Also the busy relay R610 completes, at the contacts 616, a path for applying ground potential to the interrupter start conductor C675; interrupts, at the contacts 613, the original operating circuit therefor; and completes, at the contacts 611, a connection, including the contacts 622, between the 120 impulse per minute conductor C674 and the EC conductor C724 of the trunk 720. Since the control relay R620 operated at the conclusion of the third digit 1, effecting restoration of the control relay R640, ground potential is applied by way of the contacts 642 and 623 to the EC1 conductor C725 of the trunk 720 in order to bring about operation of the toll relay R810 in the toll transmission selector 800. Accordingly, at this time a loop circuit is completed between the left-hand winding of the answer relay R475 in the toll line circuit 400 and the line relay R630 in the auxiliary toll selector 600, since the operated toll relay R810 in the toll transmission selector 800 has switched through the toll transmission selector 800. Accordingly, the 120 ground impulses per minute applied to the EC conductor C724 of the trunk 720 are applied via the contacts 788, the EC conductor C714 of the trunk 710, the EC wiper 805, the contacts 892′ and 810, to the EC conductor C424 of the trunk 420; whereupon the supervisory relay R430 in the toll line circuit 400 follows repeating to the signal relay in the toll line circuit 215; whereupon the latter relay flashes the front supervisory lamp associated with the cord circuit at the toll board 220 in order to render to the operator thereat all-trunks-busy supervision. The operator at the toll board 220 then releases the apparatus in a manner substantially identical to that described in Sect. 6.

In view of the foregoing it will be understood that one or more other groups of trunks may be terminated in the third level of the auxiliary toll selector 600, along with the group of trunks 505, etc. Specifically, the directory number of the group of trunks 505, etc., is 131 as previously noted; and assuming that there are four individual trunks in this group, the directory number of the next adjacent group of trunks, not shown will be 135. As previously indicated, the last trunk in each individual group is provided with a grounded EC1 conductor in order to control operation of the busy relay R610 in the auxiliary toll selector 600 in the event all of the trunks in the particular group are busy in the manner previously explained. Actually, the provision of the grounded EC1 conductor in the last group of trunks in this level is optional since the wiper carriage of the Strowger mechanism 690 will be driven into the eleventh position in the event the last trunk in the last group of trunks is busy bringing about operation of the sets of switch springs S680, S679 and S678 in the manner explained in Sect. 6; whereby an all-trunks-busy signal will be returned over the connection. In other words, the arrangement comprising the grounded EC1 conductors and the cooperating busy relay R610 constitutes all-trunks-busy facility; and the arrangement comprising the sets of switch springs S680, S679 and S678 constitute an independent all-trunks-busy facility.

Further reconsidering the established connection between the calling toll board 220 in the distant office 10 and the called toll board 300 in the central office 20 routed by the information trunk circuit 500, should the operator at the calling toll board 220 wish to recall the operator at the called toll board 300 before the latter operator has disconnected, this may be accomplished merely by withdrawing the front plug of the cord circuit in use from the jack terminating the trunk 216 and then immediately reinserting it thereinto in order to cause a pulse of short-time duration to be transmitted over the toll line 210. The signal relay R385 in the toll line circuit 400 follows repeating to the pulse relay R470; and the pulse relay R470 repeats, at the contacts 471, to the line relay R525 in the information trunk circuit 500. Accordingly, the line relay R525 restores and then reoperates, interrupting and then recompleting, at the contacts 526, the circuit for maintaining operated the hold relay R540; whereby the latter relay is retained in its operated position as it is of the slow-to-release type. Also the line relay R525 completes and then interrupts, at the contacts 527, a circuit, including the contacts 534, for energizing the upper winding of the recall relay R550; whereupon the latter relay operates to complete, at the contacts 551, a circuit, including the contacts 535, for energizing the lower winding thereof in series with the upper winding of the supervisory relay R530. The completion of the above traced circuit for energizing the lower winding of the recall relay R550 produces a low resistance circuit for energizing the winding of the rear supervisory relay R345 in the cord circuit 320; whereby the latter relay operates as it is of the marginal type. Upon operating the rear supervisory relay R345 completes, at the contacts 346, a circuit for illuminating the rear supervisory lamp L334 in order to indicate to the operator at the toll board 300 that a recall condition is waiting to be answered on the calling circuit to which the rear plug P321 thereof is connected. Shortly thereafter, the above traced circuit for energizing the lower winding of the recall relay R550 in series with the upper winding of the supervisory relay R530 is completed, the recall relay R550 restores since the lower winding thereof does not contain a sufficient number of turns to retain the latter relay operated; however, the latter relay is rendered slow-to-release. Upon restoring, the recall relay R550 interrupts, at the contacts 551, the above traced low resistance circuit; whereby the rear supervisory relay R345 in the cord circuit 320 restores in order to interrupt, at the contacts 346, the circuit for illuminating the rear supervisory lamp L334 associated with the rear plug P321 of the cord circuit 320. Accordingly, the operator at the calling toll board 220 may repeat the operations above described in order to bring about corresponding flashing of the rear supervisory lamp L334 associated with the rear plug P321 of the cord circuit 320 at the toll board 300.

At the conclusion of the established connection, the operator at the toll board 300 disconnects by withdrawing the rear plug P321 of the cord circuit 320 from the jack J372, thereby interrupting the circuit for energizing the winding of the rear supervisory relay R345 in the cord circuit 320 in series with the lower winding of the supervisory relay R530 in the information trunk circuit 500; whereupon the rear supervisory relay R345 is retained in its restored position and the supervisory relay R530 restores. Upon restoring the supervisory relay R530 interrupts, at the contacts 531, the circuit for energizing the lower winding of the answer relay R520; whereby the latter relay restores shortly thereafter, it being of the combination slow-to-operate and slow-to-release type. Upon restoring the answer relay R520 interrupts, at the contacts 521, the previously mentioned path for applying ground potential to the EC conductor C509 of the trunk 505 in order to bring about the consequent restoration of the supervisory relay R430 in the toll line circuit 400 and the resulting restoration of the signal relay in the toll line circuit 215; whereby the front supervisory lamp associated with the cord circuit at the toll board 220 is again illuminated in order to render to the operator thereat disconnect supervision.

At this time, in the event the operator at the toll board 220 wishes to recall the operator at the toll board 300, this may be accomplished by momentarily withdrawing the front plug of the cord circuit from the jack terminating the trunk 216 and then reinserting the same, causing a pulse to be transmitted over the toll line 210 in the manner previously explained. In this case, the signal relay R385 in the toll line circuit 400 responds repeating to the pulse relay R470; which latter relay repeats to the line relay R525 in the information trunk circuit 500. The line relay R525 restores and then reoperates completing and then interrupting, at the contacts 527, a circuit, including the contacts 533 and 557 for operating the recall relay R560. Upon operating the recall relay R560 completes, at the contacts 564, a holding circuit, including the contacts 541 and 532, for energizing the winding thereof; and completes, at the contacts 562, a path for applying ground potential to the motor start conductor C567. Also the recall relay R560 completes, at the contacts 561, an alternative connection, including the contacts 546, the condenser 539 and the associated ballast lamp, between the interrupter conductor C538 and the line conductor C507 of the trunk 505 in order to cause tone to be returned over the connection to the calling toll board 220 indicating that the called toll board 300 is being signalled at this time. Finally, the recall relay R560 completes, at the contacts 565, an alternative path, including the contacts 528, for applying ground potential to the conductor C515 of the trunk 510 in order again to illuminate the answer lamp L373 associated with the jack J372 terminating the trunk 510 at the toll board 300, again indicating the presence of a call waiting to be answered on the trunk 510.

The operator at the toll board 300 again answers the call by inserting the rear plug P321 of the cord circuit 320 into the jack J372; whereby the supervisory relay R530 is reoperated in order to effect reoperation shortly thereafter of the answer relay R520 and the consequent return of answer supervision to the toll board 220. Also the supervisory relay R530 interrupts, at the contacts 532, the holding circuit for maintaining operated the recall relay R560. Upon restoring the recall relay R560 interrupts, at the contacts 561, the path for returning tone back to the toll board 220; and interrupts, at the contacts 565, the alternative circuit for illuminating the answer lamp L373 associated with the jack J372. At this time, the connection between the calling toll board 220 and the called toll board 300 is again established.

After the operator at the toll board 300 disconnects in the manner described above, should the operator at the toll board 220 desire to release the connection, this may be accomplished by withdrawing the front plug of the cord circuit from the jack terminating the trunk 216; whereupon ground potential is returned to the simplex of the toll line 210 effecting the restoration of the signal relay R385 in the toll line circuit 400; whereby the toll transmission selector 800 and the auxiliary toll selector 600 are released in the manner explained in Sect. 6. When the auxiliary toll selector 600 is thus released, the line relay R525 in the information trunk circuit 500 restores effecting the restoration of the hold relay R540 shortly thereafter. Upon restoring the hold relay R540 interrupts, at the contacts 542, the path for applying ground potential to the control conductor C508 of the trunk 505; and recompletes, at the contacts 543, the original path for applying battery potential by way of the resistor 547 to the control conductor C508; whereby the trunk 505 is marked as idle to the auxiliary toll selectors having access thereto. Also the hold relay R540 interrupts, at the contacts 544, the holding circuit for maintaining operated the jack relay R555. At this time the information trunk circuit 500 is completely released.

In view of the foregoing explanation of the mode of operation of the auxiliary toll selector 600, to route a connection extended thereto via the trunk 720, the ringing control circuit 700 and the trunk 710 from the toll transmission selector 800 to one of the information trunks 500 etc., in response to the second and third digits 3 and 1, it will be understood that the auxiliary toll selector 600 is operative in a substantially identical manner in response to the second digit 2 followed by the third digit 1 or in response to the second digit 1 followed by the third digit 1. Specifically, the auxiliary toll selector 600 responds to the second and third digits 2 and 1 to select a trunk in the group, including the trunk 305. For example, the auxiliary toll selector 600 may select the trunk 305 extending to the inward trunk circuit 304; whereby a call is extended over the trunk 306 to the terminating jack J376 at the toll board 300 causing illumination of the associated answer lamp L377. The operator at the toll board 300 answers this call on the trunk 306 extending from the inward trunk circuit 304 by inserting the rear plug P321 of the cord circuit 320 into the jack J376; and the auxiliary toll selector 600 and the toll transmission selector 800 are switched through in a manner identical to that explained above. Also the supervision and the release of such an established connection are the same as explained above. Similarly, the auxiliary toll selector 600 responds to the second and third digits 1 and 1 to select a trunk in the group, including the trunk 302. For example, the auxiliary toll selector 600 may select the trunk 302 extending to the T. X trunk circuit 301; whereby a call is extended over the trunk 303 to the terminating jack J374 at the toll board 300 causing illumination of the associated answer lamp L375. The operator at the toll board 300 answers this call on the trunk 303 extending from the T. X trunk circuit 301 by inserting the rear plug P321 of the cord circuit 320 into the jack J374; and the auxiliary toll selector 600 and the toll transmission selector 800 are switched through in a manner identical to that explained above. Also the supervision and the release of such an established connection are the same as explained above.

*Sect. 8.—A call from the toll board in the distant office to the toll board in the remote exchange*

Now assuming that a call has been initiated at the toll board 220 in the distant office 10, and extended via the trunk 216, the toll line circuit 215, the toll line 210, the toll line circuit 400, the trunk 420, the toll transmission selector 800, the trunk 710, the ringing control circuit 700 and the trunk 720 to the auxiliary toll selector 600; the toll transmission selector 800 having operated in response to the first digit 1 received over the toll line 210; all in the manner explained in Sect. 6. The operator at the toll board 220 having dialed the first digit 1 as explained above, proceeds to dial the second digit 5 and the third digit 1, completing the directory number 151; whereby the second digit 5 and the third digit 1 are received over the toll line 210 by the toll line circuit 400 and repeated to the toll transmission selector 800 and then repeated thereby to the auxiliary toll selector 600. At the conclusion of the second digit 5, the wiper carriage of the Strowger mechanism 690 occupies its fifth vertical step; whereby the sets of switch springs S633 and S635 are operated. Also the sets of switch springs S676 and S677 occupy their operated positions. Shortly following the second digit 5, the transfer relay R680 restores to complete, at the contacts 681, a circuit, including the set of switch springs S635, the contacts 626, 651 and 668, the first contacts of the set of switch springs S676 and the contacts 653, for operating the control relay R640; whereby the latter relay interrupts, at the contacts 640, the circuit for operating the step relay R685. Also the control relay R640 prepares, at the contacts 648, the previously traced circuit for energizing the lower winding of the control relay R620 in multiple with the rotary magnet M697.

When the third digit 1 is received, the line relay R630 again follows repeating at the contacts 632 to the lower winding of the transfer relay R680, to the lower winding of the control relay R620 and to the rotary magnet M697; whereby the transfer relay R680 reoperates, the control relay R620 operates through its first step and the rotary magnet M697 operates to drive the wiper set of the Strowger mechanism 690 one step in the rotary direction away from its normal rotary position; all in the manner explained in Sect. 7. At the conclusion of the third digit 1, the control relay R620 operates through its second step; and shortly thereafter the transfer relay R680 restores. Upon operating through its second step the control relay R620 interrupts, at the contacts 626, the holding circuit for maintaining operated the control relay R640. Upon restoring the control relay R640 completes, at the contacts 640, the circuit for operating the step relay R685; and completes, at the contacts 642, the previously traced circuit for applying ground potential to the EC1 conductor C725 of the trunk 720, thereby to effect operation of the toll relay R810 in the toll transmission selector 800; whereby the toll transmission selector 800 is switched through; all in the manner explained in Sect. 7. Also upon restoring the control relay R640 completes, at the contacts 646, the previously traced path for applying ground potential by way of the lower winding of the test relay R660 to the test wiper 693 of the wiper set; whereby the idle or busy condition of the first trunk in the selected group, including the trunk 602 is tested. At this time, the step relay R685 upon operating interacts with the rotary magnet M697 in the event the first trunk in the group mentioned is busy; whereby the test relay R660 tests the successive trunks in the group mentioned. Now assuming that the trunk 602 is the first idle trunk in the group mentioned, when the wiper set of the Strowger mechanism 690 selects the trunk 602 extending to the ring-down trunk circuit 601, the test relay R660 operates. Upon operating the test relay R660 completes, at the contacts 669, the previously traced holding circuit for energizing the upper winding thereof; and interrupts, at the contacts 668, the circuit for operating the step relay R685, thereby to arrest further interaction of the step relay R685 and the rotary magnet M697. Further the test relay R660 interrupts, at the contacts 661 and 663, the loop circuit extending between the left-hand winding of the answer relay R475 in the toll line circuit 400 and the line relay R630 in the auxiliary toll selector 600 in order to cause the line relay R630 to restore. Further the test relay R660 completes, at the contacts 662 and 664, a connection between the line conductors C721 and C722 of the trunk 720 and the line wipers 691 and 692 of the wiper set of the Strowger mechanism 690; whereby the auxiliary toll selector 600 is also switched through at this time to bring about the restoration of the hold relay R650 and the control relay R620 therein. Moreover, in the toll transmission selector 800, the hold relay R840 and the control relay R860 are restored when the toll transmission selector 800 is switched through.

Finally upon operating the test relay R660 completes, at the contacts 666, a path, including the contacts 672 and the set of switch springs S633 between the grounded control conductor C723 of the trunk 720 and the RDC conductor C726 thereof, thereby to complete a circuit for operating the start relay R780 in the ringing control circuit 700. Upon operating the start relay R780 interrupts, at the contacts 782 and 785, the normal connection between the line conductors C722 and C721 of the trunk 720 and the line conductors C712 and C711 of the trunk 710; completes, at the contacts 783 and 786, a loop circuit between the left-hand winding of the answer relay R475 in the toll line circuit 400 and the upper and lower windings of the line relay R770; and completes, at the contacts 781 and 784, a connection between the windings 792 of the repeating coil 791 and the line conductors C722 and C721 of the trunk 720. The loop circuit extending from the left-hand winding of the answer relay R475 includes the line conductors C422 and C421 of the trunk 420, the contacts 815, 812 and 892, 891, the line wipers 803, 802, the line conductors C712 and C711 of the trunk 710, the contacts 783, 783, the windings 793 of the repeating coil 791 and the upper and lower windings of the line relay R770. The connection between the windings 792 of the repeating coil 791 and the line conductors C722 and C721 of the trunk 720 is extended via the contacts 664, 662, the line wipers 692, 691 and the line conductors of the trunk 602 to the ring-down trunk circuit 601 terminating the toll line 603 extending to the toll board 604 in the remote exchange 40.

When the above traced loop circuit between the left-hand winding of the answer relay R475 in the toll line circuit 400 and the upper and lower windings of the line relay R770 in the ringing control circuit 700 is completed, the line relay R770 operates; however, the answer relay R475 is not poled to operate. Also upon operating the start relay R780 completes, at the contacts 789, a path, including the contacts 732, for applying battery potential by way of the resistor 797 to the EC conductor C724 and a multiple path for applying battery potential by way of the winding of the answer relay R735 and the resistor 796 to the EC conductor C724, and thence via the contacts 665 and the EC wiper 694 to the EC conductor of the trunk 602 extending to the ring-down trunk circuit 601. Moreover, upon operating the test relay R660 in the auxiliary toll selector 600 completes, at the contacts 660, a path for applying ground potential to the control wiper 693 which is extended to the control conductor of the trunk 602 extending to the ring-down trunk circuit 601; whereby the trunk 602 is marked as busy to the other auxiliary toll selectors having access thereto and is conditioned to be rung down in order to signal the toll board 604 in the remote exchange 40 over the toll line 603.

Upon operating the line relay R770 completes, at the contacts 771, a circuit, including the contacts 747, for operating the ring relay R760; whereby the latter relay sets its armature RA765 into vibration; which vibrating armature RA765 completes intermittently a circuit for operating the timer relay R750; whereby the latter relay, being of the slow-to-operate type, does not operate until after the expiration of a predetermined time interval. Also upon operating the ring relay R760 completes, at the contacts 764, a path, including the contacts 787, for applying ground potential to the EC conductor C714 of the trunk 710, thereby to complete the previously traced circuit for operating the supervisory relay R430 in the toll line circuit 400 in order to bring about operation of the signal relay in the toll line circuit 215; whereby the front supervisory lamp in the cord circuit at the toll board 220 is extinguished. Also the ring relay R760 completes, at the contacts 763, a path, including the condenser 767 and the contacts 788, between the generator conductor C753 and the negative line conductor C711 of the trunk 710; whereby tone current is returned over the connection to the toll board 220 in order to indicate to the operator thereat that the toll board 604 in the remote exchange 40 is being rung down. Further the ring relay R760 completes, at the contacts 761, a path, including the resistor 754, the upper winding 792 of the repeating coil 791 and the contacts 781, for applying battery potential to the positive line conductor C722; and completes, at the contacts 762, a path, including the lower winding 792 of the repeating coil 791 and the contacts 784, for applying ground potential to the negative line conductor C721. The application of battery and ground potentials to the line conductors C722 and C721 of the trunk 720 are extended over the previously traced circuit to the line conductors of the trunk 602 extending to the ring-down trunk circuit 601; whereby the ring-down trunk circuit 601 is controlled to project ringing current over the toll line 603 in order to signal the toll board 604 in the remote exchange 40.

Upon operating the timer rlay R750 completes, at the contacts 751, a circuit for operating the control relay R745; whereby the latter relay, upon operating, completes, at the contacts 746, a holding circuit, including the contacts 771, for energizing the winding thereof. Also the timer relay R750 completes, at the contacts 752, a circuit for operating the control relay R740; whereby the latter relay, upon operating, completes, at the contacts 742, a holding circuit, including the contacts 780, for energizing the winding thereof. Further, the control relay R745 interrupts, at the contacts 747, the circuit for maintaining operated the ring relay R760; whereby the latter relay, upon restoring, interrupts, at the contacts 766, the circuit for maintaining operated the timer relay R750. Also upon restoring the ring relay R760 interrupts, at the contacts 764, the previously traced path for applying ground potential to the EC conductor C714 in order to bring about restoration of the supervisory relay R430 in the toll line circuit 400 and the consequent restoration of the signal relay in the toll line circuit 215; whereby the front supervisory lamp associated with the cord circuit at the toll board 220 is again illuminated. Also the ring relay R760 interrupts, at the contacts 763, the previously traced circuit for returning tone current over the connection to the toll board 220. Accordingly, the front supervisory lamp associated with the cord circuit at the toll board 220 is extinguished and then again illuminated as a signal indicating that the toll board 604 in the remote exchange is being rung down; and similarly, the splash of tone is returned to the toll board 220 for the same purpose. Further, upon restoring, the ring relay R760 interrupts, at the contacts 761 and 762, the paths for applying battery and ground potentials over the line conductors C722 and C721 and thence over the line conductors of the trunk 602 to the ring-down trunk circuit 601; which operation is without particular effect since it was only necessary for a pulse of the potentials mentioned to be forwarded into the ring-down trunk circuit 601 in order to institute a ringing cycle thereof with respect to the toll line 603 extending to the toll board 604 in the remote exchange 40.

Subsequently, when the operator at the toll board 604 in the remote exchange 40 answers the call, the ring-down trunk circuit 601 is controlled over the toll line 603; whereby the ringing operation is arrested and ground potential is returned over the EC conductor of the trunk 602, thereby to complete a circuit for energizing the winding of the answer relay R735 in the ringing control circuit 700; whereupon the latter relay operates. Upon operating the answer relay R735 completes, at the contacts 736, a circuit for operating the supervisory relay R730; whereupon the latter relay interrupts, at the contacts 732, the multiple path for applying battery potential by way of the resistor 797 to the EC conductor C724. Further the supervisory relay R730 completes, at the contacts 731, a path, including the contacts 741 and 787, for reapplying ground potential to the EC conductor C714 of the trunk 710; whereby the supervisory relay R430 in the toll line circuit 400 is reoperated in order to effect reoperation of the signal relay in the toll line circuit 215; whereby the front supervisory lamp in the cord circuit at the toll board 220 is finally extinguished in order to indicate to the operator thereat that the call has been answered at the toll board 604 in the remote exchange 40. The operator at the toll board 220 in the distant office 10 then advises the operator at the toll board 604 in the remote exchange 40 concerning the extension of the toll call; and both operators then retire from the established connection.

Subsequently, when the operator at the toll board 604 in the remote exchange 40 disconnects, the ring-down trunk circuit 601 is controlled over the toll line 603 in order to remove ground potential from the EC conductor of the trunk 602; whereby the answer relay R735 in the ringing control circuit 700 restores effecting the restoration of the supervisory relay R730. Upon restoring the supervisory relay R730 interrupts, at the contacts 731, the path for applying ground potential to the EC conductor C714 of the trunk 710 in order to bring about the restoration of the supervisory relay R430 in the toll line circuit 400 and the consequent restoration of the signal relay in the toll line circuit 215; whereby the front supervisory lamp associated with the cord circuit at the toll board 220 is again illuminated in order to render to the operator thereat disconnect supervision. When the operator at the toll board 220 then disconnects, the toll line circuit 215, the toll line circuit 400, the toll transmission selector 800 and the auxiliary toll selector 600 are released in a manner substantially identical to that described in Sect. 6. When the auxiliary toll selector 600 is thus released, ground potential is removed from the RDC conductor C726 of the trunk 720 bringing about the restoration of the start relay R780 in the ringing control circuit 700; and when the toll transmission selector 800 is thus released, the line relay R770 in the ringing control circuit 700 is restored. Upon restoring the start relay R780 reconnects at the contacs 782, 785 and 788, the various conductors of the trunk 710 to the corresponding conductor of the trunk 720; and interrupts, at the contacts 780, the holding circuit for maintaining operated the control relay R740. Also upon restoring the line relay R770 interrupts, at the contacts 771, the holding circuit for maintaining operated the control relay R745. At this time the ringing control circuit 700 is completely released. Also when the auxiliary toll selector 600 is thus released, the ring-down trunk circuit 601 is released and the trunk 602 extending thereto is marked as idle to the auxiliary toll selectors having access thereto. At this time the established connection between the calling toll board 220 in the distant office 10 and the called toll board 604 in the remote exchange 40 is released and all of the apparatus involved therein is completely released and available for further use.

Reconsidering the extension of the connection from the toll board 220 in the distant office 10 to the toll board 604 in the remote exchange 40 it is noted that all-trunks-busy supervision in the toll transmission selector is the same as that described in Sect. 5; whereas all-trunks-busy supervision in the auxiliary toll selector 600 is the same as that described in Sect. 7.

*Sect. 9.—A call from the toll board in the distant office through a toll connector in the central office*

Now assuming that a call has been initiated at the toll board 220 in the distant office 10 and extended via the trunk 216, the toll line circuit 215, the toll line 210, the toll line circuit 400, the trunk 420, the toll transmission selector 800, the trunk 710, the ringing control circuit 700 and the trunk 720 to the auxiliary toll selector 600; the toll transmission selector 800 having operated in response to the first digit 1 received over the toll line 211; all in the manner explained in Sect. 6. The operator at the toll board 220 having dialed the first digit 1 as explained above, proceeds to dial the second digit 6 and the third digit 1 and then a fourth digit X and perhaps a fifth digit X, completing the directory number 161X or 161XX; whereby the second digit 6 and the third digit 1 are received over the toll line 210 by the toll line circuit 400 and repeated to the toll transmission selector 800 and then repeated thereby to the auxiliary toll selector 600. At the conclusion of the second digit 6, the wiper carriage of the Strowger mechanism 690 occupies its sixth vertical step; whereby the sets of switch springs S634, S633 and S635 are operated. Also the sets of switch springs S676 and S677 occupy their operated positions. More particularly, the set of switch springs S634 is operated to complete the previously traced circuit for operating the cut-out relay R670. Shortly following the second digit 6, the transfer relay R680 restores to complete, at the contacts 681, the circuit, including the set of switch springs S635, the contacts 626, 651 and 668, the first contacts of the set of switch springs S676 and the contacts 653, for operating the control relay R640. Upon operating the control relay R640 interrupts, at the contacts 640, the previously traced circuit for operating the step relay R685, thereby to prevent operation of the latter relay and the consequent operation of the rotary magnet M697 at this time.

When the third digit 1 is received, the line relay R630 follows repeating, at the contacts 632, to the lower windings of the transfer relay R680 and the control relay R620 and to the rotary magnet M697; whereby the transfer relay R680 reoperates, the control relay R620 operates through its first step, and the rotary magnet M697 operates to drive the wiper set of the Strowger mechanism 690 one step in the rotary direction away from its normal rotary position; all in the manner explained in Sect. 7. At the conclusion of the third digit 1, the control relay R620 operates through its second step; and shortly thereafter, the transfer relay R680 restores. Upon operating through its second step the control relay R620 interrupts, at the contacts 626, the holding circuit for maintaining operated the control relay R640. Upon restoring the control relay R640 completes, at the contacts 640, the circuit for operating the step relay R685; and completes, at the contacts 642, the previously traced circuit for applying ground potential to the EC1 conductor C725 of the trunk 720, thereby to effect operation of the toll relay R810 in the toll transmission selector 800; whereby the toll transmission selector 800 is switched through; all in the manner explained in Sect. 7. Also upon restoring the control relay R640 completes, at the contacts 646, the path for applying ground potential by way of the lower winding of the test relay R660 to the test wiper 693 of the wiper set; whereby the idle or busy condition of the first trunk in the selected group, including the trunk 706 is tested. At this time the step relay R685, upon operating, interacts with the rotary magnet M697 in the event the first trunk in the group mentioned is busy; whereby the test relay R660 tests the successive trunks in the group mentioned. Now assuming that the trunk 706 is the first idle trunk in the group mentioned, when the wiper set of the Strowger mechanism 690 selects the trunk 706 extending to the toll connector 705, the test relay R660 is operated. Upon operating the test relay R660 completes, at the contacts 669, the previously traced holding circuit for energizing the upper winding thereof; and interrupts, at the contacts 668, the circuit for operating the step relay R685, thereby to arrest further interaction of the step relay R685 and the rotary magnet M697. Further, the test relay R660 interrupts, at the contacts 661 and 663, the loop circuit extending between the left-hand winding of the answer relay R475 in the toll line circuit 400 and the line relay R630 in the auxiliary toll selector 600 in order to cause the line relay R630 to restore. Further, the test relay R660 completes, at the contacts 662 and 664, the connection between the line conductors C721 and C722 of the trunk 720 and the line wipers 691 and 692 of the wiper set of the Strowger mechanism 690; whereby the auxiliary toll selector 600 is also switched through at ths time to bring about the restoration of the hold relay R650 and the control relay R620 therein. Moreover, in the toll transmission selector 800, the hold relay R840 and the control relay R860 are restored when the toll transmission selector 800 is switched through.

Recapitulating, at the conclusion of the third digit 1, the control relay R620 operated to effect restoration of the control relay R640; whereby a hunting operation of the wiper set of the Strowger mechanism 690 for an idle trunk in the group, including the trunk 706 was initiated. Upon restoring, the control relay R640 completed, at the contacts 641, a path, including the contacts 622, 612 and 671, the sets of switch springs S633 and the contacts 653, for applying ground potential to the EC conductor C724 of the trunk 720. Subsequently, when the wiper set of the Strowger mechanism 690 found the idle trunk 706 extending to the toll connnector 705, the test relay R660 was operated to effect restoration of the line relay R630, the hold relay R650 and the control relay R620. Upon restoring the control relay R620 interrupted, at the contacts 622, the above traced path for applying ground potential to the EC conductor C724 of the trunk 720. Accordingly, ground potential was applied in the auxiliary toll selector 600 to the EC conductor C724 of the trunk 720 during the trunk hunting operation of the wiper set of the Strowger mechanism 690. While ground potential was applied to the EC conductor C724 of the trunk 720, the supervisory relay R430 in the toll line circuit 400 was operated to bring about operation of the signal relay in the toll line circuit 215 and the consequent extinguishing of the front supervisory lamp associated with the cord circuit at the toll board 220, thereby to render to the operator thereat a stop-digit or stop-dial signal indicating that no further digits should be transmitted at this time. When the auxiliary toll selector 600 selects the trunk 706 extending to the toll connector 705, the toll connector 705 is conditioned to receive the next digit and the control relay R620 in the auxiliary toll selector 600 removes ground potential from the EC conductor C724 of the trunk 720 as noted above bringing about the restoration of the supervisory relay R430 in the toll line circuit 400 and the restoration of the signal relay in the toll line circuit 215; whereupon the front supervisory lamp associated with the cord circuit at the toll board 220 is again illuminated indicating to the operator thereat that the fourth digit may be transmitted.

At this time a loop circuit is completed between the left-hand winding of the answer relay R475 and the line relay in the toll connector 705 via the trunk 420, the toll transmission selector 800, the trunk 710, the ringing control circuit 700, the trunk 720, the auxiliary toll selector 600 and the trunk 706. When the operator dials the fourth digit, it is received over the toll line 210 and repeated by the pulse relay R470, at the contacts 471, to the line relay in the toll connector 705; whereby the toll connector 705 is operated in accordance therewith. The toll connector 705 may be of the trunk-hunting type; whereby it responds to the fourth digit to select a group of trunks and then an idle trunk therein. On the other hand the toll connector 705 may require a fifth digit in order to govern operation thereof to select a trunk accessible thereto; in which case the operator at the toll board 220 dials the required fifth digit. In any case the toll connector 705 is operated to select a trunk accessible thereto; whereby the loop circuit extending from the left-hand winding of the answer relay R475 in the toll line circuit 400 is extended into the trunk circuit, not shown, associated with the selected trunk. Subsequently, when the call is answered, the trunk circuit, not shown, associated with the trunk selected by the toll connector 705 may operate in order to reverse the polarity over the loop circuit extending to the left-hand winding of the answer relay R475 in the toll line circuit 400; whereby the latter relay is poled to operate. Upon operating the answer relay R475 interrupts, at the contacts 476, the termination circuit across the windings 396 of the repeating coil 395; interrupts, at the contacts 478, the path for applying ground potential to the simplex conductor C388; and completes, at the contacts 477, a path for applying battery potential by way of the resistor 478 to the simplex conductor C388. Accordingly, the signal relay in the toll line circuit 215 is operated in order to extinguish the front supervisory lamp associated with the cord circuit at the toll board 220, thereby to render to the operator thereat answer supervision. At this time an established connection is completed from the calling toll board 220 in the distant office 10 via the trunk 216, the toll line circuit 215, the toll line 210, the toll line circuit 400, the trunk 420, the toll transmission selector 800, the trunk 710, the ringing control circuit 700, the trunk 720, the auxiliary toll selector 600, the trunk 706, and the toll connector 705 to the called circuit.

At the conclusion of the connection, when the called circuit is disconnected, the trunk circuit, not shown, associated with the trunk selected by the toll connector 705 again operates in order to restore the polarity of the loop circuit extending back to the answer relay R475 in the toll line circuit 400; whereby the latter relay restores to change, at the contacts 477 and 478, battery potential to ground potential upon the simplex conductor C388. Accordingly, the signal relay in the toll line circuit 215 is restored effecting illumination of the front supervisory lamp associated with the cord circuit at the toll board 220 in order to render to the operator thereat disconnect supervision.

The operator at the toll board 220 releases the connection by withdrawing the front plug of the cord circuit from the jack terminating the trunk 216 in order to bring about the release of the toll line circuit 215, the toll line circuit 400, the toll transmission selector 800 and the auxiliary toll selector 600; all in the manner explained in Sect. 6. When the auxiliary toll selector 600 is thus released, the toll connector 705 is released in order to bring about the complete release of the called circuit. At this time the established connection between the calling toll board 220 and the called circuit, routed through the toll connector 705 is released, and all of the apparatus involved therein is completely released and available for further use.

*Sect. 10.—Local calls in the distant exchange*

First assuming that call is initiated at the subscriber substation T1201 in the distant exchange 30 that is to be completed locally to another subscriber substation therein, the line circuit 1203 is controlled via the subscriber line 1202 in order to govern operation of the distributor 1204 over the start conductor C1205; whereby an idle one of the links, such for example, as that illustrated, is assigned thereby. The finder 1206 of the link illustrated operates to find the subscriber line 1202 extending to the calling subscriber substation T1201; whereby the line circuit 1203 is operated in order to mark the subscriber line 1202 as busy to the other links having access thereto. Also the selector 1207 of the link illustrated operates to return dial tone over the subscriber line 1202 to the calling subscriber substation T1201; whereby the subscriber at the calling subscriber substation T1201 proceeds to dial the directory number of the called subscriber substation; which number is a three-digit number in the present illustration. The first digit dialed at the calling subscriber substation T1201 effects operation of the selector 1207; whereby it operates to select first the group of trunks extending to the corresponding group of local connectors, not shown, and then an idle trunk therein. The second and third digits dialed at the calling subscriber substation T1201 govern operation of the selected local connector; whereby it operates to select the subscriber line extending to the called subscriber substation. The subsequent operation of the selected local connector depends upon the idle or busy condition of the called subscriber substation and is in accordance with conventional practice. Also the subsequent completion of the established connection, as well as the ultimate release thereof are entirely conventional. In passing, it is noted that in the event all of the local connectors in the group selected by the selector 207 in response to the first digit dialed at the calling subscriber substation T1201 are busy, the selector 1207 operates to select an idle one of the combination connectors in the same group; which selected combination connector then responds to the second and third digits dialed at the calling subscriber substation T1201 in a conventional manner.

*Sect. 11.—A call from the toll board in the distant office to a subscriber substation in the distant exchange*

Again assume that a call has been initiated at the toll board 220 in the distant office 10 and routed via the truck 216, the toll line circuit 215, the toll line 210, the toll line circuit 400 and the trunk 420, to the toll transmission selector 800; and that the call is to be extended to a subscriber substation, such, for example, as the subscriber substation T1201 in the distant exchange 30. The operator at the toll board 220, after initiating the call, dials the digit 8 followed by the directory number of the called subscriber substation T1201, which number may be 4XX. Accordingly, the digits 8, 4, X and X are dialed at the toll board 220. The first digit 8 transmitted over the toll line 210 is received by the toll line circuit 400 and repeated over the trunk 420 to the toll transmission selector 800. Specifically, the line relay R825 in the toll transmission selector 800 follows the first digit 8; whereby the wiper carriage of the Strowger mechanism 801 is driven eight steps in the vertical direction away from its normal vertical position and the sets of switch springs S884 and S885 are operated. Also in this particular case, the set of switch springs S888 is operated since the wiper carriage of the Strowger mechanism 801 occupies its eighth vertical level selecting the group of trunks 910, etc., extending to the group of toll line circuits 900, etc., terminating the toll lines 1110, etc., extending between the central office 20 and the distant office 30. Accordingly, at the conclusion of the first digit 8, the line relay R825, the hold relay R840, the dry relay R850, the control relay R860, the step relay R820, and the transfer relay R880 occupy their operated positions; and shortly thereafter, the transfer relay R880 restores. Upon restoring, the transfer relay R880 completes, at the contacts 883, a circuit, including the contacts 845, MC812, 834 and 897, the first contacts of the set of switch springs S889 and the contacts 866, for energizing the upper winding of the digit absorbing relay R830; whereby the latter relay operates to complete, at the contacts 831, a holding circuit, including the contacts 827 and 818, for energizing the upper winding thereof. Also the digit absorbing relay R830 interrupts, at the contacts 834, a point in the previously traced operating circuit for energizing the upper winding thereof; and completes, at the contacts 833, a circuit, including the contacts 845, MC812, 883 and 821, for operating the rotary magnet M808. Accordingly, at this time the rotary magnet M808 and the step relay R820 interact in the manner previously described in order to select an idle trunk in the group, including the trunk 910. Assuming that the trunk 910 is the first idle trunk in the selected group, the test relay R890 is operated when the wiper set of the Strowger mechanism 801 selects the trunk 910. Upon operating the test relay R890 interrupts, at the contacts 899, the circuit for operating the step relay R820 in order to arrest further interaction thereof with the rotary magnet M808; and completes, at the contacts 890, the previously traced holding circuit for energizing the upper winding thereof. Further the test relay R890 completes, at the contacts 894, a circuit, including the grounded control conductor C423 and the set of switch springs S888 for energizing the upper winding of the toll relay R810 in order to cause the latter relay to operate. Upon operating the toll relay R810 switches through the toll transmission selector 800; whereby the line conductors C421 and C422 of the trunk 420 are connected directly via the line wipers 802 and 803 to the line conductors C911 and C912 of the trunk 910 extending to the toll line circuit 900. Also the line relay R825, the hold relay R840, the digit absorbing relay R830, the dry relay R850 and the control relay R860 restore. Thus, at this time, only the toll relay R810 and the test relay R890 in the toll transmission selector 800 occupy their operated positions. Moreover, the EC conductor C424 of the trunk 420 is connected directly via the contacts 810, 892' and the EC wiper 805 to the EC conductor C914 of the trunk 910; and direct ground potential is applied via the contacts 891' and the control wiper 804 to the control conductor C913 of the trunk 910 in order to mark the trunk 910 as busy to the toll transmission selectors having access thereto.

When the trunk 910 extending to the toll line circuit 900 is thus seized by the toll transmission selector 800 and the toll transmission selector 800 is switched through, a loop circuit is completed between the left-hand winding of the answer relay R475 in the toll line circuit 400 and the line relay R965 in the toll line circuit 900. The above mentioned loop circuit extends from ground by way of the upper winding of the line relay R965, the contacts 943, the upper winding 933 of the repeating coil 932 to the line conductor C912 of the trunk 910; and from battery potential by way of the lower winding of the line relay R965, the contacts 945 and the lower winding 933 of the repeating coil 932 to the line conductor C911 of the trunk 910; the line conductors C912 and C911 of the trunk 910 are connected by way of the previously traced path to the line conductors C422 and C421 of the trunk 420; and the line conductors C422 and C421 of the trunk 420 are connected by way of the previously traced path to the terminals of the left-hand winding of the answer relay R475. Accordingly, at this time the line relay R965 operates, whereas the answer relay R475 is not poled to operate. Also the application of ground potential to the control conductor C913 of the trunk 910 completes a circuit, including the contacts 1014 and 981, for operating the seize relay R990. Upon operating the seize relay R990 completes, at the contacts 991, a path for applying ground potential to the conductor C925 of the trunk 920, thereby to illuminate the busy lamp L381 associated with the jack J380 terminating the trunk 920 in order to indicate that the trunk 920 and consequently the toll line circuit 900 terminating the toll line 1110 is busy at this time. Upon operating the line relay R965 completes, at the contacts 967, a circuit for operating the hold relay R970; and upon operating the hold relay completes, at the contacts 976, a circuit for operating the switch relay R1030. Upon operating the switch relay R1030 completes, at the contacts 1039, a circuit for operating the busy relay R980. Upon operating the busy relay R980 completes, at the contacts 986, a multiple path for applying ground potential to the conductor C925 of the trunk 920; interrupts, at the contacts 981, the circuit for maintaining operated the seize relay R990; and completes, at the contacts 982, a direct path, including the contacts 1014, for applying ground potential to the control conductor C913 of the trunk 910. Also the switch relay R1030 completes, at the contacts 1037, a circuit, including the contacts 1022 and 973, for energizing the lower winding of the signal relay R1060; and completes, at the contacts 1033 and 1035, a path, including the windings 934 of the repeating coil 932 and the contacts 966 and 971 for bridging the upper winding of the signal relay R1060 across the line conductors C1112 and C1111 of the toll line 1110, thereby to complete a loop circuit for energizing the upper winding of the signal relay R1060 in series with the upper and lower windings of the line relay R1120 and the ring relay R1125 in the toll line circuit 1100. When both the upper and lower windings of the signal relay R1060 are thus energized, the latter relay does not operate as it is of the polarized type. Further the switch relay R1030 interrupts, at the contacts 1032 and 1034, the normal connections between the upper and lower windings of the bridge relay R1050 and the windings 934 of the repeating coil 932. The loop circuit for energizing the upper winding of the signal relay R1060 in series with the upper and lower windings of the line relay R1120 and the ring relay R1125 further includes the contacts 1117 and 1119, the windings 1131 of the repeating coil 1130 and battery and ground potentials at the terminals of the upper and lower windings of the line relay R1120. When this loop circuit is thus completed, the signal relay R1060 does not operate as previously noted; moreover the ring relay R1125 does not operate as it is of the differential type. However, the line relay R1120 operates to complete, at the contacts 1123, a circuit for operating the hold relay R1230. Upon operating the hold relay R1230 completes, at the contacts 1234, a circuit, including the contacts 1265, for operating the switch relay R1140. Upon operating the switch relay R1140 interrupts, at the contacts 1143', a normally completed path, including the impedance 1135 and the contacts 1262, for applying battery potential to the control conductor C1223 of the C. L. R. trunk 1220; and completes, at the contacts 1142', a substantially identical path for applying ground potential to the control conductor C1223; whereby the C. L. R. trunk 1220 incoming to the toll line circuit 1100 is marked as busy to the selectors 1207, etc., having access thereto. Also the switch relay R1140 completes, at the contacts 1149, a path for applying ground potential to the control conductor C1213 of the trunk 1210 extending to the toll intermediate selector 1215; and completes, at the contacts 1148, a path, including the contacts 1256 and 1233, for applying ground potential to the EC conductor C1214 of the trunk 1210; whereby the toll intermediate selector 1215 is seized. Also the switch relay R1140 completes, at the contacts 1141, 1143, 1144 and 1147, a loop circuit between the upper winding of the end-of-dial relay R1150 and the line conductors C1211 and C1212 of the trunk 1210 extending to the toll intermediate selector 1215. This loop circuit extends from the line conductor C1211 by way of the contacts 1121, 1141 and 1251, the upper winding 1132 of the repeating coil 1130, the contacts 1143 and 1152, the associated resistor, the upper winding of the end-of-dial relay R1150 the contacts 1155 and 1144, the lower winding 1132 of the repeating coil 1130, the contacts 1254 and 1147 to the line conductor C1212; whereby the upper winding of the end-of-dial relay R1150 is energized. However, the latter relay does not operate at this time as it is of the differential type and the lower winding thereof is also energized by way of a circuit completed, at the contacts 1146 of the operated switch relay R1140, and including the resistor 1165 and the contacts 1243. At this time the toll transmission selector 800 has seized the toll line circuit 900 over the trunk 910; the toll line circuit 900 has seized the toll line circuit 1100 over the toll line 1110; and the toll line circuit 1100 has seized the toll intermediate selector 1215 over the trunk 1210; whereby the toll intermediate selector 1215 is conditioned to be responsive to the first digit transmitted over the trunk 1210.

The operator at the toll board 220 then proceeds to dial the second digit 4; whereby it is received over the toll line 220 by the toll line circuit 400 and repeated by the pulse relay R470 at the contacts 471 over the loop circuit extending between the left-hand winding of the answer relay R475 in the toll line circuit 400 and the line relay R965 in the toll line circuit 900; whereby the line relay R965 follows. Each time the line relay R965 restores and then reoperates, it interrupts and then recompletes, at the contacts 967, the circuit for maintaining operated the hold relay R970; whereby the latter relay is retained in its operated position during impulsing as it is of the slow-to-release type. Also, each time the line relay R965 restores and then reoperates, it completes and then interrupts, at the contacts 968, a circuit, including the contacts 974, for operating the dial relay R1020; whereby the latter relay operates and remains operated during impulsing as it is of the slow-to-release type. Upon operating the dial relay R1020 completes, at the contacts 1021, a path for short-circuiting the upper winding of the signal relay R1060 in order to improve impulsing over the toll line 1110; and interrupts, at the contact 1022, the previously traced circuit for energizing the lower winding of the signal relay R1060; whereby the latter relay does not operate during impulsing. Also the dial relay R1020 completes, at the contacts 1023, a circuit, including the contacts 1013', 1048, and 976, for operating the ring relay R1080. Upon operating the ring relay R1080 completes, at the contacts 1082, a holding circuit, includuing the contacts 1048 and 976, for energizing the winding thereof. Also each time the line relay R965 restores and then reoperates, it interrupts and then recompletes, at the contacts 966, the previously traced loop circuit extending via the line conductors C1112 and C1111 of the toll line 1110 to the ring relay R1125 and the line relay R1120 in the toll line circuit 1100; whereby the line relay R1120 follows.

Each time the line relay R1120 restores and then reoperates, it interrupts and then recompletes, at the contacts 1123, the circuit for maintaining operated the hold relay R1230; whereby the hold relay is retained in its operated position during impulsing as it is of the slow-to-release type. Also each time the line relay R1120 restores and then reoperates, it completes and then interrupts, at the contacts 1122, a circuit, including the contacts 1157 and 1236, for operating the dial relay R1240; whereby the latter relay operates and remains operated during impulsing as it is of the slow-to-release type. Upon operating the dial relay R1240 completes, at the contacts 1242, a path for short-circuiting the upper winding 1132 of the repeating coil 1130 in series with the upper winding of the end-of-dial relay R1150; and interrupts, at the contacts 1243, the previously traced circuit for energizing the lower winding of the end-of-dial relay R1150, thereby positively to prevent operation of the latter relay during impulsing. Also each time the line relay R1120 restores and then reoperates, it interrupts and then recompletes, at the contacts 1121, the loop circuit extending via the line conductors C1211 and C1212 of the trunk 1210 to the toll intermediate selector 1215; whereby the second digit 4 is repeated to the toll intermediate selector 1215 in order to effect operation thereof. More particularly, the toll intermediate selector operates to select the group of trunks, including the trunk 1216 and then an idle trunk therein, such, for example, as the trunk 1216 extending to the combination connector 1217; whereupon the toll intermediate selector 1215 switches through extending the loop circuit via the trunk 1216 to the line relay in the combination connector 1217.

At the conclusion of the second digit 4, the line relay R965 in the toll line circuit 900 is retained in its operated position; whereby the dial relay R1020 restores shortly thereafter to interrupt, at the contacts 1021, the path for short-circuiting the upper winding of the signal relay R1060; and to recomplete, at the contacts 1022, the circuit for energizing the lower winding of the signal relay R1060; whereby the signal relay R1060 is retained in its restored position. Also the line relay R1120 in the toll line circuit 1100 is retained in its operated position; whereby the dial relay R1240 restores shortly thereafter to interrupt, at the contacts 1242, the path for short-circuiting the upper winding of the end-of-dial relay R1150; and to recomplete, at the contacts 1243, the circuit for energizing the lower winding of the end-of-dial relay R1150; whereby the latter relay is retained in its restored position. At this time the loop circuit from the upper winding of the end-of-dial relay R1150 in the toll line circuit 1100 has been extended via the trunk 1210, the toll intermediate selector 1215 and the trunk 1216 to the line relay in the combination connector 1217; whereby the combination connector 1217 is seized and is conditioned to be responsive to the next two digits transmitted over the trunk 1210.

The third and fourth digits are received by the toll line circuit 400 and repeated to the toll line circuit 900 and thence repeated to the toll line circuit 1100 and thence repeated to the combination connector 1217 in an identical manner; whereby the combination connector 1217 operates to select the subscriber line 1202 extending to the called subscriber substation T1201 in the distant exchange 30. The subsequent operation of the combination connector 1217 depends upon the idle or busy condition of the called subscriber substation T1201; and first assuming that the called subscriber substation T1201 is idle at this time, the combination connector 1217 switches through drying the loop extending back to the upper winding of the end-of-dial relay R1150 and seizing the subscriber line 1202 extending to the called subscriber substation T1201. When the upper winding of the end-of-dial relay R1150 is thus deenergized, it operates first to close the contacts 1156 in order to short-circuit the resistor 1165; whereupon the lower winding of the end-of-dial relay R1150 is fully energized, causing the latter relay to operate fully, shortly thereafter, it being of the slow-to-operate type as well as of the differential type, as previously noted. Upon operating the end-of-dial relay R1150 completes at the contacts 1158, a circuit including the contacts 1187, for operating the reverse battery relay R1115; and completes, at the contacts 1151′, a path, including the contacts 1144′, for bridging the condenser 1178 across the condenser 1133 terminating the windings 1131 of the repeating coil 1130. Upon operating the reverse battery relay R1115 reverses, at the contacts 1116, 1117, 1118 and 1119, the polarity of the line conductors C1111 and C1112 of the toll line 1110 with respect to the upper and lower windings of the line relay R1120; whereby the upper winding of the signal relay R1060 in the toll line circuit 900 is energized in the reverse direction and is thus poled to operate. Upon operating the signal relay R1060 completes, at the contacts 1061, a circuit, including the contacts 1043, for energizing the winding of the control relay R1040 in order to cause the latter relay to operate shortly thereafter, it being of the slow-to-operate type; and completes, at the contacts 1063, a circuit for operating the hold relay R1070. Upon operating the control relay R1040 completes, at the contacts 1042, a holding circuit, including the contacts 1038, for energizing the winding thereof; and interrupts, at the contacts 1043, the original operating circuit therefor. Also the control relay R1040 interrupts, at the contacts 1048, the holding circuit for maintaining operated the ring relay R1080; whereby the latter relay restores shortly thereafter, it being of the slow-to-release type. Further the control relay R1040 completes, at the contacts 1047, a path, including the contacts 976, 1081, 1074 and 1035, the lower winding 934 of the repeating coil 932 and the contacts 971 for applying ground potential to the line conductor C1111 of the toll line 1110. Subsequently, when the ring relay R1080 restores, it interrupts, at the contacts 1081, the above traced path for applying ground potential to the line conductor C1111 of the toll line 1110.

When ground potential is thus applied to the line conductor C1111 of the toll line 1110 and then removed therefrom, a path, including the contacts 1116 and the lower winding 1131 of the repeating coil 1130 is completed and then interrupted for short-circuiting in series the lower windings of the ring relay R1125 and the line relay R1120; whereby the line relay R1120 is retained in its operated position and the ring relay R1125 operates and then restores as it is of the differential type. Upon operating the ring relay R1125 completes, at the contacts 1126, a circuit for energizing the winding of the ring relay R1250; whereby the latter relay operates shortly thereafter, it being of the slow-to-operate type. Accordingly, the ring relay R1125 operating and then restoring, effects operation and subsequent restoration of the ring relay R1250. When the ring relay R1250 operates and then restores, it interrupts and then recompletes, at the contacts 1256, the previously traced path for applying ground potential to the EC conductor C1214 of the trunk 1210 extending to the toll intermediate selector 1215 and therethrough via the trunk 1216 into the combination connector 1217; whereby a ringing cycle of the combination connector 1217 is initiated. Specifically, the combination connector 1217 operates to project ringing current over the subscriber line 1202 to the called subscriber substation T1201 in order to operate the ringer thereat indicating to the subscriber at the called subscriber substation T1201 that a call is waiting to be answered.

When the subscriber at the called subscriber substation T1201 answers the call, a loop circuit is completed for energizing in series the upper winding of the tone relay R1160 and the upper and lower windings of the signal relay R1170. This loop circuit extends from ground by way of the lower winding of the signal relay R1170, the contacts 1154, and 1144, the lower winding 1132 of the repeating coil 1130, the contacts 1254 and 1147 to the line conductor C1212; and from battery potential by way of the upper winding of the signal relay R1170, the upper winding of the tone relay R1160, the contacts 1153 and 1143, the upper winding 1132 of the repeating coil 1130, the contacts 1251, 1141 and 1121, to the line conductor C1211; the line conductors C1211 and C1212 of the trunk 1210 being extended via the toll intermediate selector 1215, the trunk 1216, the combination connector 1217 and the line conductors of the subscriber line 1202 to the called subscriber substation T1201. Accordingly, the signal relay R1170 and the tone relay R1160 operate. Upon operating the tone relay R1160 completes, at the contacts 1164, a holding circuit, including the contacts 1146, for energizing the lower winding thereof; and completes, at the contacts 1163, a path for short-circuiting the upper winding thereof. Also the tone relay R1160 completes, at the contacts 1162, and then interrupts, at the contacts 1161, a path, including the condenser 1173 and the contacts 1121 between the intercept conductor C1174 and the negative line conductor C1211 of the trunk 1210; whereby a splash of intercept tone is transmitted over the connection to the called subscriber substation T1201 in order to indicate to the subscriber thereat that the present call extended thereto is a toll call. Upon operating the signal relay R1170 completes, at the contacts 1171, a circuit for operating the supervisory relay R1180; and completes, at the contacts 1172, a multiple point in the holding circuit for energizing the lower winding of the tone relay R1160. Upon operating the supervisory relay R1180 interrupts, at the contacts 1187, the circuit for maintaining operated the reverse battery relay R1115; and completes, at the contacts 1184, a multiple path, including the contacts 1148 for applying ground potential to the EC conductor C1214 of the trunk 1210. Upon restoring the reverse battery relay R1115 again reverses, at the contacts 1116, 1117, 1118 and 1119, the polarity of the line conductors C1111 and C1112 of the toll line 1110 with respect to the upper and lower windings of the line relay R1120; whereby the upper winding of the signal relay R1060 in the toll line circuit 900 is again poled to restore.

Upon restoring the signal relay R1060 completes, at the contacts 1062, a path, including the contacts 1046, 1018 and 975, for applying ground potential to the EC conductor of the trunk 910 and through to the EC conductor C424 of the trunk 420 in order to effect operation of the supervisory relay R430 in the toll line circuit 400 and the consequent operation of the signal relay in the toll line circuit 215 in order to extinguish the front supervisory lamp associated with the cord circuit at the toll board 220 in order to indicate to the operator thereat that the subscriber at the called subscriber substation T1201 in the distant exchange 30 has answered the call. Also upon restoring the signal relay R1060 interrupts, at the contacts 1063, the circuit for maintaining operated the hold relay R1070 in order to cause the latter relay to restore shortly thereafter, it being of the slow-to-release type. The operator at the calling toll board 220 then advises the subscriber at the called subscriber substation T1201 that there is a toll call for him, completes the connection to the calling circuit, and then retires from the established connection.

The subscriber at the called subscriber substation T1201 may render switchhook supervision to the operator at the calling toll board 220 by appropriately operating the switchhook in order to cause the signal relay R1170 to follow. Each time the signal relay R1170 restores and then reoperates, it interrupts, and then recompletes, at the contacts 1171, the circuit for maintaining operated the supervisory relay R1180; whereby the latter relay follows. Each time the supervisory relay R1180 restores and then reoperates, it completes and then interrupts, at the contacts 1187, the circuit for operating the reverse battery relay R1115; whereby the latter relay follows reversing and then restoring, at the contacts 1116, 1117, 1118 and 1119, the polarity of the line conductors C1112 and C1111 of the toll line 1110; whereby the signal relay R1060 in the toll line circuit 900 follows. Each time the signal relay R1060 operates and then restores, it interrupts and then recompletes, at the contacts 1062, the previously traced circuit for maintaining operated the supervisory relay R430 in the toll line circuit 400; whereby the latter relay follows repeating to the signal relay in the toll line circuit 215 in order to cause corresponding flashing of the front supervisory lamp associated with the cord circuit at the toll board 220 in order to render to the operator thereat switchhook supervision. The operator at the toll board 220 may then re-enter the connection and converse with the subscriber at the called subscriber substation T1201.

At the conclusion of the connection, when the subscriber at the called subscriber substation T1201 disconnects, the signal relay R1170 restores effecting restoration of the supervisory relay R1180 and the consequent operation of the reverse battery relay R1115; whereby the signal relay R1060 is reoperated in order to effect reoperation of the hold relay R1070 in the manner described. Also upon operating the signal relay R1060 effects restoration of the supervisory relay R430 in the toll line circuit 400 and the consequent restoration of the signal relay in the toll line circuit 215; whereby the front supervisory lamp associated with the cord circuit at the toll board 220 is illuminated to render to the operator thereat, disconnect supervision. The operator at the toll board 220 may release the connection by withdrawing the front plug of the cord circuit in use from the jack terminating the trunk 216 in order to bring about the release of the toll line circuit 215, the toll line circuit 400 and the toll transmission selector 800 in a manner substantially identical to that described in Sect. 5. When the toll transmission selector 800 is thus released, the loop circuit to the line relay R965 in the toll line circuit 900 is interrupted; whereby the latter relay restores effecting the restoration of the hold relay R970 shortly thereafter, it being of the slow-to-release type. Upon restoring the hold relay R970 interrupts, at the contacts 976, the circuit for maintaining operated the switch relay R1030; and upon restoring the switch relay R1030 interrupts, at the contacts 1038, the holding circuit for maintaining operated the control relay R1040; and interrupts, at the contacts 1033 and 1035, the loop circuit, including the upper winding of the signal relay R1060; and interrupts, at the contacts 1037, the circuit for energizing the lower winding of the signal relay R1060; whereby the latter relay restores. Also the switch relay R1030 recompletes, at the contacts 1032 and 1034, the circuit for bridging the upper and lower windings of the bridge relay R1050 across the line conductors C1112 and C1111 of the toll line 1110; whereby the upper and lower windings of the bridge relay R1050 are energized in series with the upper and lower windings of the ring relay R1125 and the line relay R1120. Accordingly, the bridge relay R1050 operates; however, the line relay R1120 does not operate as it is of the marginal type and the ring relay R1125 does not operate as it is of the differential type. In fact, the line relay R1120 restores by virtue of the inclusion of the resistors 1052 and 1053 in the loop circuit above traced bringing about the release of the toll line circuit 1100 as explained hereinafter; whereupon the bridge relay R1050 restores. While the bridge relay R1050 occupied its operated position, it retained completed, at the contacts 1051, an alternative holding circuits for maintaining operated the hold relay R1070; the original circuit for operating the hold relay R1070 being interrupted, at the contacts 1063, incident to the restoration of the signal relay R1060. Shortly thereafter, the hold relay R1070 restores, as it is of the slow-to-release type. Upon restoring the hold relay R1070 interrupts, at the contacts 1076, a holding circuit, including the contacts 985, for maintaining operated the busy relay R980; whereby the latter relay restores.

Upon restoring the busy relay R980 interrupts, at the contacts 982, the path for applying ground potential to the control conductor C913 of the trunk 910 and recompletes, at the contacts 981, the path for applying battery potential by way of the winding of the seize relay R990 to the control conductor C913 in order to mark the trunk 910 as idle to the toll transmission selectors having access thereto. Further the busy relay R980 interrupts, at the contacts 986, the circuit for illuminating the busy lamp L381 associated with the jack J380 terminating the trunk 920 at the toll board 300 in order to indicate that the trunk 920 and consequently the toll line circuit 900 and connected toll line 1110 are idle at this time.

As previously explained, when the switch relay R1030 restores to disconnect the upper winding of the signal relay R1060 from across the line conductors C1111 and C1112 of the toll line 1110 and to reconnect the upper and lower windings of the bridge relay R1050 across the line conductors C1111 and C1112, the line relay R1120 in the toll line circuit 1100 restores in order to effect the release of the toll line circuit 1100 as previously noted. Specifically, upon restoring the line relay R1120 interrupts, at the contacts 1123, the circuit for maintaining operated the hold relay R1230 causing the latter relay to restore shortly thereafter, it being of the slot-to-release type. Upon restoring the hold relay R1230 interrupts, at the contacts 1234, the circuit for maintaining operated the switch relay R1140; whereby the latter relay upon restoring disconnects, at the contacts 1143 and 1144, the signal relay R1170 from the windings 1132 of the repeating coil 1130; and interrupts, at the contacts 1146, the holding circuit for maintaining operated the tone relay R1160. Also at the contacts 1146, the switch relay R1140 interrupts the holding circuit for maintaining operated the end-of-dial relay R1150; and upon restoring the end-of-dial relay R1150 interrupts, at the contacts 1153, the circuit for maintaining operated the reverse battery relay R1115; whereby the latter relay restores, at the contacts 1116, 1117, 1118 and 1119, the normal polarity of the line conductors C1112 and C1111 of the toll line 1110. Also the switch relay R1140 interrupts, at the contacts 1148 and 1149, the respective paths, for applying ground potential to the EC conductor C1214 and to the control conductor C1213 of the trunk 1210 in order to bring about the release of the combination connector 1217 and the toll intermediate selector 1215. When the combination connector 1217 is thus released, the line circuit 1203 is operated again to mark the subscriber line 1202 extending to the subscriber substation T1201 as idle to the connectors having access thereto. At this time the established connection between the calling toll board 220 in the distant office 10 and the called subscriber substation T1201 in the distant exchange 30 is released and all of the apparatus involved therein is completely released and available for further use.

Reconsidering the extension of the call from the calling toll board 220 in the distant office 10 to the called subscriber substation T1201 in the distant exchange 30, the combination connector 1217 may test the subscriber line 1202 extending to the called subscriber substation T1201 as busy when it is selected; whereby the combination connector 1217 operates to dry the loop extending back to the upper winding of the end-of-dial relay R1150 in the toll line circuit 1100 and to cause 60 ground impulses per minute to be applied to the negative line conductor of the trunk 1216 and consequently to the negative line conductor C1211 of the trunk 1210. Accordingly, the end-of-dial relay R1150 operates connecting the tone relay R1160 and the signal relay R1170 to the line conductors C1211 and C1212 of the trunk 1210 as previously explained. Accordingly, the upper winding of the signal relay R1170 is energized 60 times per minute causing the latter relay to follow and repeat, at the contacts 1171, to the supervisory relay R1180. The supervisory relay R1180 follows repeating, at the contacts 1187, to the reverse battery relay R1115; whereby the latter relay follows reversing and then restoring, at the contacts 1116, 1117, 1118 and 1119, the polarity of the line conductors C1112 and C1111 of the toll line 1110; whereby the signal relay R1060 in the toll line circuit 900 follows. The signal relay R1060 repeats, at the contacts 1062, to the supervisory relay R430 in the toll line circuit 400; whereby the latter relay repeats to the signal relay in the toll line circuit 215 in order to bring about flashing at 60 times per minute of the front supervisory lamp associated with the cord circuit at the toll board 220 indicating to the operator thereat the line-busy condition mentioned. The operator at the toll board 220 then proceeds to release the apparatus in the manner previously explained.

Again reconsidering the extension of the call from the calling toll board 220 in the distant office 10 to the called subscriber substation T1201 in the distant exchange 30, after the toll intermediate selector 1215 responds to the second digit 4, it may test as busy all of the trunks in the group, including the trunk 1216; whereby the toll intermediate selector 1215 operates to dry the loop circuit extending back to the upper winding of the end-of-dial relay R1150 and to apply 120 ground impulses per minute to the negative line conductor C1211 of the trunk 1210. The operation of the apparatus is the same as that described above except that the front supervisory lamp associated with the cord circuit at the toll board 220 is flashed 120 times per minute in order to indicate to the operator thereat the all-trunks-busy condition mentioned. Moreover, the toll transmission selector 800, after responding to the first digit 8, may test all of the trunks in the group, including the trunk 910, as busy; whereby it operates to cause the wiper carriage of the Strowger mechanism 801 to be driven eleven steps in the rotary direction away from its normal rotary position; whereupon an all-trunks-busy signal is returned to the calling toll board 220 in the manner explained in Sect. 5.

*Sect. 12.—A call from the toll board in the central office to a subscriber substation or to the toll board in the distant office*

In order to initiate a call at the toll board 300 in the central office 20 that is to be extended into the distant office 10, the operator at the toll board 300 selects an idle cord circuit, such, for example, as the cord circuit 320 and inserts the front plug P322 thereof into a jack terminating a trunk extending to an idle toll line circuit in the group, including the toll line circuit 400, such, for example, as the jack J378 terminating the trunk 410 extending to the toll line circuit 400. The toll line circuit 400 and consequently the toll line 210 is indicated as idle by the extinguished busy lamp L379 associated with the jack J378 terminating the trunk 410. When the front plug P322 of the cord circuit 320 is inserted into the jack J378, the first contacts thereof are closed completing a path for applying ground potential to the conductor C414 of the trunk 410. Also a circuit including the contacts 352, the sleeve of the front plug P322, the sleeve of the jack J378 and the conductor C413 of the trunk 410 is completed for energizing the winding of the front supervisory relay R355 in the cord circuit 320 in series with the upper winding of the seize relay R400 in the toll line circuit 400; whereby the front supervisory relay R355 does not operate as it is of the marginal type, while the seize relay R400 operates. Upon operating the seize relay R400 completes, at the contacts 401, a circuit for operating the control relay R440; and upon operating the control relay R440 completes, at the contacts 447, a circuit, including the ground conductor C414 of the trunk 410 for operating the cut-through relay R490. Upon operating the cut-through relay R490 completes, at the contacts 495 a point in multiple to the contacts 447 in a holding circuit for energizing the winding thereof; and completes, at the contacts 496, a circuit, including the contacts 472 and 402, as well as the conductor C413 of the trunk 410 for energizing the lower winding of the seize relay R400 in multiple with the upper winding thereof and in series with the winding of the front supervisory relay R355 in the cord circuit 320; whereby the seize relay R400 is retained in its operated position and the front supervisory relay R355 operates as it is of the marginal type. Upon operating the front supervisory relay R355 completes, at the contacts 356, a circuit for illuminating the front supervisory lamp L335 associated with the front plug P322 of the cord circuit 320 in order to indicate that the present call has not been answered at this time.

Also the cut-through relay R490 completes, at the contacts 497, a circuit, including the conductor C415 of the trunk 410 for illuminating the busy lamp L379 associated with the jack J378 in order to indicate that the toll line circuit 400 and consequently the toll line 210 is busy at this time. Further the cut-through relay R490 completes, at the contacts 494, a circuit, including the contacts 451 and 446, for operating the supervisory relay R430; whereby the latter relay interrupts, at the contacts 433, the normal path, including the contacts 478, for connecting ground potential to the simplex conductor C388; and completes, at the contacts 432, the path for applying battery potential by way of the resistor 478 to the simplex conductor C388. This application of battery potential through the intermediate winding of the signal relay R385 in the toll line circuit 400 does not effect operation thereof; however, it does effect operation of the signal relay in the toll line circuit 215; whereby the toll line circuit 215 seizes over the trunk 217, the toll transmission selector 221 conditioning it to be responsive to the first digit transmitted over the toll line 210. Further the cut-through relay R490 in the toll line circuit 400 completes, at the contacts 491 and 492, a connection, including the contacts 441, 444 and 467, 469, and the windings 396 of the repeating coil 395 for bridging the winding of the re-ring relay R455 across the line conductors C411 and C412 of the trunk 410 which are extended via the tip and the ring of the jack J378, the tip and the ring of the front plug P322, the first and third contacts of the ring front key K331 and the first and third contacts of the dial front key K333 to the headset 329 at the toll board 300.

The operator at the toll board 300 then operates the dial front key K333 in order to interrupt, at the first and third contacts thereof, the connection between the headset 329 and the line conductors C411 and C412 of the trunk 410; and to complete, at the second and fourth contacts thereof, a connection, including the impulsing contacts 307 of the dial 326 across the line conductors C411 and C412. The operator at the toll board 300 then proceeds to dial the first digit; whereupon the finger wheel of the dial 326 is operated away from its normal position closing the set of switch springs S328 in order to complete a circuit for operating the dial relay R350. Upon operating the dial relay R350 interrupts, at the contacts 351, the path for applying battery potential to the terminal of the rear supervisory relay R345; and interrupts, at the contacts 352, the path for applying battery potential to the terminal of the front supervisory relay R355 in order to interrupt the circuit for energizing the winding of the front supervisory relay R355 in the cord circuit 320 in series with the upper and lower windings of the seize relay R400 in the toll line circuit 400; whereupon the relays mentioned restore. Upon restoring the front supervisory relay R355 interrupts, at the contacts 356, the circuit for illuminating the front supervisory lamp L335. Upon restoring the seize relay R400 interrupts, at the contacts 401, the circuit for maintaining operated the control relay R440. Upon restoring the control relay R440 interrupts, at the contacts 441 and 444, the previously traced connection between the line conductors C411 and C412 of the trunk 410 and the winding of the re-ring relay R455; and completes, at the contacts 442 and 445, a series circuit, including the impulse contacts 327 of the dial 320 for energizing the winding of the supervisory relay R430; which circuit extends from ground potential by way of the contacts 445 and 492 to the line conductor C412 and from battery potential by way of the winding of the supervisory relay R430 and the contacts 442 and 491 to the line conductor C411; the line conductors C412 and C411 of the trunk 410 being bridged together at the impulse contacts 327 of the dial 326 via the jack J378 and the front plug P322 of the cord circuit 320. Also upon restoring the control relay R440 interrupts, at the contacts 446, the original circuit for operating the supervisory relay R430. Accordingly, at this time, the circuit for maintaining operated the supervisory relay R430 in the toll line circuit 400 includes the impulse contacts 327 of the dial 326. Hence, when the finger wheel of the dial 326 is released, the impulse contacts 327 thereof are governed in accordance with the present digit causing the supervisory relay R430 to follow, repeating, at the contacts 432 and 433, over the simplex conductor C388; whereby the signal relay R385 in the toll line circuit 400 is retained in its restored position and the signal relay in the toll line circuit 215 follows repeating to the toll transmission selector 221 in order to govern operation thereof.

At the conclusion of the first digit when the finger wheel of the dial 326 is returned to its normal position, the set of switch springs 328 is opened interrupting the circuit for maintaining operated the dial relay R350 in the cord circuit 320; whereupon the latter relay restores shortly thereafter, it being of the slow-to-release type.

Upon restoring the dial relay R350 returns, at the contacts 351 and 352, battery potential to the terminals of the rear supervisory relay R345 and the front supervisory relay R355; whereby the winding of the front supervisory relay R355 is energized in series with the upper winding of the seize relay R400 causing the latter relay to reoperate. Upon reoperating the seize relay R400 recompletes, at the contacts 402, the circuit for energizing the lower winding thereof in multiple with the upper winding thereof; whereby the front supervisory relay R355 is reoperated in order again to illuminate the front supervisory lamp L335. Also the seize relay R400 effects reoperation of the control relay R440; whereby the latter relay completes, at the contacts 446, the previously traced original circuit for maintaining operated the supervisory relay R430. Also the control relay R440 interrupts, at the contacts 442 and 445, the alternative circuit for maintaining operated the supervisory relay R430 and including the impulse contacts 327 of the dial 326. Finally, the control relay R440 recompletes, at the contacts 441 and 444, the connection between the winding of the re-ring relay R455 and the line conductors C411 and C412 of the trunk 410.

In view of the foregoing, it will be understood that the dial 326 may be operated in accordance with one or more digits in order to cause the supervisory relay R430 to repeat the impulses of each digit over the simplex conductor C388 to the signal relay in the toll line circuit 215; whereby the toll transmission selector 221 and the subsequent switching stages of the toll switch train in the distant office 10 may be controlled in a manner substantially identical to the control of the toll switch train in the central office 20; all described in Sects. 5 to 9, inclusive. Accordingly, the present call may be extended from the calling toll board 300 in the central office 20 to a called subscriber substation in the central office 10 or to the called toll board 220 therein. After the operator at the calling toll board 300 dials all of the required digits in the manner explained above, the dial front key K333 is restored interrupting at the second and fourth contacts thereof, the connection to the dial 326; and recompleting, at the first and third contacts thereof, the connection to the headset 329. At this time the headset 329 at the toll board 300 is operatively connected via the front plug P322, the jack J378 to the windings 396 of the repeating coil 395; the windings 397 of the repeating coil 395 being operatively connected to the windings 392 of the repeating coil 390; and the windings 391 of the repeating coil 390 being directly connected to the line conductors C211 and C212 of the toll line 210.

Subsequently, after the call has been extended to the called destination and answered thereat, the toll line circuit 215 is governed over the trunk 217 and the toll transmission selector 221 in order to cause battery potential to be applied to the simplex of the toll line 210 and ground potential to be removed therefrom; whereby the signal relay R385 in the toll line circuit 400 is operated effecting operation of the pulse relay R470. Upon operating the pulse relay R470 interrupts, at the contacts 472, the circuit for energizing the lower winding of the seize relay R400 in multiple with the upper winding thereof; whereby the resistance of the circuit for energizing the winding of the front supervisory relay R355 in the cord circuit 320 is increased causing the latter relay to restore since it is of the marginal type. Upon restoring the front supervisory relay R355 interrupts, at the contacts 356, the circuit for illuminating the front supervisory lamp L335, thereby to indicate to the operator at the calling toll board 300 that the call has been answered in the distant office 10. At this time an established connection between the calling toll board 300 in the central office 20 and the called destination in the distant office 10 is completed. Supervision over the established connection between the calling toll board 300 in the central office 20 and the called destination in the distant office 10 is the same as that in the opposite direction described in Sects. 5, 6 and 7. Subsequently, when a release is performed at the called destination in the distant office 10, the toll line circuit 215 is governed to substitute ground potential for battery potential upon the simplex of the toll line 210 in order to bring about the restoration of the signal relay R385 in the toll line circuit 400 and the consequent restoration of the pulse relay R470. Upon restoring the pulse relay R470 recompletes, at the contacts 472, the low resistance circuit for energizing the lower winding of the seize relay R400 in multiple with the upper winding thereof; whereby the front supervisory relay R355 in the cord circuit 320 is reoperated effecting illumination of the front supervisory lamp L335 in order to render to the operator at the toll board 300 disconnect supervision.

In order to release the established connection, the operator at the toll board 300 withdraws the front plug P322 of the cord circuit 320 from the jack J378 interrupting the circuit for maintaining operated the front supervisory relay R355 in the cord circuit 320 and the seize relay R400 in the toll line circuit 400. Upon restoring the front supervisory relay R355 extinguishes the front supervisory lamp L335. Also the first contacts of the jack J378 are opened interrupting the holding circuit for maintaining operated the cut-through relay R490. Upon restoring the cut-through relay R490 interrupts, at the contacts 497, the circuit for illuminating the busy lamp L379 associated with the jack J378, thereby to indicate that the trunk 410 and consequently the toll line circuit 400 is idle at this time. Upon restoring the seize relay R400 interrupts, at the contacts 401, the circuit for maintaining operated the control relay R440; and upon restoring the control relay R440 interrupts, at the contacts 446, the circuit for maintaining operated the supervisory relay R430. Upon restoring the supervisory relay R430 changes, at the contacts 432 and 433, battery potential to ground potential upon the simplex conductor C388; whereby the signal relay in the toll line circuit 215 is restored to effect the release of the toll transmission selector 221 and the connected elements of the toll switch train in the distant office 10. At this time the established connection between the calling toll board 300 in the central office 20 and the called destination in the distant office 10 is released and all of the apparatus involved therein is completely released and available for further use.

*Sect. 13. A call from the toll board in the central office to a subscriber substation in the distant exchange*

Now assuming that a call is to be extended from the toll board 300 in the central office 20 to a subscriber substation such, for example, as the subscriber substation T1201 in the distant exchange 30, the operator at the toll board 300 first selects an idle cord circuit, such, for example, as the cord circuit 320, and inserts the front plug P322 thereof into a jack terminating an idle trunk in the group, including the trunk 920, such, for example, as the jack J380 terminating the trunk 920 extending to the toll line circuit 900 terminating the toll line 1110 extending between the central office 20 and the distant exchange 30. The trunk 920 is marked as idle by the extinguished condition of the busy lamp L381 associated with the jack J380 terminating the trunk 920. When the front plug P322 of the cord circuit 320 is inserted into the jack J380, the first contacts thereof are operated connecting ground potential to the conductor C924 of the trunk 920. Also a circuit, including the contacts 352, the sleeve of the front plug P322, the sleeve of the pack J380 and the conductor C923 of the trunk 920 is completed for energizing in series the winding of the front supervisory relay R355 in the cord circuit 320 and the upper winding of the supervisory relay R960 in the toll line circuit 900; whereby the supervisory relay R960 operates. However, the front supervisory relay R355 does not operate as it is of the marginal type. Upon operating the supervisory relay R960 completes, at the contacts 961, a circuit, including the contacts 972, for operating the switch relay R950. Upon operating the switch relay R950 completes, at the contacts 958 a circuit for operating the switch relay R940; whereby the latter relay completes, at the contacts 949, a holding circuit, including the grounded control conductor C924 of the trunk 920, for energizing the winding thereof. Also the switch relay R940 completes, at the contacts 940, a circuit, including the contacts 962, 1016, and 1045, for energizing the lower winding of the supervisory relay R960 in multiple with the upper winding thereof; whereby the supervisory relay R960 is retained in its operated position and the front supervisory relay R355 operates as it is of the marginal type, completing, at the contacts 356, a circuit for illuminating the front supervisory lamp L335 in order to indicate that the present call has not yet been answered. Further the switch relay R940 interrupts, at the contacts 943 and 945, the normal connections between the upper and lower windings of the line relay R965 and the windings 933 of the repeating coil 932; and completes, at the contacts 941, 942, 944, 946, 947 and 948, a connection between the winding of the ring relay R930 and the line conductors C922 and C921 of the trunk 920. More particularly, the headset 329 at the toll board 300 is connected to the tip and to the ring of the front plug P322 and via the tip and the ring of the jack J380 to the line conductors C922 and C921 of the trunk 920; the line conductor C922 being connected via the contacts 941, 942 and 953, the upper winding 933 of the repeating coil 932, the contacts 944, the winding of the ring relay R930, the contacts 946, the lower winding 933 of the repeating coil 932, the contacts 956, 948 and 947 to the line conductor C921. Further, the switch relay R940 completes, at the contacts 943', a circuit for operating the switch relay R1030; whereby the latter relay disconnects, at the contacts 1032 and 1034, the upper and lower windings of the bridge relay R1050 from the windings 934 of the repeating coil 932. Further, the switch relay R1030 completes, at the contacts 1037, a circuit, including the contacts 957 and 1022, for energizing the lower winding of the signal relay R1060; and completes, at the contacts 1033 and 1035, a path, including the windings of the repeating coil 932 and the contacts 951 and 954, for bridging the upper winding of the signal relay R1060 across the line conductors C1112 and C1111 of the toll line 1110; whereby the upper winding of the signal relay R1060 is also energized; however, the latter relay does not operate at this time as it is of the polarized type. Further, the switch relay R1030 completes, at the contacts 1039, a circuit for operating the busy relay R980; whereby the latter relay completes, at the contacts 986, a path, including the conductor C925 of the trunk 920, for illuminating the busy lamp L381 associated with the jack J380 in order to indicate the busy condition of the trunk 920 at this time. Also the busy relay R980 interrupts, at the contacts 981, the path for applying battery potential by way of the winding of the seize relay R990 to the control conductor C913 of the trunk 910; and completes, at the contacts 982, the path for applying ground potential to the control conductor C913; whereby the trunk 910 is marked as busy to the toll transmission selectors having access thereto. Further the busy relay R980 completes, at the contacts 983 and 985, a holding circuit, including the contacts 941', for energizing the winding thereof.

Moreover, the upper and lower windings of the ring relay R1125 and the line relay R1120 in the toll line circuit 1100 are energized in series circuit relation with the upper winding of the signal relay R1060; whereby the ring relay R1125 does not operate and the line relay R1120 operates; all as explained in Sect. 11. Also at this time, the hold relay R1230 and the switch relay R1140 are operated; the upper and lower windings of the end-of-dial relay R1150 are energized but the latter relay does not operate at this time; the C. L. R. trunk 1220 is marked as busy to the selectors having access thereto; and the toll intermediate selector 1215 is seized over the trunk 1210; all as explained in Sect. 11.

The operator at the toll board 300 then proceeds to operate the dial front key K333 and to dial the directory number of the called subscriber substation T1201 in the distant exchange 30 which is 4XX as previously noted. When the finger wheel of the dial 326 is operated away from its normal position in accordance with the first digit 4, the switch springs 328 are closed effecting operation of the dial relay R350; whereby the latter relay interrupts, at the contacts 352, the circuit for maintaining operated the front supervisory relay R355 and the supervisory relay R960. Upon restoring the supervisory relay R960 interrupts, at the contacts 961, the circuit for maintaining operated the switch relay R950. Upon restoring the switch relay R950 interrupts, at the contacts 953 and 956, the connection between the winding of the ring relay R930 and the line conductors C922 and C921 of the trunk 920; interrupts, at the contacts 951 and 954, the connection between the upper winding of the signal relay R1060 and the line conductors C1112 and C1111 of the toll line 1110; and completes, at the contacts 952 and 955, a direct connection, including the contacts 941 and 947, between the line conductors C922 and C921 of the trunk 920 and the line conductors C1112 and C1111 of the toll line 1110; whereby a direct loop circuit is completed, between the impulse contacts 327 of the dial 326 at the toll board 300 and the upper and lower windings of the ring relay R1125 and the line relay R1120 in the toll line circuit 1100. Also the switch relay R950 interrupts, at the contacts 957, the circuit for energizing the lower winding of the signal relay R1060, thereby to prevent operation of the latter relay at this time. The impulses of the first digit 4 are transmitted at the impulse contacts 327 of the dial 326 over the toll line 1110 causing the line relay R1120 to follow; whereby the toll intermediate selector 1215 is operated to select first the group of trunks, including the trunk 1216, and then an idle trunk therein, such, for example, as the trunk 1216 extending to the combination connector 1217; all in the manner explained in Sect. 11.

At the conclusion of the first digit 4, the switch springs 328 of the dial 326 are opened effecting restoration shortly thereafter of the dial relay R350; whereby battery potential at the contacts 352 is returned to the terminal of the front supervisory relay R355 in order to bring about reoperation of the supervisory relay R960; whereupon the front supervisory relay R355 is reoperated. Also upon reoperating the supervisory relay R960 effects reoperation of the switch relay R950; whereby the latter relay interrupts, at the contacts 952 and 955, the direct connection between the line conductors C922 and C921 of the trunk 920 and the line conductors C1112 and C1111 of the toll line 1110. Also, at the contacts 953 and 956, the line conductors C922 and C921 of the trunk 920 are reconnected to the winding of the ring relay R930; and at the contacts 951 and 954, the upper winding of the signal relay R1060 is again bridged across the line conductors C1112 and C1111 of the toll line 1110. Further the switch relay R950 recompletes, at the contacts 957, the circuit for energizing the lower winding of the signal relay R1060; however, the latter relay is not operated at this time. In a similar manner, the operator at the toll board 300 dials the second and third digits over the toll line 1110 to the line relay R1120 in the toll line circuit 1100; whereby the combination connector 1217 is operated to select the subscriber line 1202 extending to the called subscriber substation T1201. The subsequent operation of the combination connector 1217 depends upon the idle or busy condition of the called subscriber substation T1201 at this time; and assuming that the called subscriber substation T1201 is idle, the combination connector 1217 switches through in order to dry the loop circuit, including the upper winding of the end-of-dial relay R1150 causing the latter relay to operate; whereupon the reverse battery relay R1115 operates to reverse the polarity of the line conductors C1111 and C1112 of the toll line 1110; whereby the signal relay R1060 in the toll line circuit 900 is operated to effect operation of the hold relay R1070 and the control relay R1040; all in the manner explained in Sect. 11.

At this time the operator at the toll board 300 restores the dial front key K333 and operates the ring front key K331 interrupting, at the first and third contacts thereof, the connection to the headset 329 and completing at the second and fourth contacts thereof, a path for projecting ringing current over the tip and the ring of the front plug P322 and consequently over the line conductors C922 and C921 of the trunk 920. The operator at the toll board 300 then restores the ring front key K331 in order again to reconnect the headset 329 to the front plug P322. The ringing current projected over the line conductors C922 and C921 of the trunk 920 energizes the winding of the ring relay R930 effecting operation thereof shortly thereafter as it is of the combination slow-to-operate and slow-to-release type; whereby the ring relay R930 restores shortly after the ringing current is removed. When the ring relay R930 operates and then restores, it completes and then interrupts, at the contacts 931, a path, including the contacts 943', 1047, 1074 and 1035, the lower winding 934 of the repeating coil 932 and the contacts 954 for applying ground potential to the line conductor C1111 of the toll line 1110, thereby to effect operation and subsequent restoration of the ring relays R1125 and R1250 in the toll line circuit 1100; the ring relay R1250 interrupting and then recompleting, at the contacts 1256, the path for applying ground potential to the EC conductor C1214 of the trunk 1216; whereby a ringing cycle of the combination connector 1217 is initiated; all in the manner described in Sect. 11.

At this point it is noted that automatic ringing may be provided by modifying the cord circuit 320 slightly to include the X wiring indicated so that when the dial relay R350 operates, it not only interrupts, at the contacts 352, the previously traced path for applying battery potential to the terminal of the front supervisory relay R355, but it also completes a path, including the X wiring illustrated for connecting ground potential thereto; whereby ground potential is applied to the sleeve of the front plug P322 and consequently to the sleeve of the jack J380 and to the conductor C923 of the trunk 920. This application of ground potential to the conductor C923 of the trunk 920 completes a circuit, including the contacts 942', 959, 1012', the X wiring illustrated in the toll line circuit 900 and the resistor 1063 for operating the automatic ring relay R1090. Upon operating the automatic ring relay R1090 completes, at the contacts 1091, a circuit, including the X wiring illustrated, the contacts 1013', 1048, and 943', for operating the ring relay R1080. Upon operating the ring relay R1080 completes, at the contacts 1082, a holding circuit including the contacts 1048 and 943' for energizing the winding thereof. Also the ring relay R1080 prepares, at the contacts 1081, a path for applying ground potential to the line conductor C1111 of the toll line 1110; which path is completed automatically when the signal relay R1060 operates after all of the digits have been transmitted. More particularly, at this time the signal relay R1060 operates effecting operation of the control relay R1040 and the hold relay R1070, as previously explained; and upon operating the control relay R1040 completes, at the contacts 1047, the above mentioned path, including the contacts 943' and 1081, for applying ground potential to the line conductor C1111. Also the control relay R1040 interrupts, at the contacts 1048, the holding circuit for maintaining operated the ring relay R1080; whereby the latter relay restores shortly thereafter, it being of the slow-to-release type. Accordingly, in the event the X wiring illustrated in the cord circuit 320 and in the toll line circuit 900 is employed, automatic ringing is instituted without the necessity of the operator at the toll board 300 operating the ring front key K331 in the manner previously explained.

In any case at this time a ringing operation of the combination connector 1217 is instituted; whereby ringing current is projected therefrom over the subscriber line 1202 to the called subscriber substation T1201 in order to indicate to the subscriber thereat that a call is waiting to be answered. Subsequently, when the subscriber at the called subscriber substation T1201 answers the call, the tone relay R1160, the signal relay R1170 and the supervisory relay R1180 operate; the tone relay R1160 transmitting a short splash of intercept tone over the connection to the called subscriber substation T1201 in order to indicate to the subscriber thereat that the present call is a toll call; and the supervisory relay R1180 effecting restoration of the reverse battery relay R1115; whereby the polarity of the line conductors C1111 and C1112 of the toll line 1110 is restored to normal; all in the manner described in Sect. 11. When the polarity of the line conductors C1112 and C1111 of the toll line 1110 is thus reversed, the signal relay R1060 restores in order to effect the restoration of the hold relay R1070 shortly thereafter as the latter relay is of the slow-to-release type. Also the signal relay R1060 interrupts, at the contacts 1061, an alternative circuit completed, at the contacts 1044, incident to the operation of the control relay R1040, for energizing the lower winding of the supervisory relay R960 in multiple with the upper winding thereof; whereby the front supervisory relay R355 restores in order to interrupt, at the contacts 356, the circuit for illuminating the front supervisory lamp L335 to indicate to the operator at the toll board 300 that the call has been answered by the subscriber at the called subscriber substation T1201 in the distant exchange 30. Also upon restoring the hold relay R1070 completes, at the contacts 1075, a holding circuit, including the contacts 958, 1041 and 1013, for maintaining operated the switch relay R950. The operator at the calling toll board 300 then advises the subscriber at the called subscriber substation T1201 that there is a call for him, completes the connection to the calling circuit, and then retires from the established connection.

The subscriber at the called subscriber substation T1201 may render switchhook supervision to the operator at the toll board 300 by appropriately operating the switchhook in order to cause the signal relay R1170 to follow, repeating to the supervisory relay R1180; whereby the latter relay repeats to the reverse battery relay R1115 causing the polarity of the line conductors C1111 and C1112 of the toll line 1110 to be alternately reversed and restored. The signal relay R1060 follows, completing and then interrupting, upon each operation and restoration thereof, at the contacts 1061, the circuit for energizing the lower winding of the supervisory relay R960 in multiple with the upper winding thereof; whereby the front supervisory relay R355 in the cord circuit 320 follows bringing about flashing of the front supervisory lamp L335 associated with the front plug P322 in order to indicate to the operator at the toll board 300 that the subscriber at the called subscriber substation T1201 requires her attention. The operator at the toll board 300 then reenters the connection and converses with the subscriber at the called subscriber substation T1201.

At the conclusion of the connection, when the subscriber at the called subscriber substation T1201 disconnects, the signal relay R1170 restores to effect restoration of the supervisory relay R1180 and the consequent operation of the reverse battery relay R1115; whereby the signal relay R1060 is reoperated to complete the circuit for energizing the lower winding of the supervisory relay R960 in multiple with the upper winding thereof in order to effect operation of the front supervisory relay R355 and the consequent illumination of the front supervisory lamp L335 associated with the front plug P322 of the cord circuit 320, thereby to render to the operator at the toll board 300 disconnect supervision.

At this time should the operator at the toll board 300 wish to re-ring the subscriber at the called subscriber substation T1201, this may be accomplished by momentarily operating the ring front key K331 in the cord circuit 320 in order to effect operation and subsequent restoration of the ring relay R930; whereby the ring relay R930 completes and then interrupts, at the contacts 931, the previously traced path for applying ground potential to the line conductor C1111 of the toll line 1110 in order to bring about operation and subsequent restoration of the ring relay R1125. The ring relay R1125 operates and then restores to complete and then to interrupt, at the contacts 1126, the circuit for operating the ring relay R1250; whereby the latter relay operates and then restores to interrupt and then to recomplete, at the contacts 1256, the path for applying ground potential to the EC conductor C1214 of the trunk 1210 in order to initiate another ringing cycle of the combination connector 1217. When the subscriber at the called subscriber substation T1201 subsequently reanswers the call, answer supervision is again returned to the operator at the calling toll board 300 in the manner previously explained.

After receiving disconnect supervision the operator at the toll board 300 may release the connection by withdrawing the front plug P322 of the cord circuit 320 from the jack J380; whereupon the circuit for maintaining operated the front supervisory relay R355 in the cord circuit 320 and the supervisory relay R960 in the toll line circuit 900 is interrupted. Also the first contacts of the jack J380 are opened to interrupt the application of ground potential to the control conductor C924 of the trunk 920. Upon restoring the supervisory relay R960 interrupts, at the contacts 961, the original circuit for energizing the winding of the switch relay R950, the holding circuit for energizing the winding of the switch relay R950 being interrupted, at the contacts 1075 of the operated hold relay R1070 at this time. Accordingly, the switch relay R950 restores, interrupting, at the contacts 958, the circuit for maintaining operated the switch relay R940. Upon restoring the switch relay R940 interrupts, at the contacts 943, the circuit for maintaining operated the switch relay R1030. Also the switch relay R950 interrupts, at the contacts 951 and 954, the circuit for energizing the upper winding of the signal relay R1060; and interrupts, at the contacts 957, the circuit for energizing the lower winding of the signal relay R1060; whereby the latter relay restores, interrupting, at the contacts 1063, the circuit for maintaining operated the hold relay R1070 causing the latter relay to restore shortly thereafter, it being of the slow-to-release type. Upon restoring the switch relay R1030 interrupts, at the contacts 1038, the holding circuit for maintaining operated the control relay R1040; and upon restoring the hold relay R1070 interrupts, at the contacts 1076, the holding circuit for maintaining operated the busy relay R980. Upon restoring the busy relay R980 interrupts, at the contacts 982, the path for applying ground potential to the control conductor C913 of the trunk 910; and recompletes, at the contacts 981, the path for applying battery potential by way of the winding of the seize relay R990 to the control conductor C913; whereby the trunk 910 is marked as idle to the toll transmission selectors having access thereto. Further the busy relay R980 interrupts, at the contacts 986, the circuit for illuminating the busy lamp L381 associated with the jack J380 in order to indicate that the trunk 920 and consequently the toll line circuit 900 terminating the toll line 1110 is idle at this time. Furthermore, when the switch relay R1030 restores, it recompletes, at the contacts 1031, 1032, 1034 and 1036, the normal connection also including the windings 934 of the repeating coil 932 and the resistors 1052 and 1053 for connecting the upper and lower windings of the bridge relay R1050 to the line conductors C1112 and C1111 of the toll line 1110; whereby the bridge relay R1050 operates momentarily; however, it does not prevent the release of the toll line circuit 1100; at which time the bridge relay R1050 restores; whereupon the toll line circuit 900 is completely released. During this short-time interval that the bridge relay R1050 occupies its operated position, it retains completed, at the contacts 1051, an alternative holding circuit for maintaining operated the hold relay R1070; whereby the latter relay retains operated the busy relay R980.

The release of the toll line circuit 1100, the toll intermediate selector 1215, and the combination connector 1217 proceeds in the manner described in Sect. 11; whereupon the line circuit 1203 is controlled in order again to mark the subscriber line 1202 extending to the subscriber substation T1201 as idle to the connectors having access thereto. At this time the connection between the calling toll board 300 in the central office 20 and the called subscriber substation T1201 in the distant exchange 30 is released and all of the apparatus involved therein is completely released and available for further use.

Reconsidering the extension of the connection from the calling toll board 300 to the called subscriber substation T1201 it is noted that in the event the combination connector 1217 tests as busy the subscriber line 1202 extending to the called subscriber substation T1201, it operates to dry the loop circuit extending back to the upper winding of the end-of-dial relay R1150 and to cause 60 ground impulses per minute to be applied to the negative line conductor C1211 of the trunk 1210. Likewise, in the event the toll intermediate selector 1215 tests as busy all of the trunks in the group, including the trunk 1216, it operates to dry the loop circuit extending back to the upper winding of the end-of-dial relay R1150 and to cause 120 ground impulses per minute to be applied to the negative line conductor C1211 of the trunk 1210. When the loop circuit mentioned is thus dried, the end-of-dial relay R1150 operates to connect the tone relay R1160 and the signal relay R1170 to the line conductors C1211 and C1212 of the trunk 1210; whereby the signal relay R1170 follows the impulses mentioned repeating to the supervisory relay R1180; whereupon the latter relay follows repeating to the reverse battery relay R1115. The reverse battery relay R1115 repeats to the signal relay R1060; whereby the latter relay repeats to the lower winding of the supervisory relay R960 causing the front supervisory relay R355 in the cord circuit 320 to follow. The latter relay flashes at the contacts 356, the front supervisory lamp L335 associated with the front plug P322 of the cord circuit 320 in order to render to the operator at the toll board 300 either the line busy supervision from the combination connector 1217 or the all-trunks-busy supervision from the toll intermediate selector 1215. The operator at the toll board 300 then withdraws the front plug P322 of the cord circuit 320 from the jack J380 terminating the trunk 920 in order to bring about the release of the apparatus in the manner previously explained.

*Sect. 14.—C. L. R. calls in the distant exchange*

Now assuming that a call has been initiated at the calling subscriber substation T1201 in the distant exchange 30 and that the finder 1206 has found the subscriber line 1202 extending thereto, the selector 1207 is conditioned to be responsive to the first digit transmitted over the subscriber line 1202. In order to extend a C. L. R. call the subscriber at the calling subscriber substation T1201 dials the single digit 0; whereby the selector 1207 is controlled to select the group of C. L. R. trunks, including the C. L. R trunk 1220, and then to select an idle C. L. R. trunk therein, such, for example, as the C. L. R trunk 1220. The C. L. R. trunk 1220 is marked as idle by the presence of battery potential upon the control conductor C1223 thereof via the contacts 1262 and 1143′ and the impedance 1135. When the selector 1207 seizes the C. L. R. trunk 1220, a loop circuit is completed from the calling subscriber substation T1201 to the upper and lower windings of the signal relay R1170. More particularly, ground potential is connected by way of the lower winding of the signal relay R1170, the contacts 1145, the lower winding 1132 of the repeating coil 1130 and the contacts 1254 to the line conductor C1221; and battery potential is connected by way of the upper winding of the signal relay R1170, the contacts 1142, the upper winding 1132 of the repeating coil 1130 and the contacts 1251 to the line conductor C1222; the line conductors C1221 and C1222 of the C. L. R. trunk 1220 extending via the selector 1207, the finder 1206 and the subscriber line 1202 to the calling subscriber substation T1201. When this loop circuit is thus completed the signal relay R1170 operates to complete, at the contacts 1171, the circuit for operating the supervisory relay R1180. Upon operating the supervisory relay R1180 completes, at the contacts 1185, a circuit, including the contacts 1141′, for operating the control relay R1260; and completes, at the contacts 1186, a circuit, including the contacts 1159, for operating the reverse battery relay R1115. Upon operating the control relay R1260 interrupts, at the contacts 1262, the previously traced path for applying battery potential by way of the impedance 1135 to the control conductor C1223; and completes, at the contacts 1263, a path, including the contacts 1283, for applying ground potential to the control conductor C1223; whereby the C. L. R. trunk 1220 is marked as busy to the other selectors having access thereto. Also the control relay R1260 completes, at the contacts 1261, a connection, including the condenser 1269 the contacts 1231, 1241 and 1251, between the interrupter generator conductor C1268 and the line conductor C1222 of the C. L. R. trunk 1220, thereby to return ring-back tone current to the calling subscriber substation T1201 in order to indicate to the subscriber thereat that the operator at the toll board 300 is being run.

Upon operating the reverse battery relay R1115 reverses, at the contacts 1116, 1117, 1118 and 1119, the polarity of the line conductors C1111 and C1112 of the toll line 1110 with respect to the upper and lower windings of the line relay R1120, thereby to complete a series circuit for energizing the upper windings of the line relay R1120 and the ring relay R1125 in the toll line circuit 1100 and the upper and lower windings of the bridge relay R1050 in the toll line circuit 900. The circuit mentioned extends from battery and ground potentials by way of the upper and lower windings of the line relay R1120 and the ring relay R1125, the upper and lower windings 1131 of the repeating coil 1130, the contacts 1118, 1116, the line conductors C1112 and C1111 of the toll line 1110, the contacts 1031, 1036, the upper and lower windings 934 of the repeating coil 932, the contacts 1032, 1034, the resistors 1052, 1053, and the upper and lower windings of the bridge relay R1050 to ground and battery potentials. When this series circuit is completed, the bridge relay R1050 operates; however, the line relay R1120 does not operate as it is of the marginal type and the circuit includes the resistors 1052 and 1053. Moreover, the ring relay R1125 does not operate as it is of the differential type. Upon operating the bridge relay R1050 completes, at the contacts 1051, a circuit for operating the hold relay R1070; and upon operating the hold relay R1070 completes, at the contacts 1076, a circuit, including the contacts 984, for operating the call relay R1010. Upon operating the call relay R1010 interrupts, at the contacts 1014, the previously traced circuit for applying battery potential by way of the winding of the seize relay R990 to the control conductor C913; and completes, at the contacts 1015, a path, for applying ground potential to the control conductor C913 as busy to the toll transmission selectors having access thereto. Also the call relay R1010 completes, at the contacts 1016, a circuit, including the conductor C925 of the trunk 920 for illuminating the busy lamp L381 associated with the jack J380 in order to indicate to the operator at the toll board 300 that the terminated trunk 920 is busy at this time; and completes, at the contacts 1011′, a circuit, including the contacts 987 and the conductor C926 of the trunk 920 for illuminating the answer lamp L382 associated with the jack J380 in order to indicate to the operator at the toll board 300 that a call is waiting to be answered on the terminated trunk 920.

The operator at the toll board 300 answers the call by selecting an idle cord circuit, such, for example, as the cord circuit 320, and inserting the front plug P322 thereof into the jack J380 terminating the trunk 920 extending to the toll line circuit 900. When the front plug P322 of the cord circuit 320 is thus inserted into the jack J380, a circuit, including the contacts 352, the sleeve of the front plug P322, the sleeve of the jack J380 and the conductor C923 of the trunk 920 is completed for energizing the winding of the front supervisory relay R355 in the cord circuit 320 in series with the upper winding of the supervisory relay R960 in the toll line circuit 900; whereby the front supervisory relay R355 does not operate as it is of the marginal type; whereas the supervisory relay R960 operates. Upon operating the supervisory relay R960 completes, at the contacts 961, the circuit for operating the switch relay R950; and upon operating the latter relay completes, at the contacts 958, the circuit for operating the switch relay R940. Upon operating the switch relay R940 completes, at the contacts 943′, the circuit for operating the switch relay R1030; completes, at the contacts 941, 942, 944, 946, 947, and 948, the connection between the headset 329 at the toll board 300 and the winding of the ring relay R930 and completes, at the contacts 941′, a holding circuit, including the contacts 1019, for energizing the winding of the call relay R1010. Upon operating the switch relay R1030 interrupts, at the contacts 1032 and 1034, the previously traced series circuit for energizing the upper and lower windings of the bridge relay R1050, the ring relay R1125 and the line relay R1120 in order to cause the bridge relay R1050 to restore. Also the switch relay R1030 completes, at the contacts 1039, the circuit for operating the busy relay R980; and completes, at the contacts 1033 and 1035 the circuit for bridging the upper winding of the signal relay R1060 across the line conductors C1112 and C1111 of the toll line 1110; and completes, at the contacts 1037, the circuit for energizing the lower winding of the signal relay R1060; whereby the signal relay R1060 operates. Upon operating the busy relay R980 completes, at the contacts 985, the holding circuit, including the contacts 1076 for energizing the winding thereof; and completes, at the contacts 986, a multiple circuit, for illuminating the busy lamp L381 associated with the jack J380. Also the busy relay R980 interrupts, at the contacts 987, the circuit for illuminating the answer lamp L382 associated with the jack J380 in order to indicate to the operator at the toll board 300 that the call on the trunk 320 has been answered. Upon operating the signal relay R1060 completes, at the contacts 1063, the holding circuit for maintaining operated the hold relay R1070; and completes, at the contacts 1061, the circuit for energizing the winding of the control relay R1040 in order to cause the latter relay to operate shortly thereafter, it being of the slow-to-operate type.

Also when the upper winding of the signal relay R1060 is thus bridged across the line conductors C1112 and C1111 of the toll line 1110, the low resistance series circuit is completed for bringing about the operation of the line relay R1120 in the toll line circuit 1100; whereby the line relay R1120 completes, at the contacts 1123, the circuit for operating the hold relay R1230. Upon operating the hold relay R1230 interrupts, at the contacts 1231, the path for returning ring-back tone current to the calling subscriber substation T1201 in order to indicate to the subscriber thereat that the call has been answered at the toll board 300. Also the hold relay R1230 completes, at the contacts 1232, a circuit, including the contacts 1272, 1266 and 1141′, for operating the timer relay R1280. Upon operating the timer relay R1280 interrupts, at the contacts 1283 the direct path for applying ground potential to the control conductor C1223; whereby ground potential is applied by way of the multiple path, including the lower winding of the transformer 1267 and the contacts 1263 to the control conductor C1223. Accordingly, at this time, any tone appearing in the line circuit 1203 associated with the subscriber line 1202 extending to the calling subscriber substation T1201 now traverses the lower winding of the transformer 1267 via the control conductor C1223 of the C. L. R. trunk 1220, including a corresponding tone in the upper winding of the transformer 1267. In the present example, no tone appears in the line circuit 1203 associated with the subscriber line 1202 extending to the calling subscriber substation T1201; however, had the calling station been of the paystation type, a tone in the line circuit associated with the paystation line extending thereto would have been present and accordingly would have traversed the control conductor C1223 of the C. L. R. trunk 1220 causing the lower winding of the transformer 1267 to induce a corresponding tone in the upper winding thereof. Also the timer relay R1280 completes, at the contacts 1281 and 1282, a connection including the condenser 1276 for bridging the upper winding of the transformer 1267 across the line conductors C1222 and C1221 of the C. L. R. trunk 1220; whereby the tone, if present in the transformer 1267, is projected over the line conductors C1112 and C1111 of the toll line 1110 to the toll board 300. Further the timer relay R1280 sets its armature RA1284 into vibration; whereby the associated contacts 1285 are completed intermittently in order to energize the winding of the cut-off relay R1270; whereby the latter relay does not operate immediately as it is of the slow-to-operate type. After a predetermined time interval, the armature RA1284 of the timer relay R1280 settles down closing continuously the contacts 1285; whereupon the cut-off relay R1270 operates. Upon operating the cut-off relay R1270 completes, at the contacts 1271, a holding circuit, including the contacts 1232, 1266 and 1141', for energizing the winding thereof; and interrupts, at the contacts 1272, the circuit for maintaining operated the timer relay R1280. Upon restoring the timer relay R1280 returns, at the contacts 1283, direct ground potential to the control conductor C1223 of the C. L. R. trunk 1220, thereby short-circuiting the lower winding of the transformer 1267. Further the timer relay R1280 interrupts, at the contacts 1281 and 1282, the circuit for bridging the upper winding of the transformer 1267 across the line conductors C1222 and C1221 of the C. L. R. trunk 1220. Accordingly, the timer relay R1280 and the cut-off relay R1270 are operative when the call is answered at the toll board 300 to cause tone to be projected over the toll line 1110 for a predetermined time interval, in the event it is present upon the C. L. R. trunk 1220; which circumstance exists when the call originates at a paystation in the distant exchange 30. Of course, the operator at the toll board 300 in the central office 20 hears the tone if present indicating that the C. L. R. call originating in the distant exchange 30 was initiated at a paystation therein; whereupon the operator after extending the call, requires the person at the paystation to deposit appropriate coins thereat; whereupon identifying tones are projected from the paystation over the connection to the toll board 300 indicating that the coins mentioned have been deposited. Of course, the absence of tone indicates to the operator at the toll board 300 that the call originates at a subscriber substation in the distant exchange 30 and the usual toll ticket is prepared after the call has been completed.

In the event the operator at the toll board 300 should wish to recheck for tone, this may be accomplished by withdrawing the front plug P322 of the cord circuit 320 from the jack J380 and then reinserting the front plug P322 again into the jack J380; whereby the supervisory relay R960 first restores effecting the restoration of the switch relay R950 which latter relay effects the restoration of the switch relay R940 and the consequent restoration of the switch relay R1030. Upon restoring the switch relay R1030 effects the restoration of the controy relay R1040 and the signal relay R1060; and recompletes, at the contacts 1032 and 1034, the circuit for operating the bridge relay R1050. When the upper winding of the signal relay R1060 is disconnected from the line conductors C1112 and C1111 of the toll line 1110 and the upper and lower windings of the bridge relay R1050 are connected thereto, the line relay R1120 in the toll line circuit 1100 restores in order to bring about the restoration of the hold relay R1230 shortly thereafter. Upon restoring the hold relay R1230 interrupts, at the contacts 1232, the holding circuit for maintaining operated the cut-off relay R1270. When the front plug P322 of the cord circuit 320 is again inserted into the jack J380, the supervisory relay R960 is reoperated to effect reoperation of the switch relay R950 and the consequent reoperation of the switch relay R940 and the resulting reoperation of the switch relay R1030. Upon reoperating the switch relay R1030 effects the restoration of the bridge relay R1050 and reoperation of the signal relay R1060; whereby the control relay R1040 is reoperated. When the upper winding of the signal relay R1060 is again bridged across the line conductors C1112 and C1111 of the toll line 1110, the line relay R1120 in the toll line circuit 1100 is reoperated effecting reoperation of the hold relay R1230 and the consequent reoperation of the timer relay R1280 and the subsequent reoperation of the cut-off relay R1270. The recyclying of the timer relay R1280 and the cut-off relay R1270 causes tone, if present, to be again projected over the toll line 1110 so that the operator at the toll board 300 may ascertain the circumstance mentioned. At this time the connection is again in answered condition and completed between the calling subscriber substation T1201 in the distant exchange 30 and the called toll board 300 in the central office 20. The subscriber at the calling subscriber substation T1201 advises the operator at the called toll board 300 concerning the extension of the call; whereupon the operator at the toll board 300 proceeds to extend the call and then retires from the established connection.

The subscriber at the calling subscriber substation T1201 may render switchhook supervision to the operator at the called toll board 300 by appropriately operating the switchhook, whereby the loop circuit extending back to the signal relay R1170 is controlled causing the latter relay to follow and repeat to the supervisory relay R1180, which latter relay repeats to the reverse battery relay R1115. The reverse battery relay R1115 alternately reverses and restores the polarity of the line conductors C1111 and C1112 of the toll line 1110; whereby the signal relay R1060 follows repeating, at the contacts 1062, to the lower winding of the supervisory relay R960 causing the front supervisory relay R355 in the cord circuit 320 to follow; whereby the front supervisory lamp L335 is flashed in order to render switchhook supervision to the operator at the toll board 300. The operator at the called toll board 300 then re-enters the connection and converses with the subscriber at the calling subscriber substation T1201.

At the conclusion of the established connection, when the subscriber at the calling subscriber substation T1201 disconnects, the signal relay R1170 restores effecting restoration of the supervisory relay R1180 and the consequent restoration of the reverse battery relay R1115; whereby the signal relay R1060 is restored in order to bring about restoration shortly thereafter of the hold relay R1070 and reoperation of the front supervisory relay R355 causing the front supervisory lamp L335 associated with the front plug P322 of the cord circuit 320 to be illuminated rendering to the operator at the toll board 300 disconnect supervision.

At this time should the operator at the called toll board 300 wish to re-ring the subscriber at the calling subscriber substation T1201, this may be accomplished by operating and then restoring the ring front key K331; whereby the ring relay R930 is first operated and then restored. When the ring relay R930 operates and then restores, it completes and then interrupts, at the contacts 931, a path, including the contacts 943', 1047, 1073 and 1033, the upper winding 934 of the repeating coil 932 and the contacts 951 for applying ground potential to the line conductor C1112 of the toll line 1110, thereby to complete a path, including the contacts 1119 and the lower winding 1131 of the repeating coil 1130 for short-circuiting in series the lower winding of the ring relay R1125 and the lower winding of the line relay R1120; whereby the ring relay R1125 operates and then restores. When the ring relay R1125 operates and then restores, it completes and then interrupts, at the contacts 1126, the circuit for operating the ring relay R1250. Upon operating the ring relay R1250 completes, at the contacts 1252, a path, including the contacts 1151, for connecting the generator conductor C1188 to the line conductor C1222; and completes, at the contacts 1255, a path including the contacts 1233, for applying ground potential to the line conductor C1221. Accordingly, a splash of ringing current is returned over the line conductors C1222 and C1221 of the C. L. R. trunk 1220 in order again to operate the ringer at the calling subscriber substation T1201 in the distant exchange 30. When the subscriber at the calling subscriber substation T1201 reanswers the call, the signal relay R1170 is reoperated in order to place the toll line circuits 1100 and 900 in the original answered condition.

When the operator at the called toll board 300 receives disconnect supervision, should she desire to release the established connection, this may be accomplished by withdrawing the front plug P322 of the cord circuit 320 from the jack J380 terminating the trunk 920; whereby there is interrupted, the circuit for energizing the winding of the front supervisory relay R355 in the cord circuit 320 in series with the parallel connected upper and lower windings of the supervisory relay R960 in the toll line circuit 900 causing the relays mentioned to restore. Upon restoring the front supervisory relay R355 extinguishes the front supervisory lamp L335 associated with the front plug P322 of the cord circuit 320. Upon restoring the supervisory relay R960 interrupts, at the contacts 961, the circuit for maintaining operated the switch relay R950; whereby the latter relay interrupts, at the contacts 958, the original operating circuit for the switch relay R940. The switch relay R940 restores since the holding circuit for energizing the winding thereof is interrupted, at the first contacts of the jack J380 when the front plug P322 is withdrawn from the jack J380. Upon restoring the switch relay R940 interrupts, at the contacts 943', the circuit for retaining operated the switch relay R1030. Upon restoring the switch relay R1030 interrupts, at the contacts 1038, the holding circuit for maintaining operated the control relay R1040; interrupts, at the contacts 1033 and 1035, the circuit for energizing the upper winding of the signal relay R1060; and interrupts, at the contacts 1037, the circuit for energizing the lower winding of the signal relay R1060; whereupon the latter relay remains restored. Also the switch relay R1030 recompletes, at the contacts 1031, 1032, 1034 and 1036, the normal connections between the upper and lower windings of the bridge relay R1050 and the line conductors C1112 and C1111 of the toll line 1110; however, the bridge relay R1050 does not operate at this time since the normal polarity of the line conductors C1111 and C1112 of the toll line 1110 maintains as the reverse battery relay R1115 in the toll line circuit 1100 occupies its restored position. Also upon restoring the switch relay R1030 interrupts, at the contacts 1039, the circuit for maintaining operated the busy relay R980 and the multiple holding circuit, also including the contacts 985, 983 and 1019, for maintaining operated the call relay R1010; whereby the relays mentioned restore, since the hold relay R1070 restored shortly following the restoration of the signal relay R1060. Upon restoring the call relay R1010 interrupts, at the contacts 1015, the path for applying ground potential to the control conductor C913; and recompletes, at the contacts 1014, the path for applying battery potential by way of the winding of the seize relay R990 to the control conductor C913; whereby the trunk 910 is marked as idle to the toll transmission selectors having access thereto. Further the call relay R1010 interrupts, at the contacts 1010, the circuit for illuminating the busy lamp L381 associated with the jack J380 thereby to indicate that the terminated trunk 920 and consequently the toll line circuit 900 and the terminated toll line 1110 are idle at this time.

When the upper winding of the signal relay R1060 has disconnected from the line conductors C1112 and C1111 of the toll line 1110 and the upper and lower windings of the bridge relay R1050 are reconnected thereto, the line relay R1120 in the toll line circuit 1100 restores effecting the restoration of the hold relay R1230 shortly thereafter. Upon restoring the hold relay R1230 interrupts, at the contacts 1232, the holding circuit for maintaining operated the cut-off relay R1270; and interrupts, at the contacts 1235, the holding circuit for maintaining operated the control relay R1260; whereby the latter relay restores shortly thereafter, it being of the slow-to-release type. Upon restoring the control relay R1260 interrupts, at the contacts 1263, the path for applying ground potential to the control conductor C1223; and recompletes, at the contacts 1262, the path for applying battery potential by way of the impedance 1135 to the control conductor C1223; whereby the selector 1207 is released and the C. L. R. trunk 1220 is marked as idle to the selectors having access thereto. Also the finder 1206 is released; whereby the line circuit 1203 is controlled in order again to mark the subscriber line 1202 extending to the calling subscriber substation T1201 as idle to the connectors having access thereto. At this time the established connection between the calling subscriber substation T1201 in the distant exchange 30 and the called toll board 300 in the central office 20 is released and all of the apparatus involved therein is completely released and available for further use.

*Sect. 15.—Conclusions*

In view of the foregoing, it is apparent that there has been provided a toll switching telephone system embodying improved trunking and supervisory circuit facilities permitting the direct completion of toll calls from a toll board without multiple handling at one or more other such toll boards.

The connection and arrangement of the auxiliary toll selector switch 600 is disclosed and claimed in the copending divisional application of Harvey W. Balzer, Serial No. 104,513, filed July 13, 1949.

While there has been described what is at present considered to be the preferred embodiment of the invention, it will be understood that various modifications may be made therein, and it is intended to cover in the appended claims, all such modifications as fall within the true spirit and scope of the invention.

What is claimed is:

1. In a telephone system, an office provided with a toll board, an exchange provided with subscriber lines, a toll line extending between said office and said exchange and accessible to said toll board, a toll line circuit in said exchange terminating said toll line, a combination switch-through and toll-transmission selector associated with said toll circuit and having corresponding switch-through and toll-transmission positions, switching apparatus accessible to said selector and having access to said subscriber lines, trunks terminating at said exchange and accessible to said selector, means controllable from said toll board for seizing said toll line, means responsive to seizure of said toll line for seizing said toll circuit, means responsive to seizure of said toll circuit for seizing said selector, means then controllable from said toll board for operating said selector to select either said switching apparatus or one of said trunks, means then controllable from said toll board for operating said switching apparatus to select one of said subscriber lines, means responsive to operation of said selector to select one of said trunks for operating said selector to its switch-through position, and means responsive to operation of said switching apparatus to select one of said subscriber lines for operating said selector to its toll-transmission position.

2. In a telephone system, an office provided with a toll board, an exchange provided with subscriber lines, a toll line extending between said office and said exchange and accessible to said toll board, a toll line circuit in said exchange terminating said toll line, a combination switch-through and toll-transmission selector associated with said toll circuit and having corresponding switch-through and toll-transmission positions, switching apparatus accessible to said selector and having access to said subscriber lines, trunks terminating at said exchange and accessible to said switching apparatus, means controllable from said toll board for seizing said toll line, means responsive to seizure of said toll line for seizing said toll circuit, means responsive to seizure of said toll circuit for seizing said selector, means then controllable from said toll board for operating said selector to select said switching apparatus, means then controllable from said toll board for operating said switching apparatus to select either one of said subscriber lines or one of said trunks, and means responsive to operation of said switching apparatus to select one of said subscriber lines for operating said selector to its toll-transmission position and responsive to operation of said switching apparatus to select one of said trunks for operation of said selector to its switch-through position.

3. In a telephone system, an office provided with a toll board, an exchange provided with subscriber lines, a toll line extending between said office and said exchange and accessible to said toll board, a toll line circuit in said exchange terminating said toll line, a combination switch-through and toll-transmission selector associated with said toll circuit and having corresponding switch-through and toll-transmission positions, first trunks terminating at said exchange and accessible to said selector, switching apparatus accessible to said selector and having access to said subscriber lines, second trunks terminating at said exchange and accessible to said switching apparatus, means controllable from said toll board for seizing said toll line, means responsive to seizure of said toll line for seizing said toll circuit, means responsive to seizure of said toll circuit for seizing said selector, means then controllable from said toll board for operating said selector to select either said switching apparatus or one of said first trunks, means then controllable from said toll board for operating said switching apparatus to select one of said subscriber lines or one of said second trunks, means responsive to operation of said selector to select one of said first trunks for operating said selector to its switch-through position, and means responsive to operation of said switching apparatus to select one of said subscriber lines for operating said selector to its toll-transmission position and responsive to operation of said switching apparatus to select one of said second trunks for operating said selector to its switch-through position.

4. In a telephone system, a group of lines requiring the supply thereto of transmission battery, a group of trunks not requiring the supply thereto of transmission battery, a toll transmission selector provided with an incoming trunk and a source of transmission battery, said selector including a repeater provided with first and second coupled windings, said incoming trunk being normally connected to said first winding, means for routing connection over said incoming trunk and through said selector to said lines and to said trunks, means responsive to routing of a connection to one of said lines for connecting said source of transmission battery through said second winding to said one line, and means responsive to routing of a connection to one of said trunks for disconnecting said incoming trunk from said first winding and for connecting it to said one trunk.

5. In a telephone system including trunks, means for connecting battery potential to said trunks and for disconnecting battery potential therefrom, and an automatic switch provided with a wiper set having access to said trunks; said switch comprising a bridge relay, a switch relay, a source of transmission battery, a repeater provided with first and second coupled windings, an incoming trunk, means normally connecting said incoming trunk to said first winding, means controllable over said incoming trunk for operating said wiper set to select one of said trunks, means responsive to operation of said wiper set to select said one trunk for connecting said bridge relay across said wiper set, whereby said bridge relay is operated by battery potential connected to said one trunk, said bridge relay being restored when battery potential is disconnected from said one trunk, means responsive to restoration of said bridge relay for disconnecting it from across said wiper set and for connecting said source of transmission battery through said second winding to said wiper set, means for operating said switch relay, and means responsive to operation of said switch relay for disconnecting said incoming trunk from said first winding and for connecting it to said wiper set.

6. In a telephone system including trunks, means for connecting battery potential to said trunks and for disconnecting battery potential therefrom, and an automatic switch provided with a wiper set having access to said trunks; said switch comprising a line relay, a bridge relay, a switch relay, a source of transmission battery, a repeater provided with first and second coupled windings, means normally connecting said incoming trunk through said first winding to said line relay, means including said line relay and responsive to a digit transmitted over said incoming trunk for operating said wiper set to select one of said trunks, means responsive to operation of said wiper set to select one trunk for connecting said bridge relay across said wiper set, whereby said bridge relay is operated by battery potential connected to said one trunk, means including said line relay and then responsive to a digit transmitted over said incoming trunk for repeating the digit over said wiper set, said bridge relay being restored when battery potential is disconnected from said one trunk, means responsive to restoration of said bridge relay for disconnecting it from across said wiper set and for connecting said source of transmission battery through said second winding to said wiper set, means for operating said switch relay, and means responsive to operation of said switch relay for disconnecting said incoming trunk from said first winding and said line relay and for connecting it to said wiper set.

7. In a telephone system including trunks, means for connecting battery potential to said trunks and for disconnecting battery potential therefrom, means for connecting bridge paths to said trunks and for disconnecting the bridge paths therefrom, and an automatic switch provided with a wiper set having access to said trunks; said switch comprising a bridge relay, a supervisory relay, a source of battery current, a repeater provided with first and second coupled windings, an incoming trunk, means normally connecting said incoming trunk to said first winding, means controllable over said incoming trunk for operating said wiper set to select one of said trunks, means responsive to operation of said wiper set to select said one trunk for connecting said bridge relay across said wiper set, whereby said bridge relay is operated by battery potential connected to said one trunk, said bridge relay being restored when battery potential is disconnected from said one trunk, means responsive to restoration of said bridge relay for disconnecting it from across said wiper set and for connecting said source of transmission battery through said supervisory relay and said second winding to said wiper set, whereby said supervisory relay is operated when a bridge path is connected to said one trunk and is restored when the bridge path is disconnected from said one trunk, means responsive to operation and to restoration of said supervisory relay for returning corresponding supervisory signals over said incoming trunk, means for operating said switch relay, and means responsive to operation of said switch relay for disconnecting said incoming trunk from said first winding and for connecting it to said wiper set.

8. In a telephone system, a toll transmission selector including an incoming trunk, a wiper set, trunks accessible to said wiper set, a repeater, a source of battery current, means responsive to a digit transmitted over said incoming trunk for selectively operating said wiper set to select one of said trunks, means responsive to operation of said wiper set for completing a bridge path across said wiper set, means then responsive to a digit transmitted over said incoming trunk for repeating the digit over said bridge path, first means thereafter controllable for completing a first connection from said incoming trunk to said repeater and for completing a second connection from said repeater to said wiper set and for supplying battery current from said source to said second connection, said repeater coupling said first and second connections, second means thereafter controllable for completing a direct connection from said incoming trunk to said wiper set, and means for selecting said first means or said second means to be controlled.

9. In a telephone system, a toll transmission selector including an incoming trunk, a wiper set provided with a pair of line wipers and a third wiper, trunks accessible to said wiper set, a repeater, a source of battery current, means responsive to a digit transmitted over said incoming trunk for selectively operating said wiper set to select one of said trunks, means responsive to operation of said wiper set for completing a bridge path across said pair of line wipers, means then responsive to a digit transmitted over said incoming trunk for repeating the digit over said bridge path, first means thereafter controllable for completing a first connection from said incoming trunk to said repeater and for completing a second connection from said repeater to said wiper set and for supplying battery current from said source to said second connection and for establishing a supervisory signal circuit between said pair of line wipers and said incoming trunk, said repeater coupling said first and second connections, second means thereafter controllable for completing a direct connection from said incoming trunk to said wiper set and for establishing a supervisory signal circuit between said third wiper and said incoming trunk, and means for selecting said first means or said second means to be controlled.

10. In a telephone system, a toll transmission selector including an incoming trunk, a wiper set, trunks accessible to said wiper set, a repeater, a source of battery current, means responsive to a predetermined first digit transmitted over said incoming trunk for operating said wiper set and then for releasing said wiper set, means then responsive to a second digit transmitted over said incoming trunk for selectively reoperating said wiper set to select one of said trunks, means responsive to reoperation of said wiper set for completing a bridge path across said wiper set, means then responsive to a digit transmitted over said incoming trunk for repeating the digit over said bridge path, first means thereafter controllable for completing a first connection from said incoming trunk to said repeater and for completing a second connection from said repeater to said wiper set and for supplying battery current from said source to said second connection, said repeater coupling said first and second connections, second means thereafter controllable for completing a direct connection from said incoming trunk to said wiper set, and means for selecting said first means or said second means to be controlled.

11. In a telephone system, a group of lines requiring the supply thereto of battery current, a group of trunks not requiring the supply thereto of battery current, automatic switching apparatus having access to said lines, a toll transmission selector provided with an incoming trunk and a source of battery current, said selector having access to said trunks and to said switching apparatus, means controllable over said incoming trunk for operating said selector to select either one of said trunks or said switching apparatus, means responsive to operation of said selector to select one of said trunks for directly connecting said incoming trunk to said one trunk, means controllable over said incoming trunk in the event said switching apparatus is selected for operating said switching apparatus to select one of said lines, means responsive to operation of said switching apparatus for connecting said one line directly therethrough to said selector, and means responsive to connection of said one line through said switching apparatus to said selector for coupling said incoming trunk through said switching apparatus to said one line and for connecting said source of battery current through said switching apparatus to said one line.

12. In a telephone system, a group of lines requiring the supply thereto of battery current, a group of trunks not requiring the supply thereto of battery current, automatic switching apparatus having access to said lines, a toll transmission selector provided with an incoming trunk and a source of battery current, said selector having access to said trunks and to said switching apparatus, means responsive to a digit transmitted over said incoming trunk for operating said selector to select either one of said trunks or said switching apparatus, means responsive to operation of said selector to select one of said trunks for switching through said selector so that said incoming trunk is directly connected to said one trunk, means responsive to operation of said selector to select said switching apparatus for conditioning said selector to repeat a digit to said switching apparatus, means then responsive to a digit transmitted over said incoming trunk for repeating the digit to said switching apparatus so that said switching apparatus may be operated to select one of said lines, means responsive to operation of said switching apparatus to select one of said lines for switching through said switching apparatus so that said one line is directly connected through said switching apparatus to said selector, and means responsive to conection of said one line through said switching apparatus to said selector for coupling said incoming trunk through said switching apparatus to said one line and for connecting said source of battery current through said switching apparatus to said one line.

13. In a telephone system including first trunks, means for connecting battery potential to said first trunks and for disconnecting battery potential therefrom, second trunks, and a selector provided with a wiper set having access to said first and second trunks; said selector comprising a bridge relay, a switch relay, a source of transmission battery, a repeater provided with first and second coupled windings, an incoming trunk, means normally connecting said incoming trunk to said first winding, means controllable over said incoming trunk for operating said wiper set to select one of said first trunks or one of said second trunks, means responsive to operation of said wiper set to select one of said first trunks for connecting said bridge relay across said wiper set, whereby said bridge relay is operated by battery potential connected to said one first trunk, said bridge relay being restored when battery potential is disconnected from said one first trunk, means responsive to restoration of said bridge relay for disconnecting it from across said wiper set and for connecting said source of transmission battery through said second winding to said wiper set, means responsive to operation of said wiper set to select one of said second trunks for operating said switch relay, and means responsive to operation of said switch relay for disconnecting said incoming trunk from said first winding and for connecting it to said wiper set.

14. In a telephone system including first trunks, means for connecting battery potential to said first trunks and for disconnecting battery potential therefrom, second trunks, and a selector provided with a wiper set having access to said first and second trunks; said selector comprising a line relay, a bridge relay, a switch relay, a source of battery potential, a repeater provided with first and second coupled windings, means normally connecting said incoming trunk through said first winding to said line relay, means including said line relay and responsive to a digit transmitted over said incoming trunk for operating said wiper set to select one of said first trunks or one of said second trunks, means responsive to operation of said wiper set to select one of said first trunks for connecting said bridge relay across said wiper set, whereby said bridge relay is operated by battery potential connected to said one first trunk, means including said line relay and then responsive to a digit transmitted over said incoming trunk for repeating the digit over said wiper set, said bridge relay being restored when battery potential is disconnected from said one first trunk, means responsive to restoration of said bridge relay for disconnecting it from across said wiper set and for connecting said source of transmission battery through said second winding to said wiper set, means responsive to operation of said wiper set to select one of said second trunks for operating said switch relay, and means responsive to operation of said switch relay for disconnecting said incoming trunk from said first winding and said line relay and for connecting it to said wiper set.

15. In a telephone system including first trunks, means for connecting battery potential to said first trunks and for disconnecting battery potential therefrom, means for connecting bridge paths to said first trunks and for disconnecting the bridge paths therefrom, second trunks, and a selector provided with a wiper set having access to said first and second trunks; said switch comprising a bridge relay, a supervisory relay, a source of battery current, a repeater provided with first and second coupled windings, an incoming trunk, means normally connecting said incoming trunk to said first winding, means controllable over said incoming trunk for operating said wiper set to select either one of said first trunks or one of said second trunks, means responsive to operation of said wiper set to select one of said first trunks for connecting said bridge relay across said wiper set so that said bridge relay is operated by battery potential connected to said one first trunk, said bridge relay being restored when battery potential is disconnected from said one first trunk, means responsive to restoration of said bridge relay for disconnecting it from across said wiper set and for connecting said source of battery current through said supervisory relay and said second winding to said wiper set so that said supervisory relay is operated when a bridge path is connected to said one trunk and is restored when the bridge path is disconnected from said one trunk, means responsive to operation and to restoration of said supervisory relay for returning corresponding supervisory signals over said incoming trunk, means responsive to operation of said wiper set to select one of said second trunks for operating said switch relay, and means responsive to operation of said switch relay for disconnecting said incoming trunk from said first winding and for connecting it to said wiper set.

16. In a telephone system, a toll transmission selector including an incoming trunk, a wiper set, first and second groups of trunks accessible to said wiper set, a repeater, a source of battery current, means responsive to a digit transmitted over said incoming trunk for selectively operating said wiper set to select either a trunk in said first group or a trunk in said second group, means responsive to operation of said wiper set to select a trunk in said first group for completing a bridge path across said wiper set, means then responsive to a digit transmitted over said incoming trunk for repeating the digit over said bridge path, first means thereafter controllable for completing a first connection from said incoming trunk to said repeater and for completing a second connection from said repeater to said wiper set and for supplying battery current from said source to said second connection, said repeater coupling said first and second connections, and additional means responsive to operation of said wiper set to select a trunk in said second group for completing a direct connection from said incoming trunk to said wiper set.

17. In a telephone system, a group of lines requiring the supply thereto of battery current, a group of trunks not requiring the supply thereto of battery current, automatic switching apparatus having access to said lines and to said trunks, a toll transmission selector having access to said automatic switching apparatus and provided with an incoming trunk and a source of battery current, means controllable over said incoming trunk for operating said selector to select said switching apparatus, means then controllable over said incoming trunk for operating said switching apparatus to select either one of said lines or one of said trunks, means responsive to operation of said switching apparatus for connecting the selected line or trunk directly therethrough to said selector, means responsive to the connection of a line to said selector for coupling said incoming trunk to said line and for connecting said source of battery current to said line, and means responsive to the connection of a trunk to said selector for directly connecting said incoming trunk to said trunk.

18. In a telephone system, a group of lines requiring the supply thereto of battery current, a group of trunks not requiring the supply thereto of battery current, automatic switching apparatus having access to said lines and to said trunks, a toll transmission selector having access to said automatic switching apparatus and provided with an incoming trunk and a source of battery current, said selector including a repeater provided with first and second coupled windings, said incoming trunk being normally connected to said first winding, means controllable over said incoming trunk for operating said selector to select said switching apparatus, means then controllable over said incoming trunk for operating said switching apparatus to select either one of said lines or one of said trunks, means responsive to operation of said switching apparatus for connecting the selected line or trunk directly therethrough to said selector, means responsive to the connection of a line to said selector for connecting said source of battery current through said second winding to said line, and means responsive to the connection of a trunk to said selector for disconnecting said incoming trunk from said first winding and for connecting said incoming trunk to said trunk.

19. In a telephone system, a group of lines requiring the supply thereto of battery current, a group of trunks not requiring the supply thereto of battery current, automatic switching apparatus having access to said lines and to said trunks, a toll transmission selector provided with a wiper set having access to said switching apparatus, said selector including a bridge relay and a switch relay and a first source of battery current and a repeater provided with first and second coupled windings and an incoming trunk, means normally connecting said incoming trunk to said first winding, means controllable over said incoming trunk for operating said wiper set to select said switching apparatus, said switching apparatus including a second source of battery current that is normally connected to said wiper set when said switching apparatus is selected by said wiper set, means responsive to operation of said wiper set to select said switching apparatus for connecting said bridge relay across said wiper set so that said bridge relay is operated by said second source connected to said wiper set, means then controllable over said incoming trunk and said wiper set for operating said switching apparatus to select either one of said lines or one of said trunks, means responsive to operation of said switching apparatus to select one of said lines for disconnecting said second source from said wiper set and for connecting said one line thereto, said bridge relay being restored when said second source is disconnected from said wiper set, means responsive to restoration of said bridge relay for disconnecting said bridge relay from across said wiper set and for connecting said first source through said second winding to said wiper set, means responsive to operation of said switching apparatus to select one of said trunks for operating said switch relay and for connecting said one trunk to said wiper set, and means responsive to operation of said switch relay for disconnecting said incoming trunk from said first winding and for connecting said incoming trunk to said wiper set.

20. In a telephone system, a group of lines requiring the supply thereto of battery current, a group of trunks not requiring the supply thereto of battery current, automatic switching apparatus having access to said lines and to said trunks, a toll transmission selector provided with a wiper set having access to said switching apparatus, said selector including a line relay and a bridge relay and a switch relay and a first source of battery current and a repeater provided with first and second coupled windings and an incoming trunk, means normally connecting said incoming trunk through said first winding to said line relay, means including said line relay and responsive to a digit transmitted over said incoming trunk for operating said wiper set to select said switching apparatus, said switching apparatus including a second source of battery current that is normally connected to said wiper set when said switching apparatus is selected by said wiper set, means responsive to operation of said wiper set to select said switching apparatus for connecting said bridge relay across said wiper set so that said bridge relay is operated by said second source connected to said wiper set, means including said line relay and then responsive to a digit transmitted over said incoming trunk for repeating the digit over said wiper set to said switching apparatus so that said switching apparatus may be operated to select either one of said lines or one of said trunks, means responsive to operation of said switching apparatus to select one of said lines for disconnecting said second source from said wiper set and for connecting said one line thereto, said bridge relay being restored when said second source is disconnected from said wiper set, means responsive to restoration of said bridge relay for disconnecting said bridge relay from across said wiper set and for connecting said first source of battery current through said second winding to said wiper set, means responsive to operation of said switching apparatus to select one of said trunks for operating said switch relay and for connecting said one trunk to said wiper set, and means responsive to operation of said switch relay for disconnecting said incoming trunk from said first winding and from said line relay and for connecting said incoming trunk to said wiper set.

21. In a telephone system, a group of lines requiring the supply thereto of battery current, a group of trunks not requiring the supply thereto of battery current, automatic switching apparatus having access to said lines and to said trunks, a toll transmission selector provided with a wiper set having access to said switching apparatus, said selector including a bridge relay and a supervisory relay and a switch relay and a first source of battery current and a repeater provided with first and second coupled windings and an incoming trunk, means normally connecting said incoming trunk to said first winding, means controllable over said incoming trunk for operating said wiper set to select said switching apparatus, said switching apparatus including a second source of battery current that is normally connected to said wiper set when said switching apparatus is selected by said wiper set, means responsive to operation of said wiper set to select said switching apparatus for connecting said bridge relay across said wiper set so that said bridge relay is operated by said second source connected to said wiper set, means then controllable over said incoming trunk and said wiper set for operating said switching apparatus to select either one of said lines or one of said trunks, means responsive to operation of said switching apparatus to select one of said lines for disconnecting said second source from said wiper set and for connecting said one line thereto, said bridge relay being restored when said second source is disconnected from said wiper set, means responsive to restoration of said bridge relay for disconnecting said bridge relay from across said wiper set and for connecting said first source of battery current through said supervisory relay and said second winding to said wiper set so that said supervisory relay is operated when a bridge path is connected to said one line and is restored when the bridge path is disconnected from said one line, means responsive to operation and to restoration of said supervisory relay for returning corresponding supervisory signals over said incoming trunk, means responsive to operation of said switching apparatus to select one of said trunks for operating said switch relay and for connecting said one trunk to said wiper set, and means responsive to operation of said switch relay for disconnecting said incoming trunk from said first winding and for connecting said incoming trunk to said wiper set.

22. In a telephone system, automatic switching apparatus, a toll transmission selector including an incoming trunk, a wiper set having access to said switching apparatus, a repeater, a source of battery current, means responsive to a digit transmitted over said incoming trunk for operating said wiper set to select said switching apparatus, means responsive to operation of said wiper set for completing a bridge path across said wiper set, means then responsive to a digit transmitted over said incoming trunk for repeating the digit over said bridge path so that said switching apparatus may be selectively operated, means responsive to a first predetermined operation of said switching apparatus for completing a first connection from said incoming trunk to said repeater and for completing a second connection from said repeater to said wiper set and for supplying battery current from said source to said second connection, said repeater coupling said first and second connections, and means responsive to a second predetermined operation of said switching apparatus for completing a direct connection from said incoming trunk to said wiper set.

23. In a telephone system, a toll transmission selector including an incoming trunk, a wiper set, a repeater, a source of battery current, trunks and automatic switching apparatus accessible to said wiper set, means responsive to a digit transmitted over said incoming trunk for operating said wiper set to select either one of said trunks or said switching apparatus, means responsive to operation of said wiper set for completing a bridge path across said wiper set, means then responsive to a digit transmitted over said incoming trunk for repeating the digit over said bridge path so that said switching apparatus may be selectively operated, first means thereafter controllable for completing a first connection from said incoming trunk to said repeater and for completing a second connection from said repeater to said wiper set and for supplying battery current from said source to said second connection, said repeater coupling said first and second connections, second means thereafter controllable for completing a direct connection from said incoming trunk to said wiper set, means governed by the operation of said switching apparatus for selectively controlling said first means and said second means, and means responsive to operation of said wiper set to select one of said trunks for controlling said second means.

24. In a telephone system including an office provided with a toll board, an exchange provided with automatic switching apparatus, a toll line extending between said office and said exchange and accessible to said toll board, and a toll line circuit in said exchange terminating said toll line; said toll line circuit including first and second supervisory relays, a trunk extending to said switching apparatus and provided with a pair of line conductors and a third conductor, means responsive to seizure of said toll line at said toll board for seizing said switching apparatus over said trunk, means then controllable over said toll line from said toll board for selectively operating said switching apparatus over said trunk, whereby said switching apparatus may be operated to extend a connection via first and second paths, means responsive to operation of said switching apparatus to extend a connection via said first path for completing a first supervisory circuit via said third conductor to said first supervisory relay, means responsive to operation of said switching apparatus to extend a connection via said second path for completing a second supervisory circuit via said pair of line conductors to said second supervisory relay, and means responsive to a given control of said first supervisory relay in accordance with the corresponding given supervision on a connection extended via said first path or to said given control of said second supervisory relay in accordance with the corresponding given supervision on a connection extended via said second path for returning a corresponding given supervisory signal over said toll line to said toll board.

25. In a telephone system including first automatic switching apparatus, a control circuit provided with an incoming trunk accessible to said first switching apparatus and an outgoing trunk, second automatic switching apparatus terminating said outgoing trunk, ordinary trunks and ring-down trunks both accessible to said second switching apparatus, means for operating said first switching apparatus to select said incoming trunk, and means then for controlling operation of said second switching apparatus over said first switching apparatus and said incoming trunk and said outgoing trunk to select either one of said ordinary trunks or one of said ring-down trunks; said control circuit including a repeater, means normally directly connecting said incoming trunk to said outgoing trunk, a source of ring-down potential, and means governed only in response to operation of said second switching apparatus to select one of said ring-down trunks for interrupting said direct connection and for inserting said repeater between said incoming trunk and said outgoing trunk and for connecting said source of ring-down potential to said outgoing trunk.

26. In a telephone system including first and second trunk circuits interconnected by a trunk line provided with first and second line conductors, an incoming trunk to said first trunk circuit, and an outgoing trunk from said second trunk circuit; said first trunk circuit including a signal relay provided with first and second windings, said second trunk circuit including a line relay provided with first and second windings and a battery provided with two terminals and means normally connecting the two terminals of said battery respectively through the first and second windings of said line relay to said first and second line conductors and a dry relay provided with first and second windings and a reverse battery relay, means responsive to a call on said incoming trunk for connecting the first winding of said signal relay across said first and second conductors and for energizing the second winding of said signal relay so that said line relay is operated, said signal relay being of the polarized type so that it is not operated, automatic switching apparatus terminating said outgoing trunk and normally connecting battery potential thereto, means responsive to operation of said line relay for connecting the first winding of said dry relay across said outgoing trunk so that it is energized, additional means responsive to operation of said line relay for energizing the second winding of said dry relay, said dry relay being of the differential type so that it is not operated, means controllable over said incoming trunk for transmitting digits over said trunk line to said line relay, means including said line relay for repeating digits over said outgoing trunk to said switching apparatus in order to effect operation thereof, lines accessible to said switching apparatus, means responsive to operation of said switching apparatus to select one of said lines for disconnecting battery potential from said outgoing trunk so that said dry relay is operated, means responsive to operation of said dry relay for operating said reverse battery relay, means responsive to operation of said reverse battery relay for reversing the polarity of said first and second line conductors with respect to the two terminals of said battery so that said signal relay is operated and said line relay is retained operated, and means responsive to operation of said signal relay for returning an end of dial signal over said incoming trunk.

27. In a telephone system including first and second trunk circuits interconnected by a trunk line provided with first and second line conductors, an incoming trunk to said first trunk circuit, and an outgoing trunk from said second trunk circuit; said first trunk circuit including a signal relay provided with first and second windings and a ring start relay, said second trunk circuit including a line relay provided with first and second windings and a ring relay provided with first and second windings and a battery provided with two terminals and means normally connecting the two terminals of said battery respectively through the first and second windings of said line relay and the first and second windings of said ring relay to said first and second line conductors and a dry relay provided with first and second windings and a reverse battery relay, means responsive to a call on said incoming trunk for connecting the first winding of said signal relay across said first and second conductors and for energizing the second winding of said signal relay so that said line relay is operated, said signal relay being of the polarized type so that it is not operated, said ring relay being of the differential type so that it is not operated, automatic switching apparatus terminating said outgoing trunk and normally connecting battery potential thereto, means responsive to operation of said line relay for connecting the first winding of said dry relay across said outgoing trunk so that it is energized, additional means responsive to operation of said line relay for energizing the second winding of said dry relay, said dry relay being of the differential type so that it is not operated, means controllable over said incoming trunk for transmitting digits over said trunk line to said line relay, means including said line relay for repeating digits over said outgoing trunk to said switching apparatus in order to effect operation thereof, lines accessible to said switching apparatus, means responsive to operation of said switching apparatus to select one of said lines for disconnecting battery potential from said outgoing trunk so that said dry relay is operated, means responsive to operation of said dry relay for operating said reverse battery relay, means responsive to operation of said reverse battery relay for reversing the polarity of said first and second line conductors with respect to the two terminals of said battery so that said signal relay is operated and said line relay is retained operated, means responsive to operation of said signal relay for returning an end of dial signal over said incoming trunk, means controllable over said incoming trunk for operating said ring start relay, means responsive to operation of said ring start relay for connecting a predetermined potential to one of said line conductors so that said ring relay is operated, and means responsive to operation of said ring relay for controlling said switching apparatus over said outgoing trunk to initiate ringing therefrom over the selected line.

28. In a telephone system including first and second trunk circuits interconnected by a trunk line provided with first and second line conductors, an incoming trunk to said first trunk circuit, and an outgoing trunk from said second trunk circuit; said first trunk circuit including a signal relay provided with first and second windings and a ring start relay, said second trunk circuit including a line relay provided with first and second windings and a ring relay provided with first and second windings and a battery provided with two terminals and means normally connecting the two terminals of said battery respectively through the first and second windings of said line relay and the first and second windings of said ring relay to said first and second line conductors and a dry relay provided with first and second windings and a reverse battery relay, means responsive to a call on said incoming trunk for connecting the first winding of said signal relay across said first and second conductors and for energizing the second winding of said signal relay so that said line relay is operated, said signal relay being of the polarized type so that it is not operated, said ring relay being of the differential type so that it is not operated, automatic switching apparatus terminating said outgoing trunk and normally connecting battery potential thereto, means responsive to operation of said line relay for connecting the first winding of said dry relay across said outgoing trunk so that it is energized, additional means responsive to operation of said line relay for energizing the second winding of said dry relay, said dry relay being of the differential type so that it is not operated, means controllable over said incoming trunk for transmitting digits over said trunk line to said line relay, means including said line relay for repeating digits over said outgoing trunk to said switching apparatus in order to effect operation thereof, lines accessible to said switching apparatus, means responsive to operation of said switching apparatus to select one of said lines for disconnecting battery potential from said outgoing trunk so that said dry relay is operated, means responsive to operation of said dry relay for operating said reverse battery relay, means responsive to operation of said reverse battery relay for reversing the polarity of said first and second line conductors with respect to the two terminals of said battery so that said signal relay is operated and said line relay is retained operated, means responsive to operation of said signal relay for operating said ring start relay, means responsive to operation of said ring start relay for connecting a predetermined potential to one of said line conductors so that said ring relay is operated, and means responsive to operation of said ring relay for controlling said switching apparatus over said outgoing trunk to initiate ringing therefrom over the selected line.

29. In a telephone system including first and second trunk circuits interconnected by a trunk line provided with first and second line conductors, an incoming trunk to said first trunk circuit, and an outgoing trunk from said second trunk circuit; said first trunk circuit including a signal relay provided with first and second windings, said second trunk circuit including a line relay provided with first and second windings and a battery provided with two terminals and means normally connecting the two terminals of said battery respectively through the first and second windings of said line relay to said first and second line conductors and a dry relay provided with first and second windings and a reverse battery relay and an answer relay, means responsive to a call on said incoming trunk for connecting the first winding of said signal relay across said first and second conductors and for energizing the second winding of said signal relay so that said line relay is operated, said signal relay being of the polarized type so that it is not operated, automatic switching apparatus terminating said outgoing trunk and normally connecting battery potential thereto, means responsive to operation of said line relay for connecting the first winding of said dry relay across said outgoing trunk so that it is energized, additional means responsive to operation of said line relay for energizing the second winding of said dry relay, said dry relay being of the differential type so that it is not operated, means controllable over said incoming trunk for transmitting digits over said trunk line to said line relay, means including said line relay for repeating digits over said outgoing trunk to said switching apparatus in order to effect operation thereof, lines accessible to said switching apparatus, means responsive to operation of said switching apparatus to select one of said lines for disconnecting battery potential from said outgoing trunk so that said dry relay is operated, means responsive to operation of said dry relay for disconnecting the first winding thereof from across said outgoing trunk and for connecting said answer relay across said outgoing trunk and for operating said reverse battery relay, means responsive to operation of said reverse battery relay for reversing the polarity of said first and second line conductors with respect to the two terminals of said battery so that said signal relay is operated and said line relay is retained operated, means responsive to operation of said signal relay for returning an end of dial signal over said incoming trunk, means responsive to answering of the call on the selected line for operating said answer relay, means responsive to operation of said answer relay for restoring said reverse battery relay so that the polarity of said first and second line conductors with respect to the two terminals of said battery is restored effecting restoration of said signal relay and retaining operated said line relay, and means responsive to restoration of said signal relay for returning an answer signal over said incoming trunk.

30. In a telephone system including first and second trunk circuits interconnected by a trunk line provided with first and second line conductors, an outgoing trunk from said first trunk circuit, and an incoming trunk to said second trunk circuit; said first trunk circuit including a bridge relay provided with first and second windings and a first battery provided with two terminals and means normally connecting the two terminals of said first battery respectively through the first and second windings of said bridge relay to said first and second line conductors and a signal relay and an answer relay, said second trunk circuit including a line relay provided with first and second windings and a second battery provided with two terminals and means normally connecting the two terminals of said second battery respectively through the first and second windings of said line relay to said first and second line conductors and a reverse battery relay so that the first and second windings of said bridge relay and the first and second windings of said line relay are normally respectively short-circuited in series relation, means responsive to a call on said incoming trunk for operating said reverse battery relay, means responsive to operation of said reverse battery relay for reversing the polarity of said first and second line conductors with respect to the two terminals of said second battery so that the first and second windings of said bridge relay and the second and first windings of said line relay are respectively energized in series relation causing operation of said bridge relay, said line relay being of the marginal type so that it is not operated, means responsive to operation of said brdge relay for creating a call on said outgoing trunk, means responsive to answering of the call on said outgoing trunk for operating said answer relay, means responsive to operation of said answer relay for disconnecting the first and second windings of said bridge relay from said first and second line conductors and for connecting said signal relay thereacross so that said bridge relay is restored and said signal relay and said line relay are operated.

31. In a telephone system including first and second trunk circuits interconnected by a trunk line provided with first and second line conductors, an outgoing trunk from said first trunk circuit, and an incoming trunk to said second trunk circuit; said first trunk circuit including a bridge relay provided with first and second windings and a first battery provided with two terminals and means normally connecting the two terminals of said first batery respectively through the first and second windings of said bridge relay to said first and second line conductors and a first signal relay provided with first and second windings and an answer relay, said second trunk circuit including a line relay provided with first and second windings and a second battery provided with two terminals and means normally connecting the two terminals of said second battery respectively through the first and second windings of said line relay to said first and second line conductors and a second signal relay and a reverse battery relay so that the first and second windings of said bridge relay and the first and second windings of said line relay are normally respectively short-circuited in series relation, means responsive to a call on said incoming trunk for operating said second signal relay, means responsive to operation of said second signal relay for operating said reverse battery relay, means responsive to operation of said reverse battery relay for reversing the polarity of said first and second line conductors with respect to the two terminals of said second battery so that the first and second windings of said bridge relay and the second and first windings of said line relay are respectively energized in series relation causing operation of said bridge relay, said line relay being of the marginal type so that it is not operated, means responsive to operation of said bridge relay for creating a call on said outgoing trunk, means responsive to answering of the call on said outgoing trunk for operating said answer relay, means responsive to operation of said answer relay for disconnecting the first and second windings of said bridge relay from said first and second line conductors and for connecting the first winding of said first signal relay thereacross and for energizing the second winding of said first signal relay so that said bridge relay is restored and said line relay is operated, said first signal relay being of the polarized type so that it is operated, means responsive to disconnection on said incoming trunk for restoring said second signal relay, means responsive to restoration of said second signal relay for restoring said reverse battery relay so that the polarity of said first and second line conductors with respect to the two terminals of said first battery is restored effecting restoration of said first signal relay and retaining operated said line relay, and means responsive to restoration of said first signal relay for transmitting a disconnect signal over said outgoing trunk.

32. In a telephone system including first and second trunk circuits interconnected by a trunk line provided with first and second line conductors, an outgoing trunk from said first trunk circuit, and an incoming trunk to said second trunk circuit provided with a pair of line conductors and a control conductor; said incoming trunk including a pair of line conductors and a control conductor, automatic switching apparatus having access to said incoming trunk, lines having access to said switching apparatus, said first trunk circuit including a bridge relay provided with first and second windings and a first battery provided with two terminals and means normally connecting the two terminals of said first battery respectively through the first and second windings of said bridge relay to said first and second line conductors and a signal relay and an answer relay, said second trunk circuit including a line relay provided with first and second windings and a second battery provided with two terminals and means normally connecting the two terminals of said second battery respectively through the first and second windings of said line relay to said first and second line conductors and a reverse battery relay so that the first and second windings of said bridge relay and the first and second windings of said line relay are normally respectively short-circuited in series relation, means controllable over a calling one of said lines for seizing said switching apparatus and then for operating it to seize said incoming trunk and for applying a tone to the control conductor of said incoming trunk identifying the class of said calling line, means responsive to seizure of said incoming trunk for operating said reverse battery relay, means responsive to operation of said reverse battery relay for reversing the polarity of said first and second line conductors with respect to the two terminals of said second battery so that the first and second windings of said bridge relay and the second and first windings of said line relay are respectively energized in series relation causing operation of said bridge relay, said line relay being of the marginal type so that it is not operated, means responsive to operation of said bridge relay for creating a call on said outgoing trunk, means responsive to answering of the call on said outgoing trunk for operating said answer relay, means responsive to operation of said answer relay for disconnecting the first and second windings of said bridge relay from said first and second line conductors and for connecting said signal relay thereacross so that said bridge relay is restored and said signal relay and said line relay are operated, and means responsive to operation of said line relay for coupling the control conductor and the pair of line conductors of said incoming trunk so that said class tone is returned over said trunk line and said outgoing trunk.

33. In a telephone system including an office provided with a toll board, an exchange provided with automatic switching apparatus and subscriber substations, a toll line interconnecting said office and said exchange and terminating in first and second toll circuits respectively disposed therein; said first toll circuit including a two-way trunk terminating at said second toll board, said second toll circuit including a combined line and recording trunk accessible to said switching apparatus and an outgoing trunk having access to said switching apparatus, means controllable from said toll board for seizing said first toll circuit over said two-way trunk, means responsive to said seizure of said first toll circuit for seizing said second toll circuit over said toll line, means responsive to said seizure of said second toll circuit for seizing said switching apparatus over said outgoing trunk, means then controllable from said toll board for operating said switching apparatus to extend the connection to a called one of said subscriber substations, means controllable from a calling one of said subscriber substations for seizing said switching apparatus and for operating it to seize said second toll circuit over said combined line and recording trunk, means responsive to said seizure of said second toll circuit for seizing said first toll circuit over said toll line, and means responsive to said seizure of said first toll circuit for extending the connection to said toll board over said two-way trunk.

34. In a telephone system including a first office provided with a first toll board, a second office provided with a second toll board and first automatic switching apparatus and first subscriber substations, and an exchange provided with second automatic switching apparatus and second subscriber substations, a first toll line interconnecting said first and second offices and terminating in first and second toll circuits respectively disposed therein, and a second toll line interconnecting said second office and said exchange and terminating in third and fourth toll circuits respectively disposed therein; said first toll circuit including a first incoming trunk accessible to said first toll board, said second toll circuit including a first outgoing trunk having access to said first switching apparatus, said third toll circuit including a second incoming trunk accessible to said first switching apparatus and a second outgoing trunk terminating at said second toll board, said fourth toll circuit including a combined line and recording trunk accessible to said second switching apparatus and a third outgoing trunk having access to said second switching apparatus, means controllable from said first toll board for seizing said first toll circuit over said first incoming trunk, means responsive to said seizure of said first toll circuit for seizing said second toll circuit over said first toll line, means responsive to said seizure of said second toll circuit for seizing said second switching apparatus over said first outgoing trunk, means then controllable from said first toll board for selectively operating said second switching apparatus to extend the connection to a called one of said first subscriber substations or to seize said third toll circuit over said second incoming trunk, means responsive to said seizure of said third toll circuit for seizing said fourth toll circuit over said second toll line, means responsive to said seizure of said fourth toll circuit for seizing said third switching apparatus over said third outgoing trunk, means then controllable from said first toll board for operating said third switching apparatus to extend the connection to a called one of said second subscriber substations, means controllable from a calling one of said second subscriber substations for seizing said second switching apparatus and for operating it to seize said fourth toll circuit over said combined line and recording trunk, means responsive to said seizure of said fourth toll circuit for seizing said third toll circuit over said second toll line, and means responsive to said seizure of said third toll circuit for extending the connection to said second toll board over said second outgoing trunk.

35. In a telephone system including an exchange provided with first automatic switching apparatus and first subscriber substations, an office provided with a toll board, and a second exchange provided with second automatic switching apparatus and second subscriber substations, a first toll line interconnecting said first exchange and said office and terminating in first and second toll circuits respectively disposed therein, and a second toll line interconnecting said office and said second exchange and terminating in third and fourth toll circuits respectively disposed therein; said first toll circuit including a first outgoing trunk having access to said first switching apparatus, said second toll circuit including a first incoming trunk accessible to said toll board, said third toll circuit including a two-way trunk terminating at said second toll board, said fourth toll circuit including a combined line and recording trunk accessible to said second switching apparatus and a second outgoing trunk having access to said second switching apparatus, means controllable from said toll board for seizing said third toll circuit over said two-way trunk, means responsive to said seizure of said third toll circuit for seizing said fourth toll circuit over said second toll line, means responsive to said seizure of said fourth toll circuit for seizing said second switching apparatus over said second outgoing trunk, means then controllable from said toll board for operating said second switching apparatus to extend the connection to a called one of said second subscriber substations, means controllable from a calling one of said second subscriber substations for seizing said second switching apparatus and for operating it to seize said fourth toll circuit over said combined line and recording trunk, means responsive to said seizure of said fourth toll circuit for seizing said third toll circuit over said second toll line, means responsive to said seizure of said third toll circuit for extending the connection to said toll board over said two-way trunk, means controllable from said second toll board for seizing said second toll circuit over said first incoming trunk, means responsive to said seizure of said second toll circuit for seizing said first toll circuit over said first toll line, means responsive to said seizure of said first toll circuit for seizing said first switching apparatus over said first outgoing trunk, and means then controllable from said toll board for operating said first switching apparatus to extend the connection to a called one of said first subscriber substations.

36. In a telephone system, first and second line conductors, a line relay of the marginal type provided with first and second windings, a first battery provided with two terminals, means for connecting the two terminals of said first battery respectively through the first and second windings of said line relay to said first and second line conductors, means for reversing said connection to said first and second line conductors with respect to the two terminals of said first battery, a second battery provided with two terminals, a bridge relay provided with first and second windings respectively connected to the two terminals of said second battery, means for selectively connecting the first and second windings of said bridge relay to said first and second line conductors so that said line relay is not operated and said bridge relay is operated only in the event of a predetermined polarity of said first and second line conductors, a signal relay of the polarized type provided with an operating winding, and means for selectively connecting the operating winding of said signal relay to said first and second line conductors so that said line relay is operated and said signal relay is operated only in the event of a predetermined polarity of said first and second line conductors.

37. In a telephone system, first and second line conductors, a line relay of the marginal type provided with first and second windings, a first battery provided with two terminals, means for connecting the two terminals of said first battery respectively through the first and second windings of said line relay to said first and second line conductors, means for reversing said connection to said first and second line conductors with respect to the two terminals of said first battery, a second battery provided with two terminals, a bridge relay provided with first and second windings respectively connected to the two terminals of said second battery, means for selectively connecting the first and second windings of said bridge relay to said first and second line conductors so that said line relay is not operated and said bridge relay is operated only in the event said connection is reversed, a signal relay of the polarized type provided with an operating winding, and means for selectively connecting the operating winding of said signal relay to said first and second line conductors so that said line relay is operated and said signal relay is operated only in the event said connection is reversed.

38. In a telephone system, first and second line conductors, a line relay of the marginal type provided with first and second windings, a first battery provided with two terminals, a reverse battery relay provided with back contacts for connecting the two terminals of said first battery respectively through the first and second windings of said line relay to said first and second line conductors and front contacts for reversing said connection to said first and second line conductors with respect to the two terminals of said first battery, a second battery provided with two terminals, a bridge relay provided with first and second windings respectively connected to the two terminals of said second battery, a signal relay of the polarized type provided with an operating winding, and a switch relay provided with back contacts for connecting the first and second windings of said bridge relay to said first and second line conductors and front contacts for connecting the operating winding of said signal relay to said first and second line conductors so that said bridge relay is operated in response to operation of said reverse battery relay and said line relay is operated in response to operation of said switch relay and said signal relay is operated in response to joint operation of said reverse battery relay and said switch relay.

39. In a telephone system, first and second line conductors, a ring relay of the differential type provided with first and second windings, a battery provided with two terminals, means for connecting the two terminals of said battery respectively through the first and second windings of said ring relay to said first and second line conductors, means for reversing said connection to said first and second line conductors with respect to the two terminals of said battery, a signal relay of the polarized type provided with an operating winding, means for selectively connecting the operating winding of said signal relay to said first and second line conductors so that said ring relay is not operated and said signal relay is operated only in the event of a predetermined polarity of said first and second line conductors, a ring start relay, means responsive jointly to operation of said ring start relay and to operation of said signal relay for connecting a predetermined potential to said first line conductor and responsive jointly to operation of said ring start relay and to restoration of said signal relay for connecting said predetermined potential to said second line conductor so that said ring relay is operated, and means responsive to operation of said ring relay for effecting a ringing operation.

40. In a telephone system, first and second line conductors, a ring relay of the differential type provided with first and second windings, a battery provided with two terminals, means for connecting the two terminals of said battery respectively through the first and second windings of said ring relay to said first and second line conductors, means for reversing said connection to said first and second line conductors with respect to the two terminals of said battery, a signal relay of the polarized type provided with an operating winding, means for selectively connecting the operating winding of said signal relay to said first and second line conductors so that said ring relay is not operated and said signal relay is operated only in the event said connection is reversed, a ring start relay, means responsive jointly to operation of said ring start relay and to operation of said signal relay for connecting a predetermined potential to said first line conductor and responsive jointly to operation of said ring start relay and to restoration of said signal relay for connecting said predetermined potential to said second line conductor so that said ring relay is operated, and means responsive to operation of said ring relay for effecting a ringing operation.

41. In a telephone system, first and second line conductors, a ring relay of the differential type provided with first and second windings, a battery provided with two terminals, a reverse battery relay provided with back contacts for connecting the two terminals of said battery respectively through the first and second windings of said line relay to said first and second line conductors and front contacts for reversing said connection to said first and second line conductors with respect to the two terminals of said battery, a signal relay of the polarized type provided with an operating winding, means for selectively connecting the operating winding of said signal relay to said first and second line conductors so that said ring relay is not operated and said signal relay is operated in response to operation of said reverse battery relay, a ring start relay, means responsive jointly to operation of said ring start relay and to operation of said signal relay for connecting a predetermined potential to said first line conductor and responsive jointly to operation of said ring start relay and to restoration of said signal relay for connecting said predetermined potential to said second line conductor so that said ring relay is operated, and means responsive to operation of said ring relay for effecting a ringing operation.

HARVEY W. BALZER.

REFERENCES CITED

The following references are of record in the file of this patent:

UNITED STATES PATENTS

| Number | Name | Date |
|---|---|---|
| Re. 22,475 | McDavitt | May 9, 1944 |
| 1,604,550 | Deakin | Oct. 26, 1926 |
| 1,647,796 | Glezen | Nov. 1, 1927 |
| 1,763,013 | Skillman | June 10, 1930 |
| 1,886,613 | Wicks | Nov. 8, 1932 |
| 2,275,459 | Nyquist | Mar. 10, 1942 |
| 2,382,893 | McKim | Aug. 14, 1945 |